(12) United States Patent
Nakamura et al.

(10) Patent No.: US 7,561,966 B2
(45) Date of Patent: Jul. 14, 2009

(54) VEHICLE INFORMATION DISPLAY SYSTEM

(75) Inventors: Koji Nakamura, Tokai (JP); Hiroshi Ando, Nagoya (JP); Akira Kamiya, Kuwana (JP); Nobuaki Kawahara, Nisshin (JP); Kazuya Yasuda, Nagoya (JP); Masaru Kakizaki, Nagoya (JP); Nozomi Kitagawa, Okazaki (JP); Tomoo Aoki, Kariya (JP); Yoshio Shinoda, Obu (JP); Naoyuki Aoki, Kariya (JP); Shinji Kashiwada, Kariya (JP); Junya Inada, Kariya (JP); Akira Takahashi, Nisshin (JP); Takayuki Fujikawa, Nagoya (JP)

(73) Assignee: DENSO CORPORATION, Kariya (JP)

(*) Notice: Subject to any disclaimer, the term of this patent is extended or adjusted under 35 U.S.C. 154(b) by 559 days.

(21) Appl. No.: 11/001,584

(22) Filed: Dec. 2, 2004

(65) Prior Publication Data

US 2005/0154505 A1 Jul. 14, 2005

(30) Foreign Application Priority Data

Dec. 17, 2003 (JP) ............................. 2003-419753
Dec. 26, 2003 (JP) ............................. 2003-434136
Apr. 2, 2004 (JP) ............................. 2004-110061
Jun. 16, 2004 (JP) ............................. 2004-178738

(51) Int. Cl.
*G06F 19/00* (2006.01)
*G09G 5/08* (2006.01)

(52) U.S. Cl. ..................... 701/211; 701/14; 345/581; 340/525; 340/461

(58) Field of Classification Search ................. 345/158, 345/7, 173, 581; 244/1 R, 118.5; 340/525, 340/461; 701/211, 1, 14
See application file for complete search history.

(56) References Cited

U.S. PATENT DOCUMENTS 5,327,154 A * 7/1994 Aoki ............................. 345/7
5,737,012 A 4/1998 Tabata et al.
6,531,958 B2 3/2003 Kabatek et al.

(Continued)

FOREIGN PATENT DOCUMENTS

CN 2487595 4/2002

(Continued)

OTHER PUBLICATIONS

Notice of Reason for Rejection dated May 20, 2008 in corresponding Japanese Patent Application No. 2004-110061 (and English translation).

(Continued)

*Primary Examiner*—Khoi H. Tran
*Assistant Examiner*—Ronnie Mancho
(74) *Attorney, Agent, or Firm*—Posz Law Group, PLC

(57) ABSTRACT

A vehicle information display system includes a head-up display for reflecting an image on a windshield of a vehicle and displaying the image so that a driver recognizes the image as a virtual image. Information is collected for being displayed by the head-up display. A circumstance of the vehicle, a circumstance of surrounding of the vehicle, or a circumstance of the driver is detected. The collected information is classified in accordance with a detection result. Then, display contents of the head-up display are controlled in accordance with a classification result.

7 Claims, 37 Drawing Sheets

U.S. PATENT DOCUMENTS

| | | | |
|---|---|---|---|
| 6,702,229 B2 * | 3/2004 | Anderson et al. | 244/1 R |
| 6,718,187 B1 * | 4/2004 | Takagi et al. | 455/569.2 |
| 6,750,832 B1 * | 6/2004 | Kleinschmidt | 345/7 |
| 6,992,578 B2 * | 1/2006 | Aoki et al. | 340/525 |
| 7,126,583 B1 * | 10/2006 | Breed | 345/158 |
| 2002/0126391 A1 | 9/2002 | Kushida et al. | |

FOREIGN PATENT DOCUMENTS

| | | |
|---|---|---|
| JP | U-57-148530 | 9/1982 |
| JP | 62-101534 | 5/1987 |
| JP | U-S62-152835 | 9/1987 |
| JP | U-S63-094042 | 6/1988 |
| JP | S63-294589 | 12/1988 |
| JP | A-H5-104981 | 4/1993 |
| JP | A-H5-124455 | 5/1993 |
| JP | U-H6-67158 | 9/1994 |
| JP | U-H7-005886 | 1/1995 |
| JP | A-07-144558 | 6/1995 |
| JP | A-07-146154 | 6/1995 |
| JP | A-08-076051 | 3/1996 |
| JP | A-8-83397 | 3/1996 |
| JP | A-09-076793 | 3/1997 |
| JP | A-9-128686 | 5/1997 |
| JP | A-09-182113 | 7/1997 |
| JP | A-H09-178506 | 7/1997 |
| JP | A-H9-229707 | 9/1997 |
| JP | A-H10-104014 | 4/1998 |
| JP | A-H10-176928 | 6/1998 |
| JP | A-10-240109 | 9/1998 |
| JP | A-11-15420 | 1/1999 |
| JP | A-11-48828 | 2/1999 |
| JP | A-11-73598 | 3/1999 |
| JP | A-11-338615 | 12/1999 |
| JP | A-2000-057491 | 2/2000 |
| JP | A-2000-071877 | 3/2000 |
| JP | A-2000-111834 | 4/2000 |
| JP | A-2000-233665 | 8/2000 |
| JP | A-2000-331289 | 11/2000 |
| JP | A-2000-353293 | 12/2000 |
| JP | A-2001-108476 | 4/2001 |
| JP | A-2002-19491 | 1/2002 |
| JP | A-2002-120597 | 4/2002 |
| JP | A-2002-163643 | 6/2002 |
| JP | A-2002-181564 | 6/2002 |
| JP | A-2002-304117 | 10/2002 |
| JP | A-2003-329464 | 11/2003 |
| JP | A-2003-331400 | 11/2003 |

OTHER PUBLICATIONS

Office Action dated Sep. 10, 2008 in corresponding Japanese patent application No. 2003-434136 (and English translation).
Chinese Office Action dated Nov. 23, 2007 in corresponding Chinese Patent Application No. 200410081828.0 (and English translation).
Office Action dated Jul. 1, 2008 in corresponding Japanese patent application No. 2003-434136 (and English Translation).
Office Action dated Sep. 2, 2008 in corresponding Japanese patent application No. 2004-229659 (and English translation).
Office Action mailed Jan. 6, 2009 in corresponding Japanese patent application No. 2004-229659 (and English translation).
Notice of Reason for Rejection from Japanese Patent Office dated Apr. 25, 2007 for the corresponding Japanese patent application No. 2004-178738 (a copy and English translation thereof).
Office Action mailed Jan. 6, 2009 in corresponding Japanese patent application No. 2004-229659 (and English translation).
Chinese Office Action dated Jun. 15, 2007 in corresponding Chinese Patent Application No. 200410081828 (and English translation).

* cited by examiner

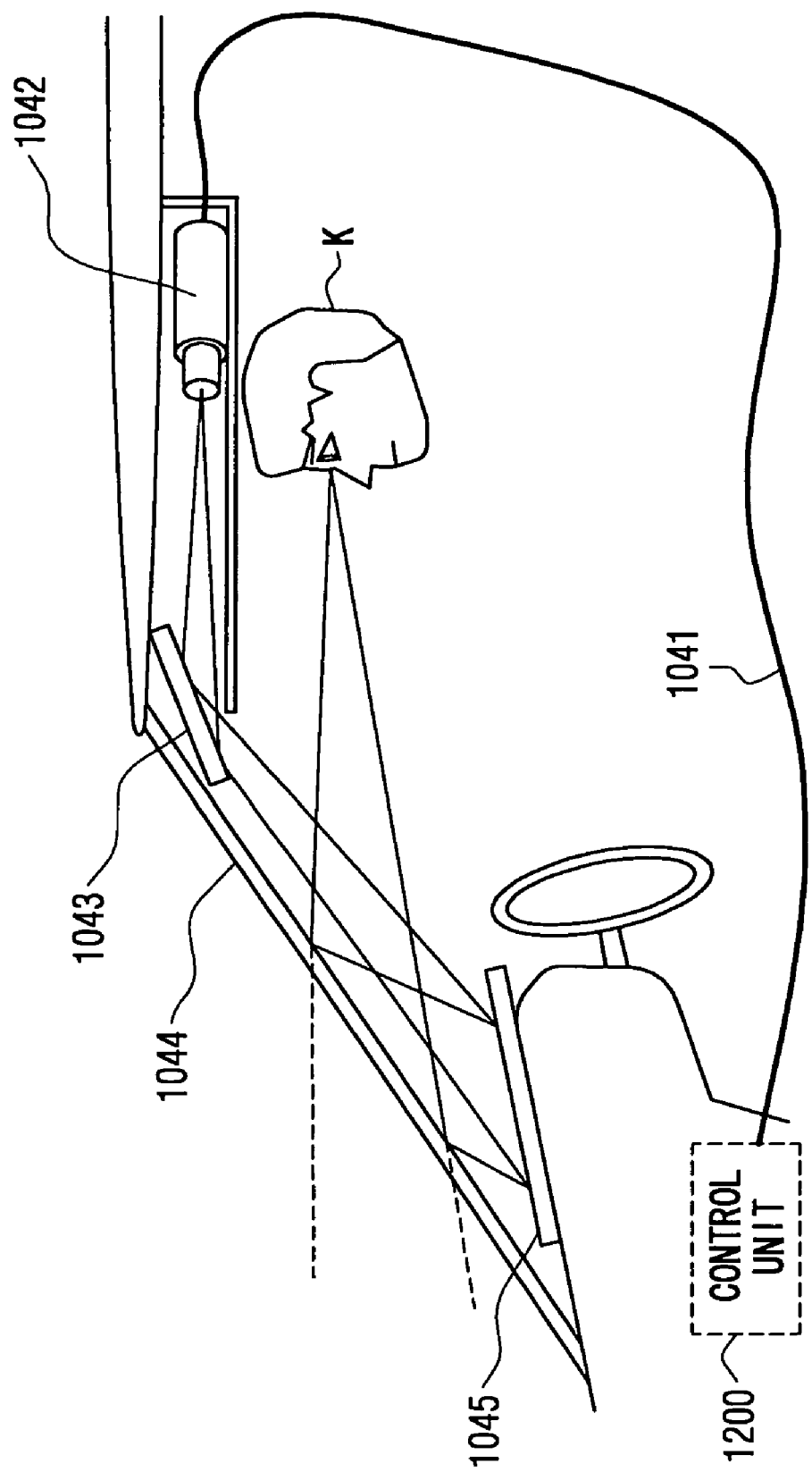

FIG. 5

DISPLAY SETUP DATA

| DEFAULT POSITION | PRESENTATION INFO | USER SETUP INFO ||
| --- | --- | --- | --- |
| | | NECESSITY INFO | LEVEL INFO |
| TOP AREA | TRAVELING DIRECTION /AREA | YES (DISPLAY REQUIRED) | 1 |
| | VIRTUAL SIGNBOARD | YES | 1 |
| | TRAFFIC SIGNAL | NO (DISPLAY NOT REQUIRED) | 1 |
| | ⋮ | ⋮ | ⋮ |
| BOTTOM AREA | DRIVE GUIDE | YES | 0 |
| | CONGESTION INFO | YES | 0 |
| | MULTIMEDIA INFO | NO | 2 |
| | ⋮ | ⋮ | ⋮ |
| RIGHT END AREA | VEHICLE SPEED | NO | 1 |
| | ⋮ | ⋮ | ⋮ |
| LEFT END AREA | ⋮ | ⋮ | ⋮ |
| CENTER VISUAL FIELD AREA (CAUTION-RELATED) | OBSTACLES | YES | −1 |
| | ⋮ | ⋮ | |

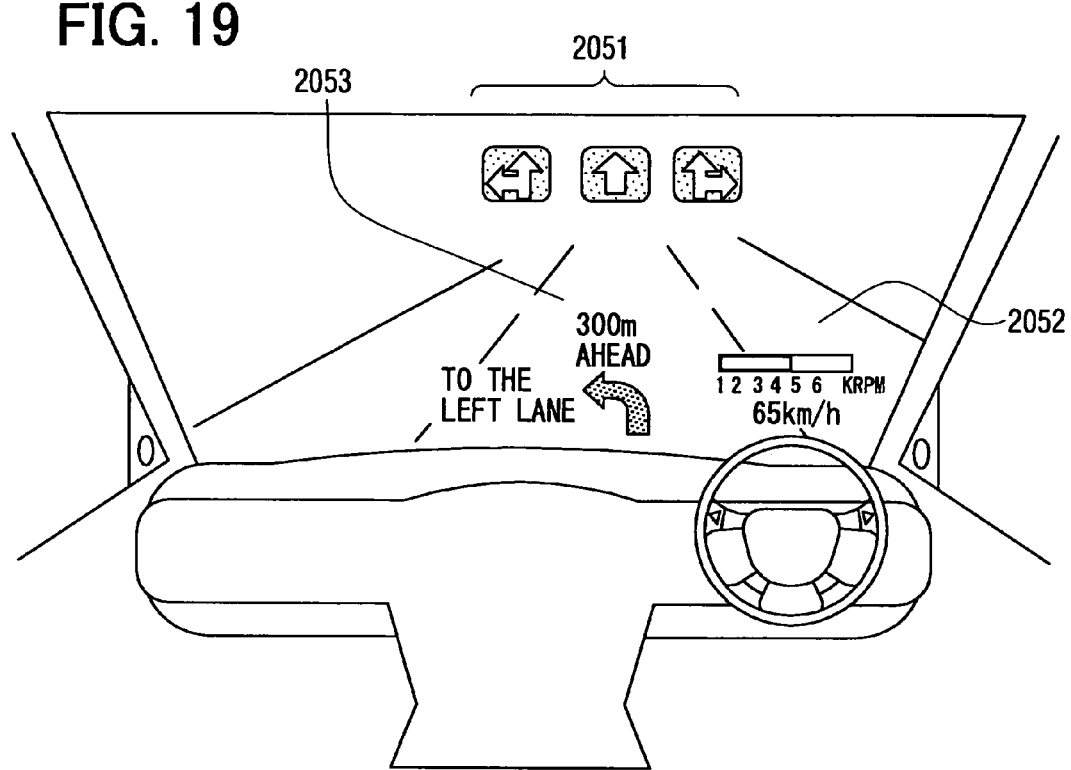
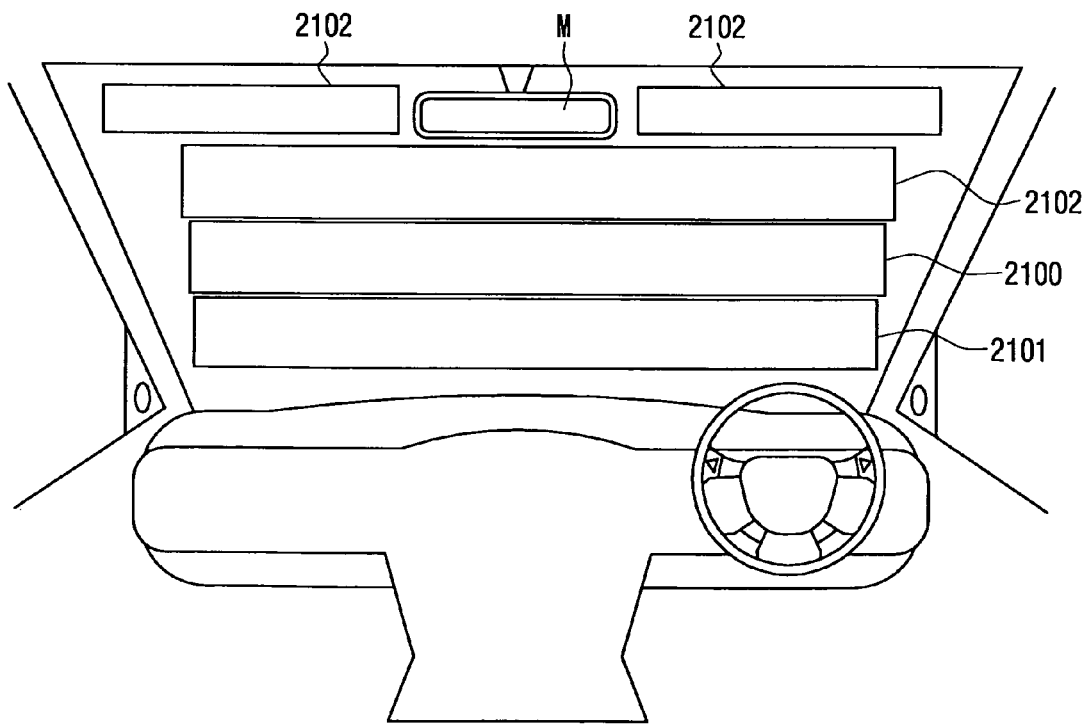

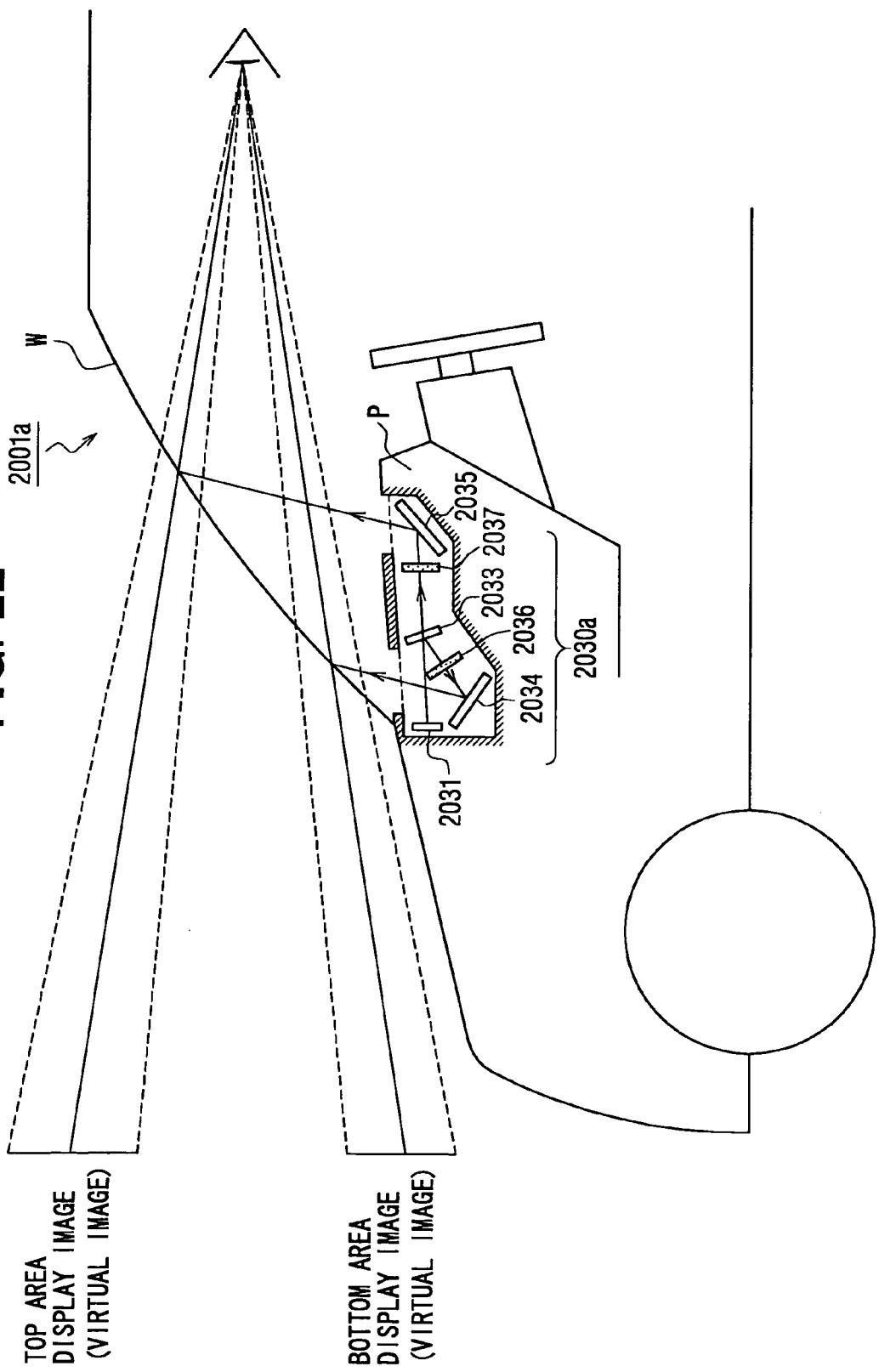

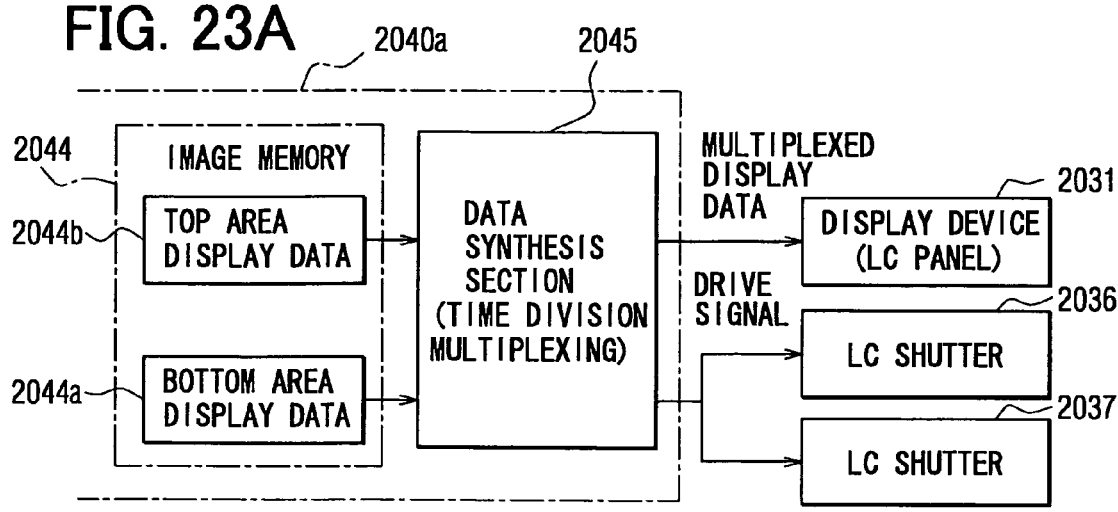
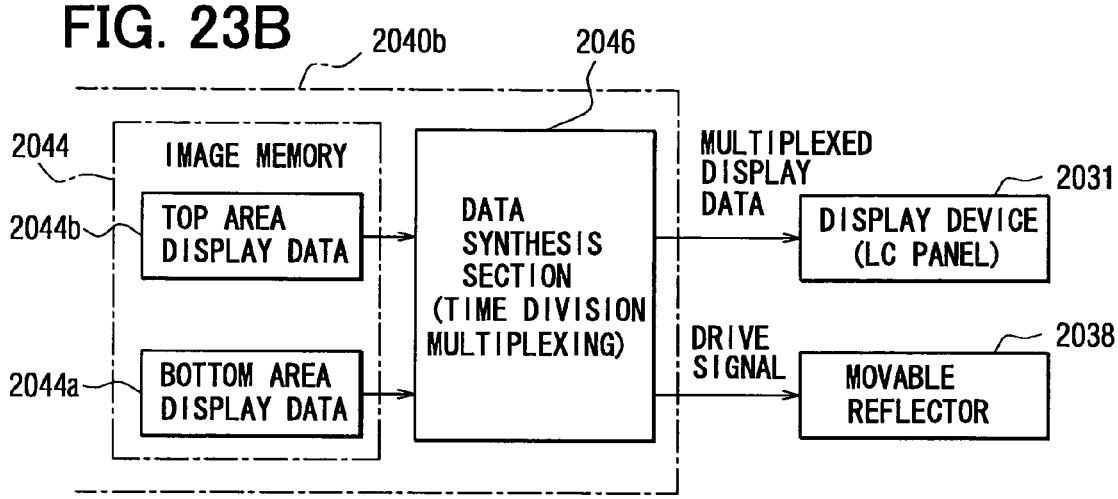
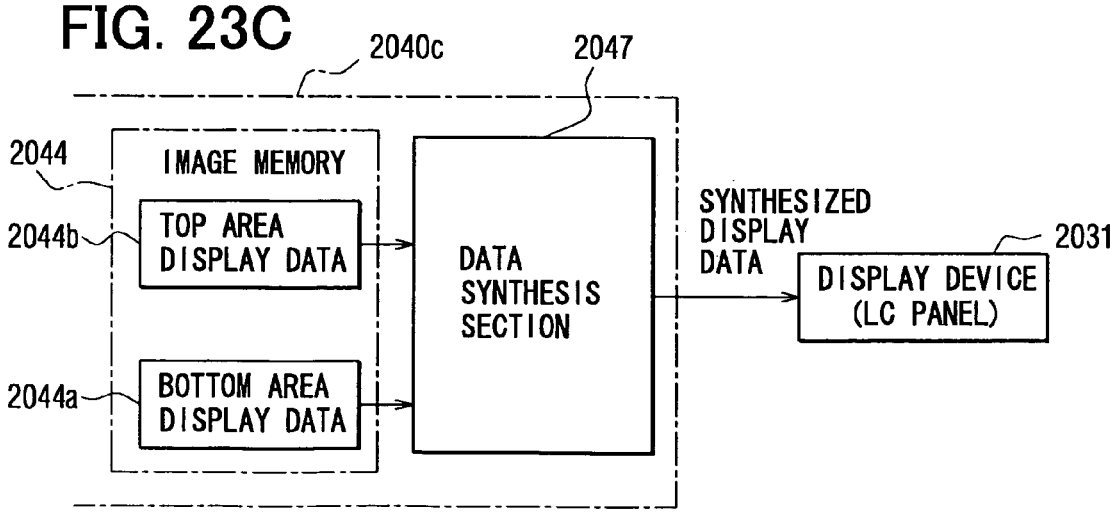

PIXEL (0, 0)  PIXEL (0, n)
3007
PIXEL (n, n)

DISPLAY PORTION CORRESPONDING TO PIXEL (n, n)
DISPLAY PORTION CORRESPONDING TO PIXEL (0, n)
DISPLAY PORTION CORRESPONDING TO PIXEL (0, 0)

3017
3033
3031

DISPLAY AREAS OF THE WINDSHIELD

VEHICLE INFORMATION DISPLAY SYSTEM

CROSS REFERENCE TO RELATED APPLICATIONS

This application is based on and incorporates herein by reference Japanese Patent Applications No. 2003-419753 filed on Dec. 17, 2003, No. 2003-434136 filed on Dec. 26, 2003, No. 2004-110061 filed on Apr. 2, 2004, and No. 2004-178738 filed on Jun. 16, 2004.

FIELD OF THE INVENTION

The present invention relates to a vehicle information display system which reflects an image on a vehicle windshield and displays the image as a virtual image so as to be visually recognized by a vehicle's occupant or driver.

BACKGROUND OF THE INVENTION

In recent years, vehicles are increasingly available that are mounted with navigation systems and the other systems that visualize various kinds of information. Generally, a liquid crystal display is used as the system's display screen and is disposed at a console and the like inside the vehicle.

However, a driver sometimes needs to visually recognize various kinds of information displayed on the display screen disposed as mentioned above while the vehicle is running. In such case, the driver must move his or her sight line to the display screen inside the vehicle from a road, signs, and the like forward outside the vehicle. This poses a problem of reducing the attention in front of the vehicle.

To solve this problem, a vehicle information display system using a so-called head up display (HUD) is known (e.g., see Patent Document 1). This technology reflects an image indicating various kinds of information on the vehicle's windshield and allows a vehicle's occupant to visually recognize the image as a virtual image so as to decrease the movement of the occupant's sight line for visually recognizing the displayed information.

Such vehicle information display system using the HUD may provide a driver with various kinds of information in the future. In such case, there is a problem of hiding important information needed for the current driving operations and the like behind the other much information and preventing the driver from promptly recognizing the important information. Another problem is possibility of hindering the driver's visual field depending on display positions of the image (information).

Some vehicle information display system using the HUD displays various kinds of information (videos) provided for a driver at a windshield's bottom part so as not to obstacle the driver's visual field to confirm traffic circumstances (e.g., see Patent Document 2). The windshield's bottom part is also referred to as a "bottom area" hereafter.

Here, the HUD can safely provide necessary information without making the driver's sight line move greatly. The HUD can provide all types of information in the future. However, only a limited size is ensured for the windshield's bottom area to display the information. It is impossible to display much information at a time.

When the display area is enlarged to display more information, the visual field area decreases to hinder the driver's visual field, making the driver uneasy.

Conventionally, a driver driving a vehicle may need to look at a guide signboard installed near a road in order to obtain route guide information and road information.

However, the driver may not be able to obtain sufficient information by looking at guide signboards near the road. For example, guide signboards on the road may not be easily identifiable. Alternatively, the driver may lose timing to look at the signboards. It is very dangerous for the driver to continue driving though he or she is not provided with sufficient information and therefore feels uneasiness and stress. As a result, the driver may fail to identify surrounding vehicles and signs. For example, the driver may fail to notice a passerby rushing out on the road or a temporary stop at the intersection with no traffic lights.

To decrease the above problem, route guide information and road information can be additionally obtained by using a navigation system. Further, in the above-mentioned Patent Document 1, the navigation system has a method of displaying the route guide information using arrows and letters on a vehicle's windshield and providing a driver with the route guide information superimposed on the actual road. This decreases a burden for the driver to drive a vehicle by comparing the actual road with a road on the display to thereby forcibly move his or her sight line and make him or her err in his or her judgment to take the wrong road.

However, according to the above-mentioned method described in Patent Document 1, the display on the route guide information may overlap with a sight of a preceding vehicle. In such case, the driver may feel uncomfortably to cause trouble with the driving. This may expose the driver to danger. Further, when the windshield shows the arrows and letters that are quite different from the real world, the driver may also feel uncomfortably to cause trouble with the driving.

A vehicle display apparatus uses a head-up display (HUD) that reflects an image from a display device on a windshield in front of a driver and enlarges the image, providing an advantage of improved visibility (see Patent Document 3).

Another vehicle display apparatus is proposed to provide a liquid crystal display device instead of the HUD by dividing the display into top and bottom sections. That is to say, the liquid crystal display device is mounted except the windshield's center area that may obstruct the driver's view (see Patent document 4).

On the other hand, the vehicle display apparatus using the HUD as disclosed in Patent Document 3 displays information about the vehicle on the driving visual field area in front of the driver. In this case, a driver's visual field is hindered during driving. In contrast, the information may be displayed only on the bottom area of the windshield except the driving visual field area. However, in this case, it is impossible to notify the driver of much information.

The vehicle display apparatus as disclosed in Patent Document 4 divides the liquid crystal display device into top and bottom sections and mounts them on the windshield. It is possible to notify the driver of much information without annoying him or her. Since the vehicle display apparatus is not an HUD, however, the information cannot be enlarged for display. As a result, it is necessary to form a large or a plurality of liquid crystal display apparatuses on the windshield, increasing manufacturing costs of the vehicle display apparatus.

(Patent Document)

Patent Document 1: JP 2001-108476 A

Patent Document 2: JP 2002-19491 A

Patent Document 3: JP S57-148530 U (Utility patent, Jitsuyo-shinan)

Patent Document 4: JP H11-15420 A

SUMMARY OF THE INVENTION

It is an object of the present invention to provide a vehicle information display system capable of allowing a driver of an occupant to visually confirm necessary information safely and reliably and of displaying much information without hindering a driver's visual field. Further, a vehicle information display system is provided for giving, to a driver, easy-to-understand route guide information, road information, and the like without causing trouble with his or her driving.

To achieve the object, as a first aspect of the present invention, a vehicle information display system is provided with the following. A display means reflects an image on a windshield of a vehicle and displays the image so that an occupant of the vehicle recognizes the image as a virtual image. Information is collected to be displayed by the display means. At least one of circumstances of the vehicle, surrounding of the vehicle, and an occupant who operates the vehicle is detected. The collected information is classified in accordance with a detected result. Display contents of the display means are controlled in accordance with a classified result.

Information needed by the driver diversely varies with circumstances of the vehicle, its surroundings, and the driver who operates the vehicle. According to these circumstances, the vehicle display system of the present invention can dispose only necessary information at positions easily viewed by the driver and limit the information to be displayed. Accordingly, the system can safely and reliably allow the driver to visually recognize the information needed for the driver under any circumstances without hindering his or her visual field.

As a second aspect of the present invention, a vehicle information display system is provided with the following. A video display means is included for indicating provision information to be provided to an occupant of a vehicle. A projection means is included for projecting the video on a vehicle windshield so that the occupant visually recognizes a video displayed by the video display means. Here, while the projection means projects the video on a top area above a visual field area corresponding to a visual field needed for the occupant to confirm traffic circumstances, and the projection means projects the video also on a bottom area below the visual field area in addition to the top area. The projection means includes a first mirror which reflects an incident video and projects the video on the top area, and a second mirror which reflects an incident video and projects the video on the bottom area.

In this structure, the projection means can project videos that are displayed from a single display means, to two areas of the bottom area and the top area by using two mirrors. This saves manufacturing costs of the projecting means capable of projecting the videos to the two areas and also reduces an installation space on the vehicle.

As a third aspect of the present invention, a vehicle information display system is provided with the following. Image data of guide images are stored Route guide information is generated to guide a vehicle to a destination. The stored image data of the guide image corresponding to the route guide information is read. Images are displayed based on the read image data corresponding to the route guide information on a display area which is part of a windshield of the vehicle and is positioned higher than a sight line.

In this structure, images for the route guide information and the road information can be displayed on a windshield above the direction along the driver's sight line. Further, the images do not overlap with preceding vehicles, nor cause trouble with the driver's driving.

As a fourth aspect of the present invention, a vehicle information display system is provided with the following. Images are captured in front of a vehicle to create image data. The created image data are analyzed to recognize a targeted object and to create image data of the targeted object. The created image data of the targeted object are stored. The stored image data of the targeted object are then read. Images are displayed based on the read image data of the targeted object on a display area which is part of a windshield of the vehicle and is positioned higher than a sight line of an occupant of the vehicle.

In this structure, even when a driver misses road information such as an actual signboard, the driver can display an image for that signboard on a windshield later to recognize the road information. Since there is no need to worry about missing road information, the driver can drive the vehicle safely.

As a fifth aspect of the present invention, a vehicle information display system is provided with the following. A first image is generated to represent first information, while a second image is generated to represent second information. Here, the first image is visually recognized by an occupant of a vehicle as a virtual image on a windshield below a driving visual field area that the occupant frequently looks at during driving of a vehicle, and the second image is visually recognized by the occupant as a virtual image on the windshield above the driving visual field.

In this structure, much information, e.g., relating to indicators or route guide can be displayed separately in two areas on a windshield above and below the driving visual field area. As a result, the driver can be notified of much information in an easy-to-understand manner without being prevented from looking at the driving visual field area.

BRIEF DESCRIPTION OF THE DRAWINGS

The above and other objects, features, and advantages of the present invention will become more apparent from the following detailed description made with reference to the accompanying drawings. In the drawings:

FIG. 4 is a pattern diagram showing the configuration of a head-up display;

FIG. 5 is an explanatory diagram showing the configuration of display setup data;

FIG. 19 is an explanatory diagram exemplifying information displays on a windshield;

FIG. 21 is an explanatory diagram showing another setting example of display areas on a windshield;

FIG. 22 is an explanatory diagram showing the configuration of the information presentation section of a second example;

FIGS. 23A, 23B, 23C are block diagrams showing relationship between the display controller and the information presentation section of the second to fourth examples;

DETAILED DESCRIPTION OF THE PREFERRED EMBODIMENTS

First Embodiment

An embodiment of the present invention will be described in further detail with reference to the accompanying drawings.

Figure 1:
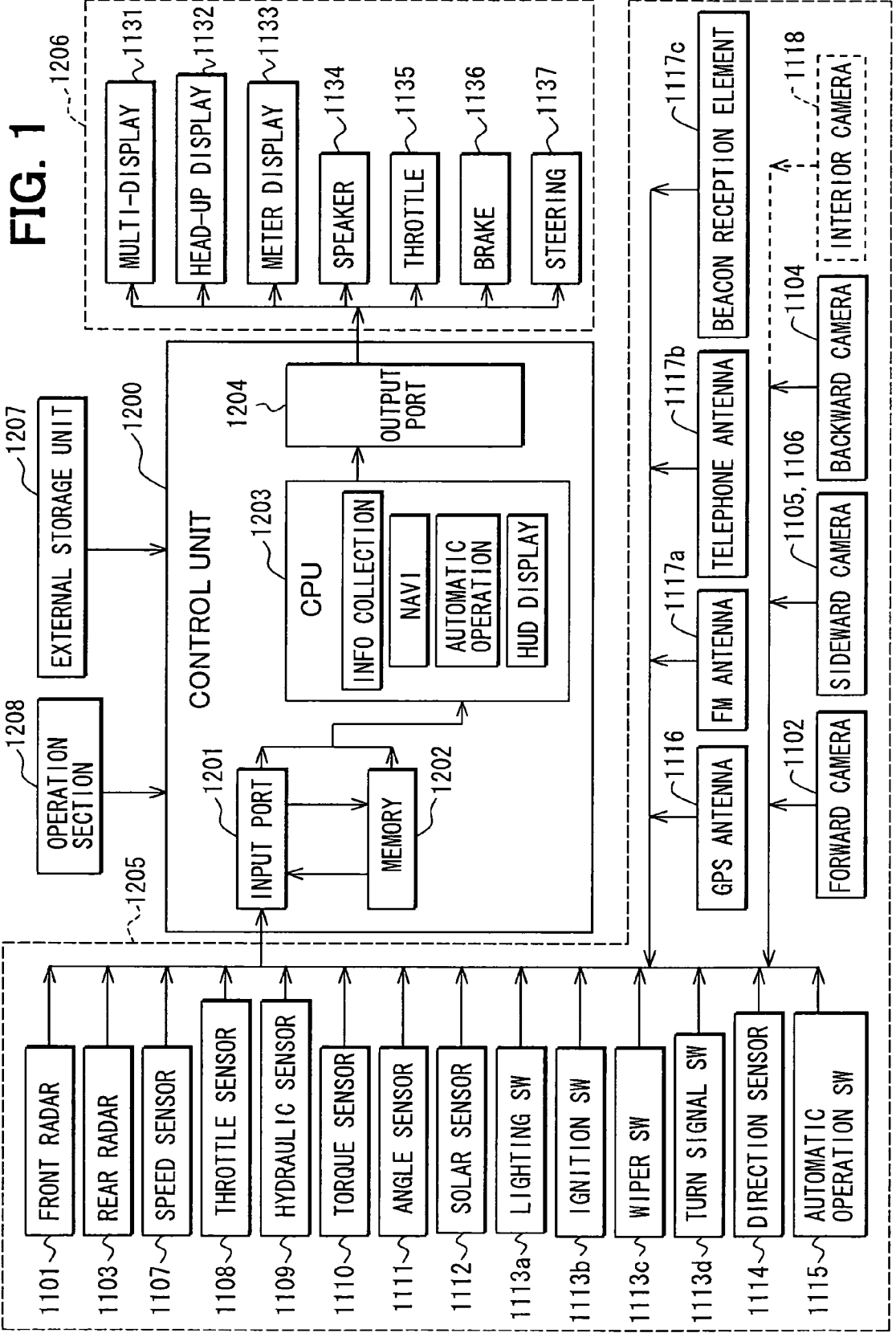
FIG. 1 is a block diagram showing the overall configuration of an information display system according to a first embodiment of the present invention.
Figure 2:
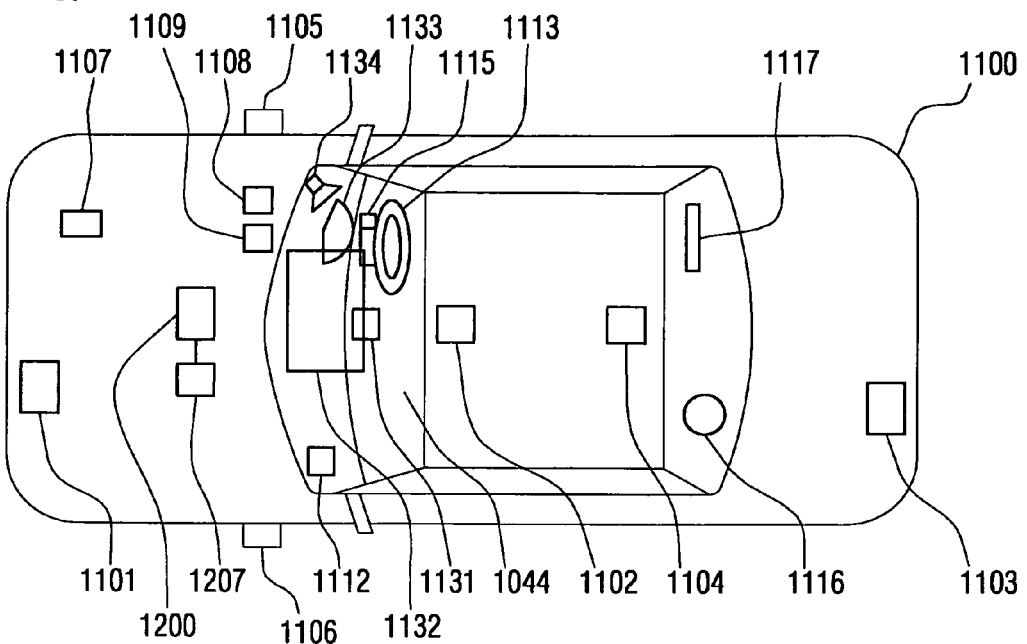
FIG. 2 is an explanatory diagram showing an example of disposing parts constituting the information display system in a vehicle.
Figure 3:
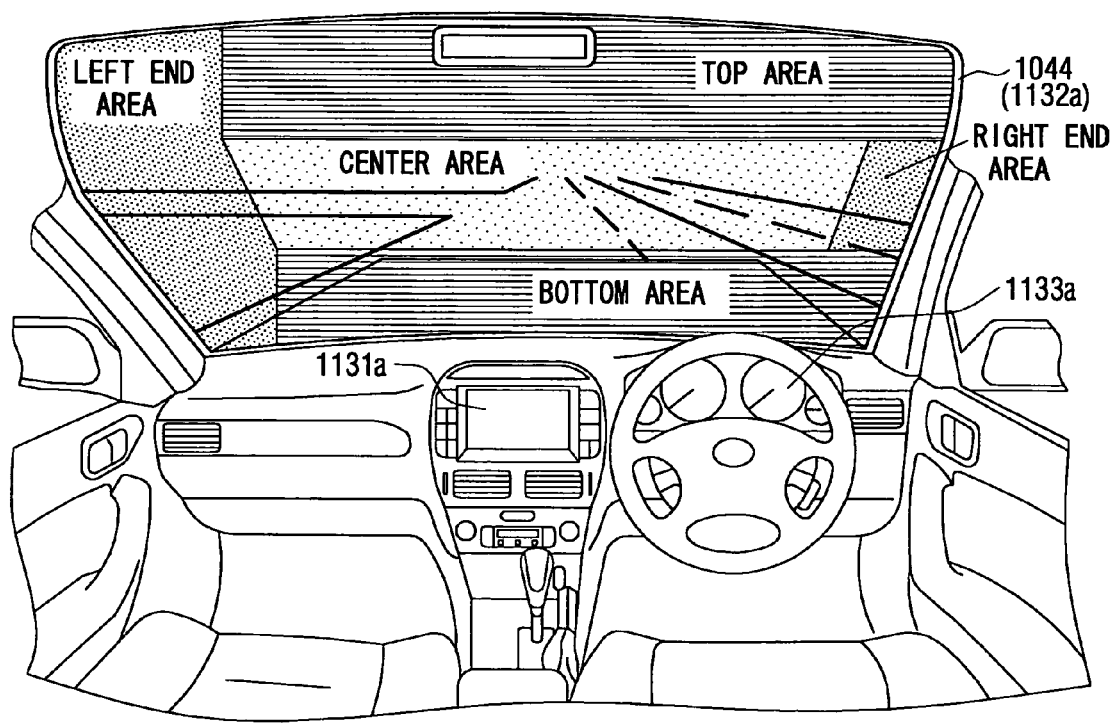
FIG. 3 is a front view showing a vehicle interior viewed from a driver's seat.

FIG. 1 is a block diagram showing the configuration of a vehicle information display system according to a first embodiment of the present invention. FIG. 2 is an explanatory diagram showing an example of disposing parts constituting the vehicle information display system in a vehicle 1100. FIG. 3 is a front view showing an interior of the vehicle 1100 viewed from a seat of a driver as an occupant.

As shown in FIGS. 1 and 2, the vehicle information display system according to the first embodiment includes an information input section 1205, an information output section 1206, an external storage unit 1207, an operation section 1208, and a control unit 1200 to control these parts.

The information input section 1205 is configured to include a front radar 1101, a forward monitoring camera 1102, a rear radar 1103, a backward monitoring camera 1104, sideward monitoring cameras 1105 and 1106, a vehicle speed sensor 1107, a throttle sensor 1108, a brake hydraulic sensor 1109, a steering torque sensor 1110, a steering angle sensor 1111, a solar sensor 1112, a lighting switch 1113a, an ignition switch 1113b, a wiper switch 1113c, a turn signal lamp switch 1113d, a direction sensor 1114, an automatic operation switch 1115, a GPS antenna 1116, an FM antenna 1117a, a telephone antenna 1117b, and a beacon reception element 1117c.

The front radar 1101 monitors the front of the vehicle 1100 and detects a shape of the driving course forward, positions and relative speeds of vehicles and obstacles forward. The rear radar 1103 monitors the rear of the vehicle 1100 and detects a shape of the driving course backward, positions and relative speeds of vehicles and obstacles backward. Such radars 1101 and 1103 can be those that recognize objects using laser or millimetric waves, for example.

The forward monitoring camera 1102 captures images in front of the vehicle 1100. The backward monitoring camera 1104 captures images in the rear of the vehicle 1100. The sideward monitoring cameras 1105 and 1106 capture images on the sides of the vehicle 1100. These monitoring cameras 1102, 1104, 1105, and 1106 can be CCD (charge-coupled device), and the like.

The vehicle speed sensor 1107 detects speeds of the vehicle 1100. The throttle sensor 1108 detects throttle angles of the vehicle 1100. The brake hydraulic sensor 1109 detects brake oil pressures of the vehicle 1100.

The steering torque sensor 1110 detects steering torque of the vehicle 1100. The steering angle sensor 1111 detects steering angles of the vehicle 1100. The steering torque sensor 1110 and the steering angle sensor 1111 are omitted from FIG. 2.

The solar sensor 1112 detects a value of solar radiation. The solar sensor 1112 can use a photodiode or the like that generates electrical signals in accordance with the brightness.

The lighting switch 1113*a* is a switch that turns on or off lights of the vehicle 1100. The ignition switch 1113*b* is a switch that turns on or off an engine of the vehicle 1100. The wiper switch 1113*c* is a switch that turns on or off wipers of the vehicle 1100. The turn signal lamp switch 1113*d* is a switch that turns on or off turn signal lamps of the vehicle 1100.

The switches 1113*a* to 1113*d* are disposed at positions where a driver can operate on and around a steering wheel 1113 of the vehicle 1100 as shown in FIG. 2.

The direction sensor 114 determines directions north, south, east, and west. The direction sensor 114 is omitted from FIG. 2. The automatic operation switch 115 is a switch that turns on or off so-called auto-cruise (automatic operation) feature to enable driving at a constant speed, for example.

The GPS (global positioning system) antenna 1116 receives signals to determine positional information about own vehicle from an artificial satellite. The beacon reception element 1117*c* receives signals from beacons, i.e., relaying stations installed on the road for optical communication.

The FM antenna 1117*a*, the telephone antenna 1117*b*, and the beacon reception element 1117*c* are mounted on the antenna mounting section 1117 of the vehicle 1100 in FIG. 2. The FM antenna 1117*a*, the telephone antenna 1117*b*, and the beacon reception element 1117*c* are used to receive road information such as construction and traffic congestion.

The information output section 1206 is configured to chiefly include a multi-display 1131, a head-up display 1132, a meter display 1133, a speaker 1134, a throttle 1135, a brake 1136, and a steering 1137.

The throttle 1135, the brake 1136, and the steering 1137 are actuators that operate based on control signals generated by the control unit 1200. Specifically, the throttle 1135, the brake 1136, and the steering 1137 are controlled for auto-cruise according to operations of the automatic operation switch 1115.

The multi-display 1131 includes a liquid crystal display (LCD) and the like. The meter display 1133 includes a speedometer, a tachometer, a fuel meter, a hydraulic meter, and the like.

The head-up display 1132 displays various kinds of information on a windshield 1044.

The displays 1131, 1132, and 1133, and the speaker 1134 output images and sounds based on visual information and audio information generated from the control unit 1200. The displays 1131, 1132, and 1133, and the speaker 1134 are configured to provide various kinds of information about the vehicle 1100 as well as vehicle position information indicating positions of the vehicle 1100, road information indicating circumstances of a road to run, surrounding information around the vehicle, and the like. FIG. 3 shows disposition and external views of the display areas 1131*a*, 1132*a*, and 1133*a* for the displays 1131, 1132, and 1133.

As shown in FIG. 3, the head-up display 1132 uses the entire windshield 1044 as a display area. The display area is divided into center, top, bottom, right, and left display areas. The center display area is viewed mainly with the central visual field during driving. On this area, a driver can read display contents without averting his or her sight line from the driving course forward while running through the straight course. The other areas are generically referred to as "surrounding display areas" and are viewed mainly with the surrounding visual field while driving. On these areas, the driver can recognize the presence or absence of the display, but feels it difficult to read display contents without averting his or her sight line from the driving course forward. The surrounding display areas are disposed top, bottom, left, and right of the center display area. The driver may temporarily view the surrounding display areas through his or her central visual field as needed when turning to the right or left, or looking at road signs, signboards, and the like.

FIG. 4 is a pattern diagram showing the configuration of the head-up display 1132 according to the first embodiment. As shown in FIG. 4, the head-up display 1132 includes a video projector 1042, a screen 1043, a windshield 1044, and a Fresnel mirror 1045. The Fresnel mirror 1045 magnifies an image from the screen 1043 so as to be visually recognized by a viewer (driver K in FIG. 4) through his or her eyes.

The head-up display 1132 having the above-mentioned configuration operates as follows.

The video projector 1042 first receives a video signal from the control unit 1200 via the video data signal line 1041 including cables and the like. The video projector 1042 then converts the video signal into light and projects it on the screen 1043. The screen 1043 reflects the light projected from the video projector 1042 toward the Fresnel mirror 1045. The Fresnel mirror 1045 further reflects the light toward the windshield 1044.

The windshield 1044 reflects the light reflected on the Fresnel mirror 1045 toward the driver K's visual point so as to form a virtual image visually recognizable from the driver K. The windshield 1044 provides this virtual image by superimposing it over the light entering the vehicle compartment from the front of the vehicle 1100 through the windshield 1044 itself.

In FIG. 1, the external storage unit 1207 includes such devices as a DVD (digital versatile disk), ROM (read only memory), and a hard disk. The external storage unit 1207 stores map data used for a navigation process and the like and display setup data used for display control of the head-up display 1132.

The map data records data about road shapes such as intersection names; names of constructs such as stores, buildings, stations, public offices, statues, and bridges; and geographical information about mountains and rivers.

On the other hand, as shown in FIG. 5, the display setup data maintains correspondence between the presentation information displayable on the head-up display 1132 and the display areas (default display positions) where the presentation information should be normally displayed. The center display area corresponds to highly important, caution-related presentation information such as "Obstacles." The respective display areas constituting the surrounding display area correspond to the other information such as "Traveling direction," "Virtual signboard," "Traffic signal," "Drive guide," "Congestion information," "Multimedia information," "Vehicle speed," and "Obstacles."

In the display setup data, each of the presentation information is also associated with user setup information that can be configured by a user freely. The user setup information includes necessity information to specify whether or not to display the presentation information and level information used for indicating and changing positions to display the presentation information. Though not shown, the user setup information also includes information to specify display timing, display continuation time, display image's shape, size, color, brightness, and the like.

The level information is configured according to information's levels of importance using numeric values −1 through 2. The smaller the numeric value is, the higher the level of importance becomes. The highest level of importance (level −1) is permanently assigned to the level information for the caution-related presentation information associated with the center display area.

There are provided a plurality of display setup data corresponding to drivers who drive the vehicle.

The operation section 1208 includes various pointing devices such as a touch panel, a keyboard, and the like. The operation section 1208 is used to input data when changing various instructions and setup information for the control unit 1200.

The control unit 1200 includes a microcomputer having a vehicle's CPU (central processing unit) 1203, memory 1202 including ROM, RAM, and the like, an input port 1201, an output port 1204, and the like.

The memory 1202 stores various programs executed by the CPU 1203 and various data needed to execute the programs.

The CPU 1203 performs an information collection process, i.e., collecting signals obtained from the information input section 1205 via the input port 1201 and storing them in the memory 1202. The CPU 1203 controls the information output section 1206 based on the information collected by the information collection process. In this manner, the CPU 1203 performs processes to realize various operation support functions such as a navigation process, an automatic operation control process, and an HUD display control process.

Specifically, the information collection process is performed as follows. The front radar 1101 supplies a driving course shape forward, positions and relative speeds of vehicles and obstacles. The rear radar 1103 supplies a driving course shape backward, positions and relative speeds of vehicles and obstacles. The vehicle speed sensor 1107 supplies a vehicle speed. The throttle sensor 1108 supplies a throttle angle. The brake hydraulic sensor 1109 supplies a brake oil pressure. The steering torque sensor 1110 supplies a steering torque. The steering angle sensor 1111 supplies a steering angle. The solar sensor 1112 supplies the surrounding brightness. The direction sensor 1114 supplies a vehicle direction. The supplied data are stored in the memory 1202.

The CPU 1203 is supplied with states of the lighting switch 1113a, the ignition switch 1113b, the wiper switch 1113c, the turn signal lamp switch 1113d, and the automatic operation switch 1115. The switch states are stored in the memory 1202. The state of the automatic operation switch 1115 is represented by a variable hereafter referred to as an automatic operation level. The variable value is set to 0 when the automatic operation switch 1115 is turned off; set to 1 for distance maintenance control to maintain the distance between vehicles; or set to 2 for distance and lane maintenance control to provide lane maintenance control in addition to the distance maintenance control.

The forward monitoring camera 1102 captures forward images. The sideward monitoring cameras 1105 and 1106 capture side images. The backward monitoring camera 1104 captures backward images. The GPS antenna 1116, the FM antenna 1117a, the telephone antenna 1117b, and the beacon reception element 1117c receive signals. From the received signals, the CPU 1203 obtains the current position, congestion information, and the like such as VICS (Vehicle Information and Communication System) information, and stores them in the memory 1202.

The navigation process is one of known processes to realize operation support functions and includes at least the following functions. The navigation process is supplied with the current position, the vehicle speed, the congestion information, and the like out of the information collected by the above-mentioned information collection process. Based on the supplied information, the navigation process reads map data near the current position from the external storage unit 1207 and displays the map data as well as a mark representing the own vehicle and the congestion information on the multi-display 1131. The route information can be also specified. In this case, when the vehicle approaches a predetermined guide point such as an intersection, the navigation process provides information about the guide point audibly using the speaker 1134 or visually using the multi-display 1131.

The automatic operation control process is a known process and operates as follows. Based on the information collected by the information collection process, the automatic operation control process obtains running circumstances of the vehicle and circumstances around it. According to settings of the automatic operation switch 1115, the automatic operation control process enables automatic operations for the throttle 1135, the brake 1136, the steering 1137 of the information output section 1206.

Figure 6:
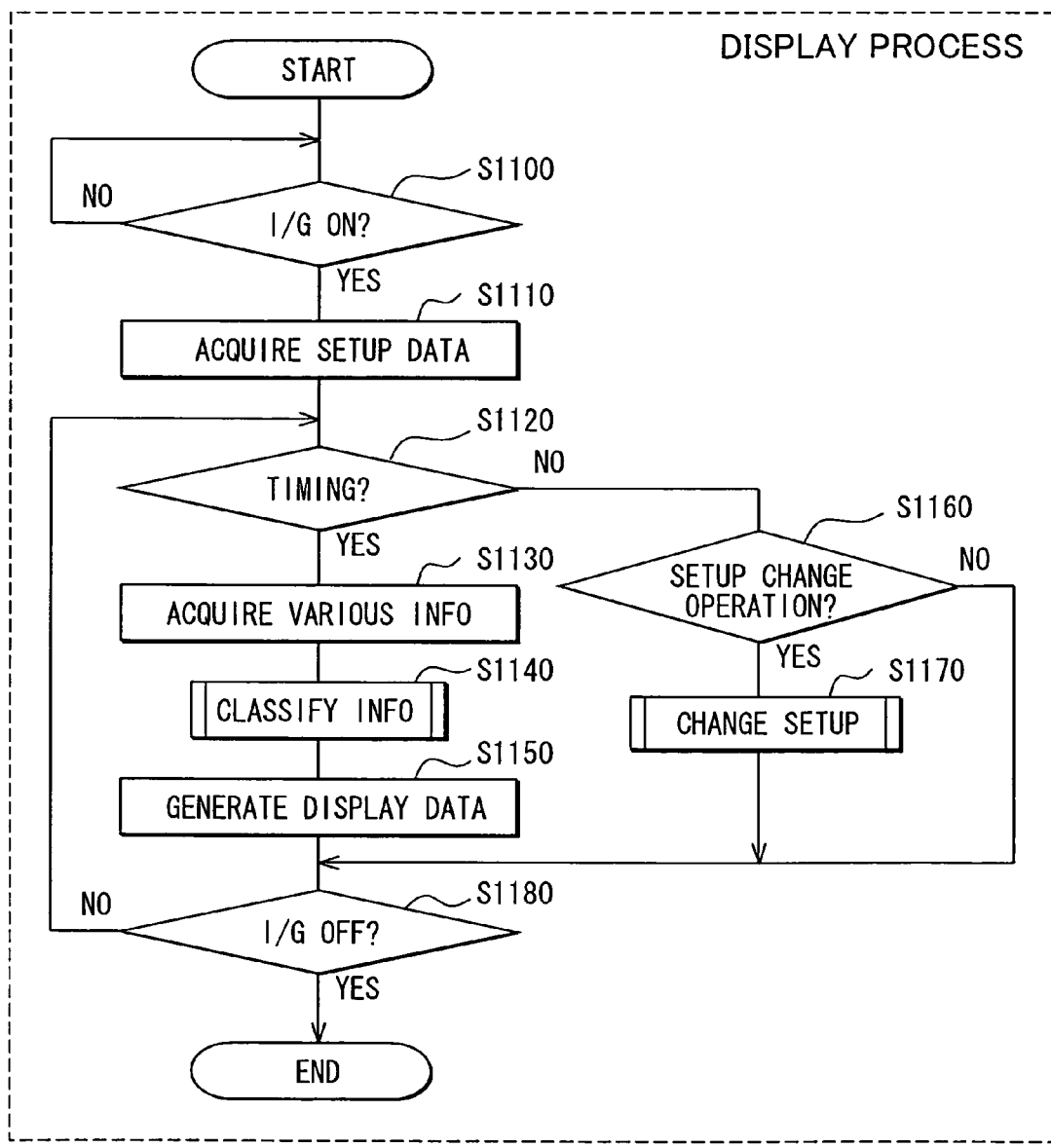
FIG. 6 is a flowchart showing the contents of an HUD display process.

After the information collection process collects information, the HUD display process displays the collected information on the head-up display 1132 using methods appropriate for varying circumstances. The HUD display process will be described in further detail with reference to the flowchart in FIG. 6.

When the process starts, it determines whether or not the vehicle's ignition switch 1113b is turned on (Step S100). If not turned on (i.e., turned off), the process waits until the ignition switch 1113b is turned on.

When the ignition switch 1113b is turned on, the process acquires display setup data about a predetermined driver from the external storage unit 1207 and stores that data in the memory 1202 (Step S1110). The predetermined driver may be specified as an initial value or may be the same as a driver selected when the ignition switch 1113b was turned off most recently.

The process then determines whether or not the timing is appropriate (e.g., a frequency of 30 Hz) for the display control (Step S1120). If the timing is appropriate for the display control, the process acquires such information from the memory 1202 as to determine various circumstances about the vehicle out of the information collected by the information collection process (Step S1130). The process further performs the information classification process based on the display setup data acquired at Step S1110 and the information acquired at Step S1130 to classify the information to be displayed on the head-up display 1132 (Step S1140). The main process generates display data so that respective information can be displayed at display positions according to the classification result of the information classification process. The generated display data is supplied to the head-up display 1132 (Step S1150). According to the supplied display data, the head-up display 1132 then displays various kinds of presentation information on the display areas disposed on the windshield 1044.

The process determines whether or not the ignition switch 1113 is turned off (Step S1180). If the ignition switch 1113 is turned off, the process terminates. If not turned off, the process returns to Step S1120.

If it is determined at Step S1120 that the timing is not appropriate for the display control, the process determines whether or not a setup change operation is performed (Step S1160). If no setup change operation is performed, the process proceeds to Step S1180. If a setup change operation is performed, the process performs a setup change process to change various settings according to the setup change operation (Step S1170), and then proceeds to Step S1180.

The setup change operation includes at least a data changeover operation and a data modification operation. The data changeover operation changes display setup data to be used from one to another. The data modification operation modifies the contents of user-specified data in the display setup data. Performing the data changeover operation makes it possible to freely select setup modification data used for the display control. Performing the data modification operation makes it possible to freely customize the contents of user-specified data in the setup modification data. In other words, it is possible to use the setup modification data customized for respective drivers.

Figure 7:
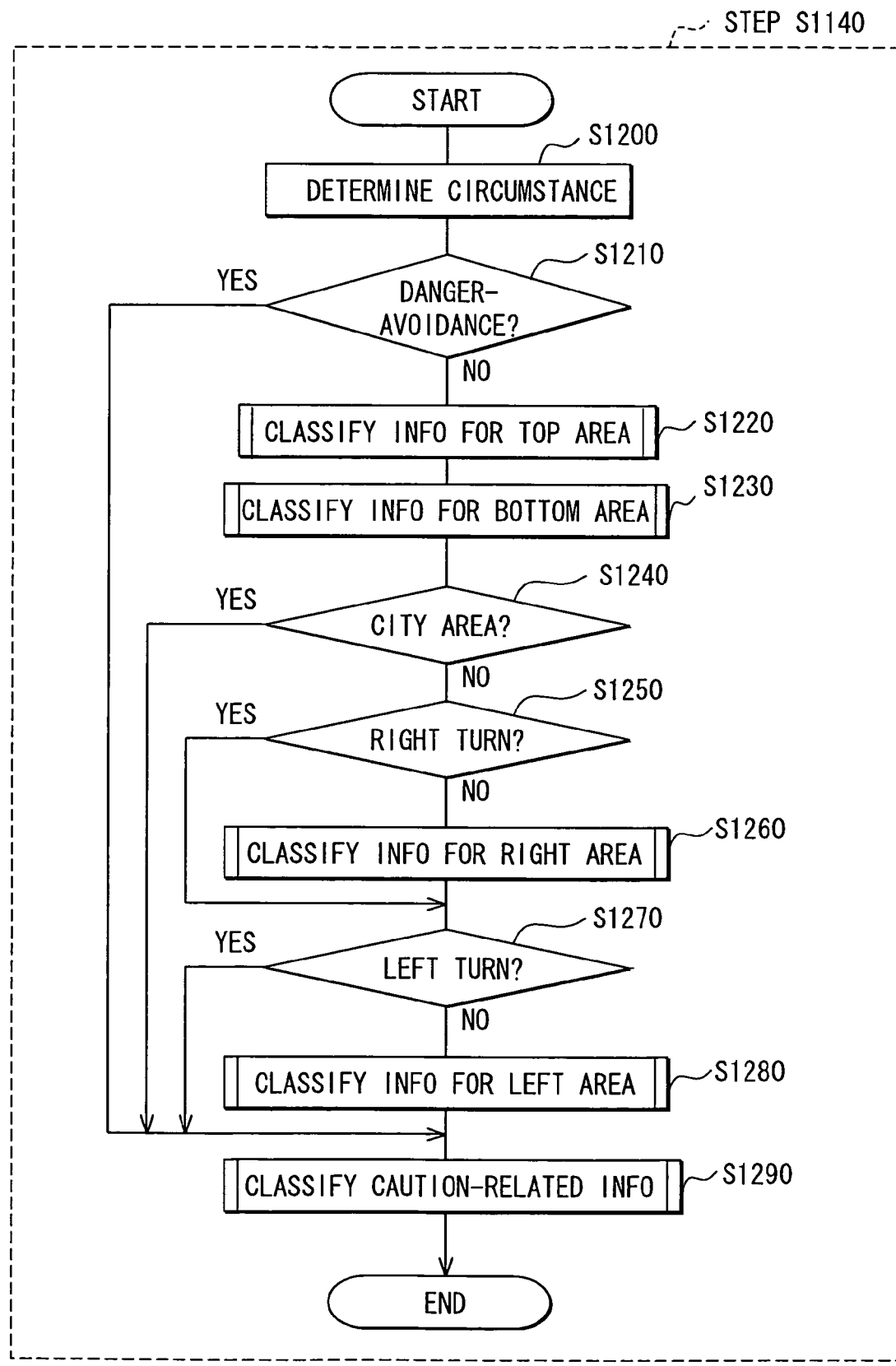
FIG. 7 is a flowchart showing the contents of an information classification process.

The presentation information classification process performed at Step S1140 will be described in further detail with reference to the flowchart in FIG. 7.

When started, the process performs a circumstance determination process based on the information acquired at Step S1130 to determine circumstances concerning the vehicle (Step S1200).

The circumstance determination process determines vehicle circumstances (operation states and various setup states) and circumstances around the vehicle. The vehicle circumstances to be determined include at least whether or not the vehicle is performing a danger-avoidance operation to avoid the danger, is running in a city area, is making a right or left turn, and is performing the automatic operation.

Specifically, the danger-avoidance operation is determined based on information collected from the vehicle speed sensor 1107, the throttle sensor 1108, the brake hydraulic sensor 1109, the steering torque sensor 1110, the steering angle sensor 1111, and the like. Whether or not to run in a city area is determined based on the information used for the navigation process or information acquired from the monitoring cameras 1102, 1104, 1105, and 1106. The operation to make a right or left turn is determined based on the setup information of the turn signal lamp switch 1113*d* and the information collected from the steering angle sensor 1111. Whether or not to perform the automatic operation (automatic operation level) is determined based on the setup information of the automatic operation switch 1115.

According to the determination result at Step S1200, the process determines whether or not the danger-avoidance operation is in progress. If the danger-avoidance operation is not in progress, the main process performs a process (Steps S1220 to S1280) for the presentation information in the surrounding display area (to be described later), and then proceeds to Step S1290. If the danger-avoidance operation is in progress, the main process proceeds to Step S1290 without performing the process (Steps S1220 to S1280). That is to say, while the danger-avoidance operation is in progress, the information to be displayed on the head-up display 1132 is restricted so that the driver can concentrate on driving.

The main process performs processes for the presentation information to be displayed on the surrounding display area as follows (Steps S1220 to S1280). In accordance with the contents of the display setup data, the main process performs a process to classify the presentation information to be displayed on the top display area (Step S1220). The main process then performs a process to classify the presentation information to be displayed on the bottom display area (Step S1230).

In accordance with the determination result at Step S1200, the main process determines whether or not the vehicle is running in the city area (Step S1240). If the vehicle is not running in the city area, the main process performs a process (Steps S1250 to S1280) for the presentation information to be displayed on the right display area and the left display area (to be described), and then proceeds to Step S1290. If the vehicle is running in the city area, the main process proceeds to Step S1290 without performing the process (Steps S1250 to S1280). That is to say, while running in city areas, it is necessary to visually recognize a wide range of road circumstances. Accordingly, consideration is taken to inhibit displays on the right display area and the left display area so as to be able to ensure the left and right visual fields.

In accordance with the determination result at Step S1200, the process for the right display area and the left display area (Steps S1250 to S1280) determines whether or not a right turn operation is performed (Step S1250). If no right turn operation is performed, the main process performs a process to classify the presentation information to be displayed on the right display area (Step S1260). If a right turn operation is performed, the main process proceeds to the next step to ensure the right visual field without performing the process at Step 1260.

At the next step, it is determined whether or not a left turn operation is performed (Step S1270). If no left turn operation is performed, the main process performs a process to classify the presentation information to be displayed on the left display area (Step S1280). If a left turn operation is performed, the main process proceeds to the next step to ensure the left visual field without performing the process at Step S1280.

At the next step, the main process performs a process to classify caution-related information to be displayed on the center display area (Step S1290) and then the process terminates.

That is to say, the caution-related information to be displayed in the center display area is displayed under any circumstances and is therefore classified as the display information that should be displayed. The presentation information to be displayed in the surrounding display area may or may not be displayed according to circumstances.

Specifically, if the determination result at Step S1210 is affirmative, all the presentation information to be displayed in the surrounding display area is classified as being hidden. If the determination result at Step S1240 is affirmative, the presentation information to be displayed in the right and left display areas is classified as being hidden. If the determination result at Step S1250 is affirmative, the presentation information to be displayed in the right display area is classified as being hidden. If the determination result at Step S1270 is affirmative, the presentation information to be displayed in the left display area is classified as being hidden.

Figure 8:
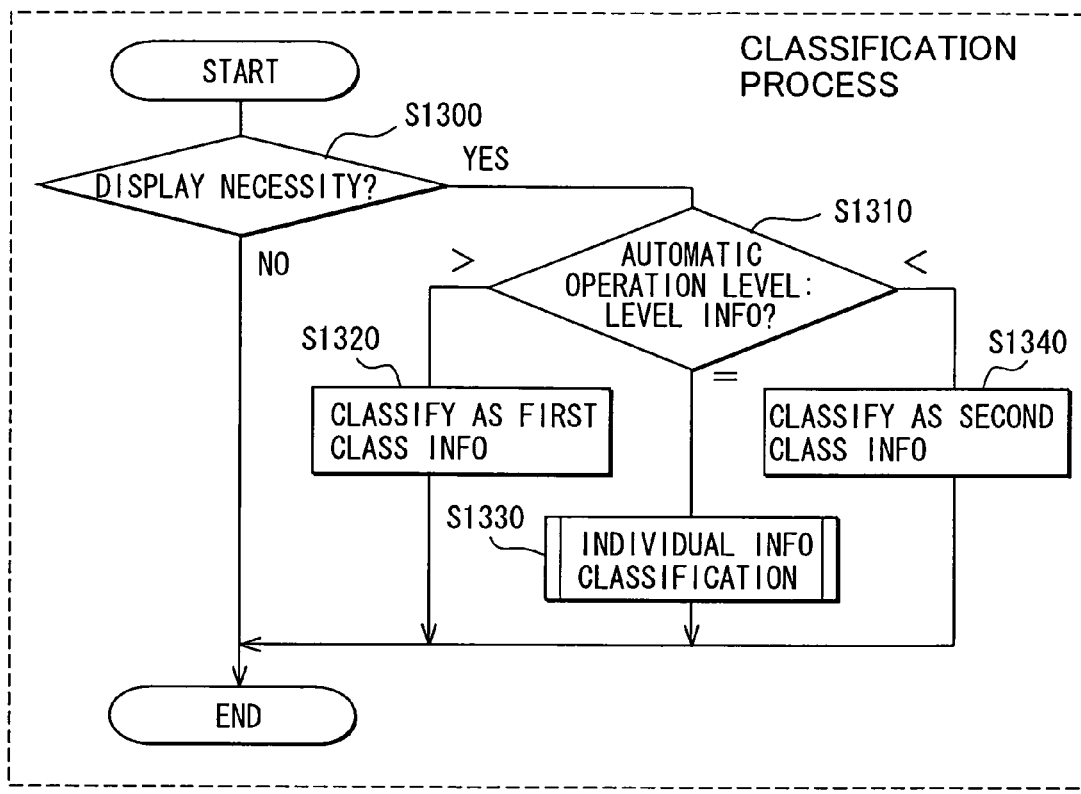
FIG. 8 is a flowchart showing the contents of a presentation information classification process.

The presentation information classification process for the top display area performed at Step S1220 will be described in further detail with reference to the flowchart in FIG. 8.

The process is individually performed for each of all the presentation information to be displayed in the top display area based on the display setup data.

When started, the process first determines whether or not the targeted presentation information needs to be displayed based on the display setup data (Step S1300). If the determination result represents "display not required", the process terminates. If the determination result represents "display required", the process compares the level information for the targeted presentation information with the automatic operation level specified by the setting of the automatic operation switch 1115 (Step S1310).

If the automatic operation level is greater than the level information, the process classifies the targeted presentation information as first class information (Step S1320), and then terminates. The first class information should be displayed in the center display area, not in the predetermined default display position (surrounding display area).

If the automatic operation level is smaller than the level information, the process classifies the targeted presentation information as second class information (Step S1340), and then terminates. The second class information should be displayed in the predetermined default display position (surrounding display area).

If the automatic operation level equals the level information, the process performs an individual information classification process (Step S1330), and then terminates. The individual information classification process classifies the targeted presentation information as the first class information or the second class information according to circumstances.

The individual information classification is provided with specific processes according to characteristics of each presentation information and will be exemplified in more detail below.

That is to say, the process classifies whether or not to display the presentation information based on the user setup information of the display setup data. When the presentation information is to be displayed, the process specifies the display position.

Specifically, when the automatic operation switch is turned off, the automatic operation level is set to 0. The presentation information with the display level set to 0 is displayed in the center display area (classified as the first class information) or in the surrounding display area (classified as the second class information) according to circumstances. The presentation information with the display level set to 1 or 2 is displayed in the surrounding display area (classified as the second class information) independently of circumstances.

When the automatic operation switch is enabled for the distance maintenance control, the automatic operation level is set to 1. The presentation information with the display level set to 0 is displayed in the center display area (classified as the first class information) independently of circumstances. The presentation information with the display level set to 1 is displayed in the center display area (classified as the first class information) or in the surrounding display area (classified as the second class information) according to circumstances. The presentation information with the display level set to 2 is displayed in the surrounding display area (classified as the second class information) independently of circumstances.

When the automatic operation switch is enabled for the distance and lane maintenance control, the automatic operation level is set to 2. The presentation information with the display level set to 0 or 1 is displayed in the center display area (classified as the first class information) independently of circumstances. The presentation information with the display level set to 2 is displayed in the center display area (classified as the first class information) or in the surrounding display area (classified as the second class information) according to circumstances.

As the degree of the automatic operation increases according to automatic operation levels, the center display area displays more presentation information.

The presentation information classification processes at Steps S1230, S1260, and S1280 are completely the same as the above-mentioned presentation information classification process for the top display area at Step S1220 except the display positions and the contents of the individual information classification, and a description is omitted. The caution-related presentation information classification process is performed at Step S1290. This process is configured to always display each caution-related information on the center display area (classified as the first class information) independently of circumstances.

Figure 9:
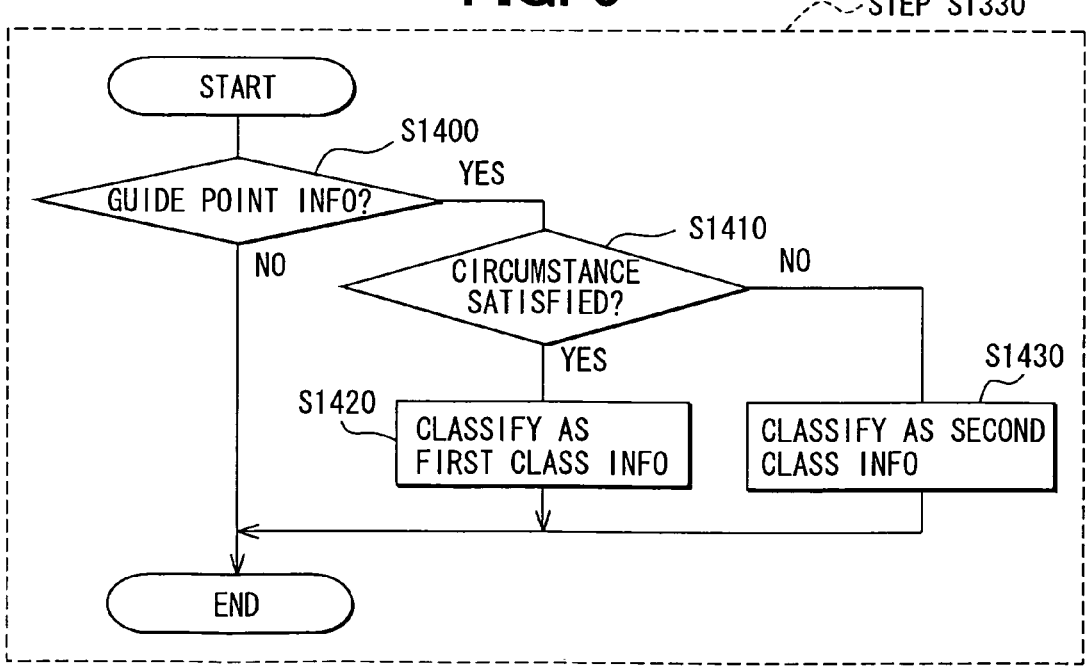
FIG. 9 is a flowchart showing the contents of an individual information classification process.

Next, suppose a case that the presentation information classification process is performed for the "Drive guide" information as the targeted presentation information. This information is displayed in the bottom display area by default. In this case, the individual information classification process performed at Step S1330 will be described in further detail with reference to the flowchart in FIG. 9.

When started, the process determines whether or not the guide point information is specified (Step S1400). The guide point information can be provided from the navigation process that is separately performed in the CPU 1203. If no guide point information is specified, the process terminates.

If the guide point information is specified, the process determines whether or not the current circumstance satisfies a guide condition configured for the guide point information (Step S1410). For example, let us assume that the guide point corresponds to an intersection and the guide point information guides a left turn at the intersection. In this case, for example, the guide condition specifies that the own vehicle is positioned within a predetermined distance range from the guide point (intersection). In addition, the guide condition specifies that the vehicle is running toward the guide point.

If the current circumstance satisfies the guide condition, the process classifies the presentation information as the first class information (Step S1420), and then terminates. Specifically, the "Drive guide" information is used as the presentation information and is superimposed over an actual landscape.

If the current circumstance does not satisfy the guide condition, the process classifies the presentation information as the second class information (Step S1430), and then terminates. Specifically, the "Drive guide" information is used as the presentation information and is simply displayed in the surrounding display area (bottom display area).

Figure 10:
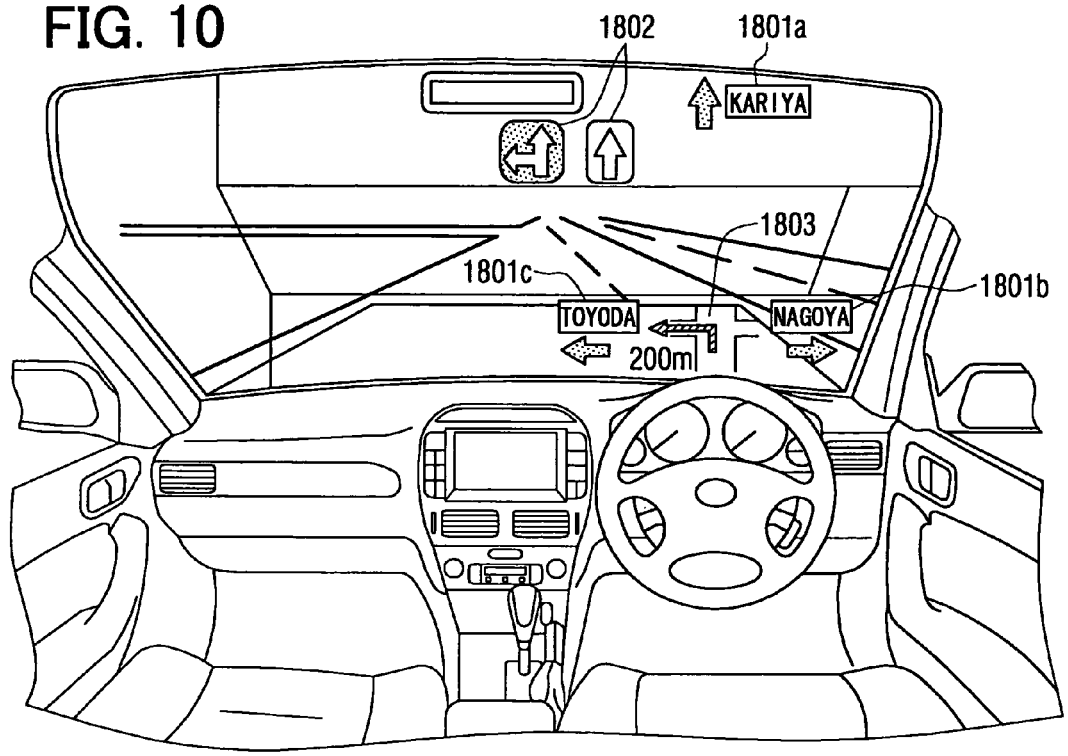
FIG. 10 is an explanatory diagram showing a display example of the head-up display.
Figure 11:
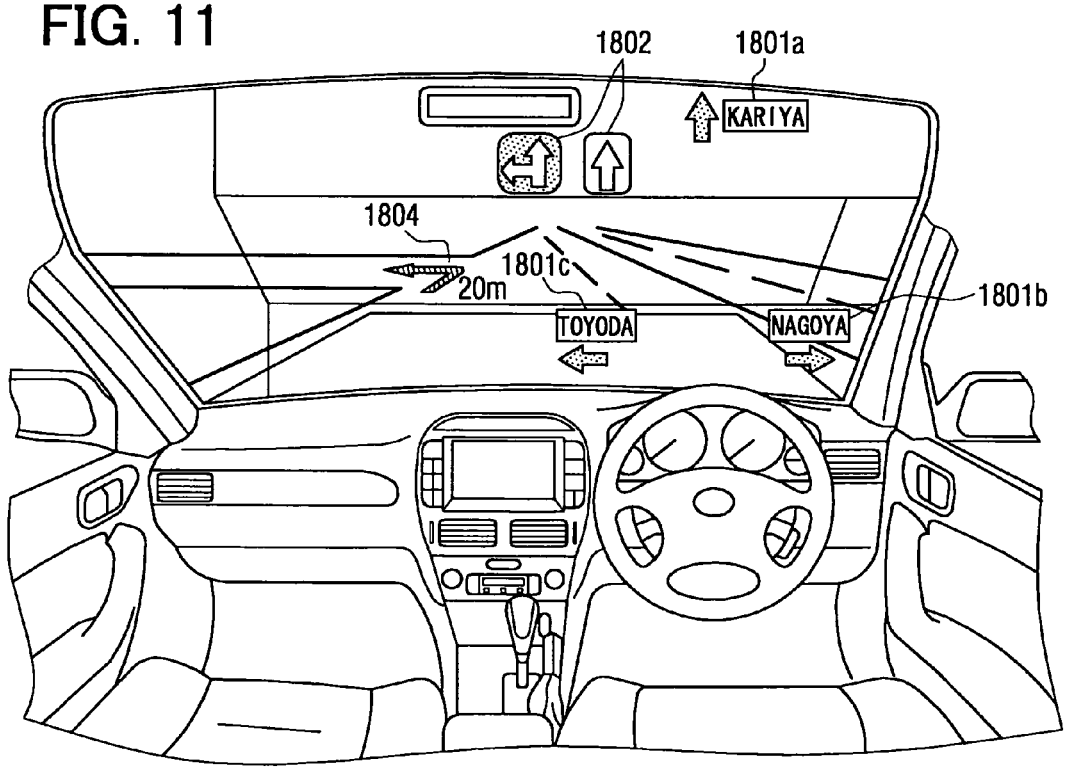
FIG. 11 is an explanatory diagram showing a display example of the head-up display.

FIGS. 10 and 11 are explanatory diagrams showing display examples of the head-up display 1132. FIG. 10 shows a display state when the guide condition is satisfied. FIG. 11 shows a display state when the guide condition is not satisfied.

In FIG. 10, the presentation information to be displayed is all classified as the second class information and is displayed in the surrounding display area only. The presentation information is displayed at corresponding positions 1801a, 1801b, 1801c, 1802, and 1803 specified in the display setup data. The positions 1801a, 1801b, and 1801c display the "Traveling direction" information that uses geographic names and arrows to indicate to which areas the vehicle's front, right, and left correspond. The position 1802 displays the "Virtual signboard" information that guides a lane to be selected. The position 1803 displays the "Drive guide" information (simplified display) including a map and arrows.

The driver need not recognize these pieces of information right now. The information will be or may be needed later on. The surrounding display area is used to display this type of presentation information. For this reason, the driver can perceive to which area he or she is directed, which lane should be selected, and at which point ahead a turn should be made. In addition, these presentation information do not hinder the visual field needed for driving operations.

In FIG. 11, the vehicle approaches an intersection as the guide point. Since the present circumstance satisfies the guide condition, the "Drive guide" information is classified as the first class information. A display 1804 (superimposed display) of the "Drive guide" information appears in the center display area. At this time, the display 1804 of the "Drive guide" information is represented by an arrow that indicates a direction to make a turn. The arrow is displayed so as to be superimposed on the intersection where a turn should be made. Therefore, the driver can promptly perceive the intersection and the direction for making the turn.

When the guide condition is satisfied, the example here provides the superimposed display (in the center display area) instead of the simplified display (in the surrounding display area) so far. It may be preferable to provide the superimposed display in addition to the simplified display.

Figure 12:
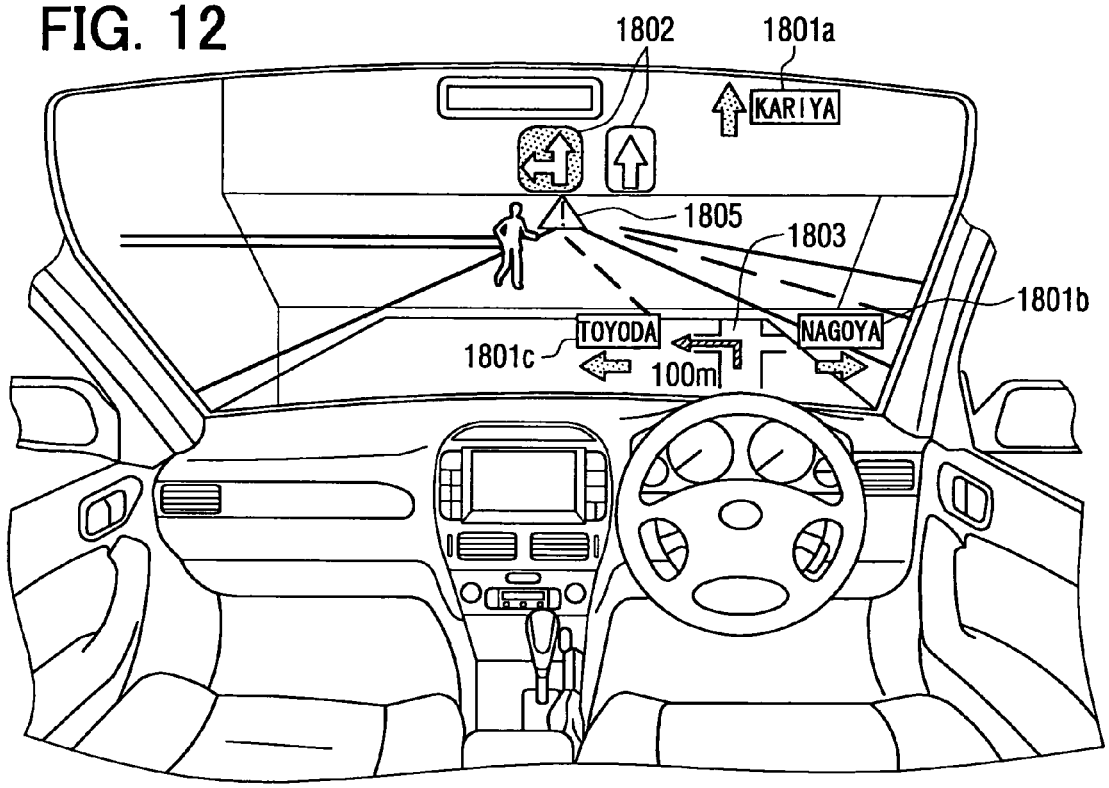
FIG. 12 is an explanatory diagram showing a display example of the head-up display.

FIG. 12 shows a state of the head-up display 1132 when detecting a passerby who comes rushing out on the road. Under this circumstance, the center display area displays "Obstacles" information 1805 as the caution-related information. The display 1805 of the "Obstacles" information is represented by a mark prompting an attention immediately near the obstacle (rushing-out passerby). Accordingly, the driver can immediately recognize obstacles and take prompt action against the dangerous circumstance.

Figure 13:
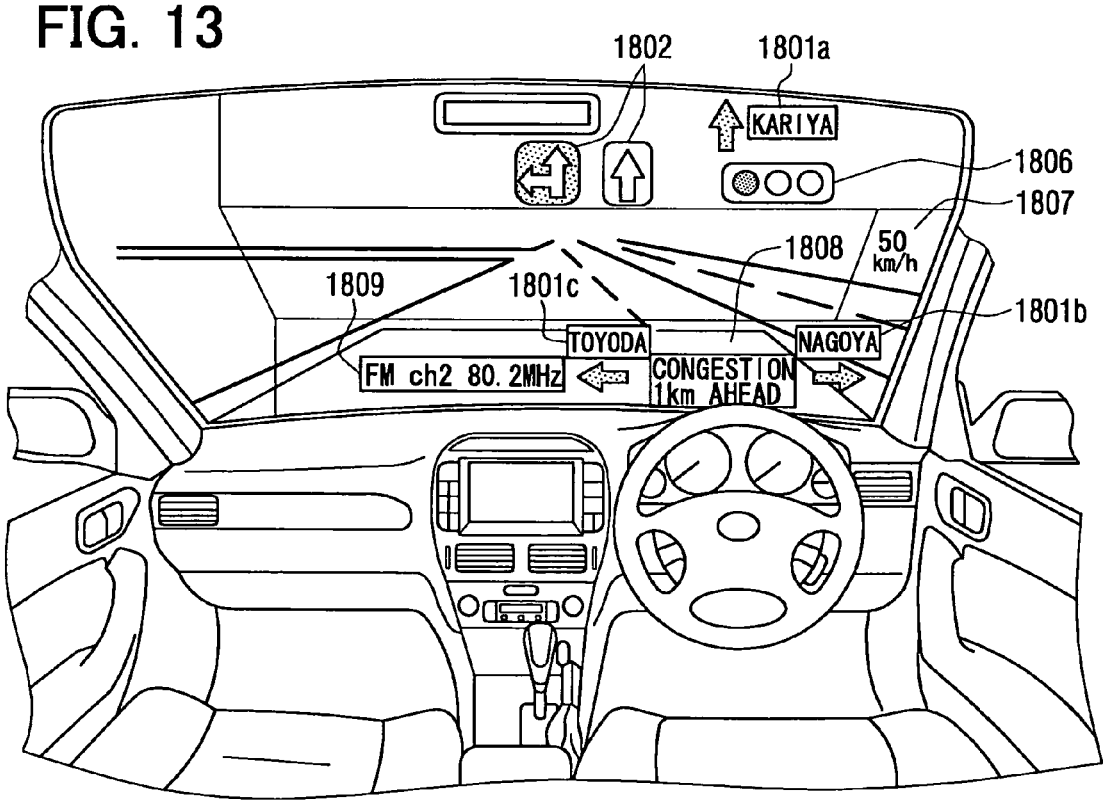
FIG. 13 is an explanatory diagram showing a display example of the head-up display.

FIG. 13 shows an example of the surrounding display area supplemented by a display 1806 of "Traffic signal" information, a display 1807 of "Vehicle speed" information, a display 1808 of "Congestion" information, and a display 1809 of "Multimedia" information.

A traffic signal ahead may be invisible or hardly visible due to front obstacles (e.g., buildings and a truck running forward) or external light. In such case, the display 1806 of the "Traffic signal" information can improve safety while the vehicle is running.

The display 1807 of "Vehicle speed" information, the display 1808 of "Congestion" information, and the display 1809 of "Multimedia" information can help the driver confirm necessary information with a small amount of sight line movement. It is possible to improve safety and amenity while the vehicle is running.

As mentioned above, the information display system according to the first embodiment controls whether or not to display the presentation information on the head-up display 1132 and controls the display positions. The system provides the control according to circumstances of the vehicle, its surroundings, and the driver who operates the vehicle. Accordingly, the system can safely and reliably allow the driver to visually recognize the information needed for the driver under any circumstances without hindering his or her visual field. It is possible to improve safety and amenity while the vehicle is running.

According to the first embodiment, the information classification process at Step S1200 (circumstance determination process) determines circumstances of the vehicle and its surroundings. Further, it may be preferable to add a driving day and time as one of the circumstances to be determined.

As depicted by a dotted line in FIG. 1, the vehicle compartment may be provided with an interior monitoring camera 1118 to capture a driver. Images can be acquired from the interior monitoring camera 1118 and can be processed (e.g., recognized) to perceive the driver's circumstance. It may be preferable to add the circumstance as one of the circumstances to be determined.

In this case, it is possible to determine the presence or absence of the right or left turn operation by means of not only operations of the turn signal lamp switch 1113d, but also the operations thereof and the driver's sight line.

According to the first embodiment, the HUD display process at Step S1170 (setup change process) allows a data changeover operation from the operation section 1208 to change the display setup data to be used. When the interior monitoring camera 1118 as mentioned above, it may be preferable to specify a driver from the captured image and change the display setup data to be used according to the specified result.

Figure 14:
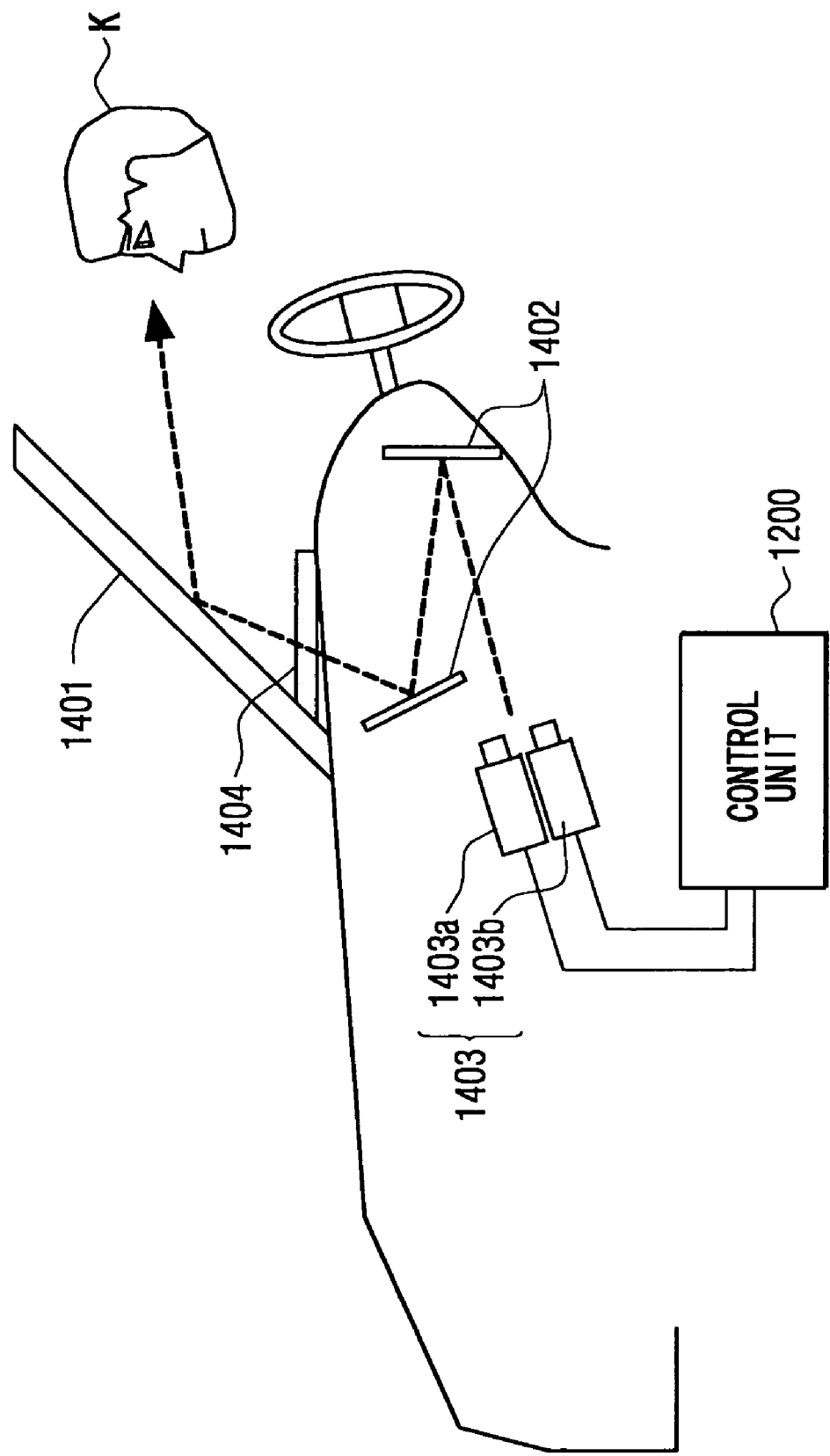
FIG. 14 is a pattern diagram showing another configuration example of the head-up display.
Figure 15:
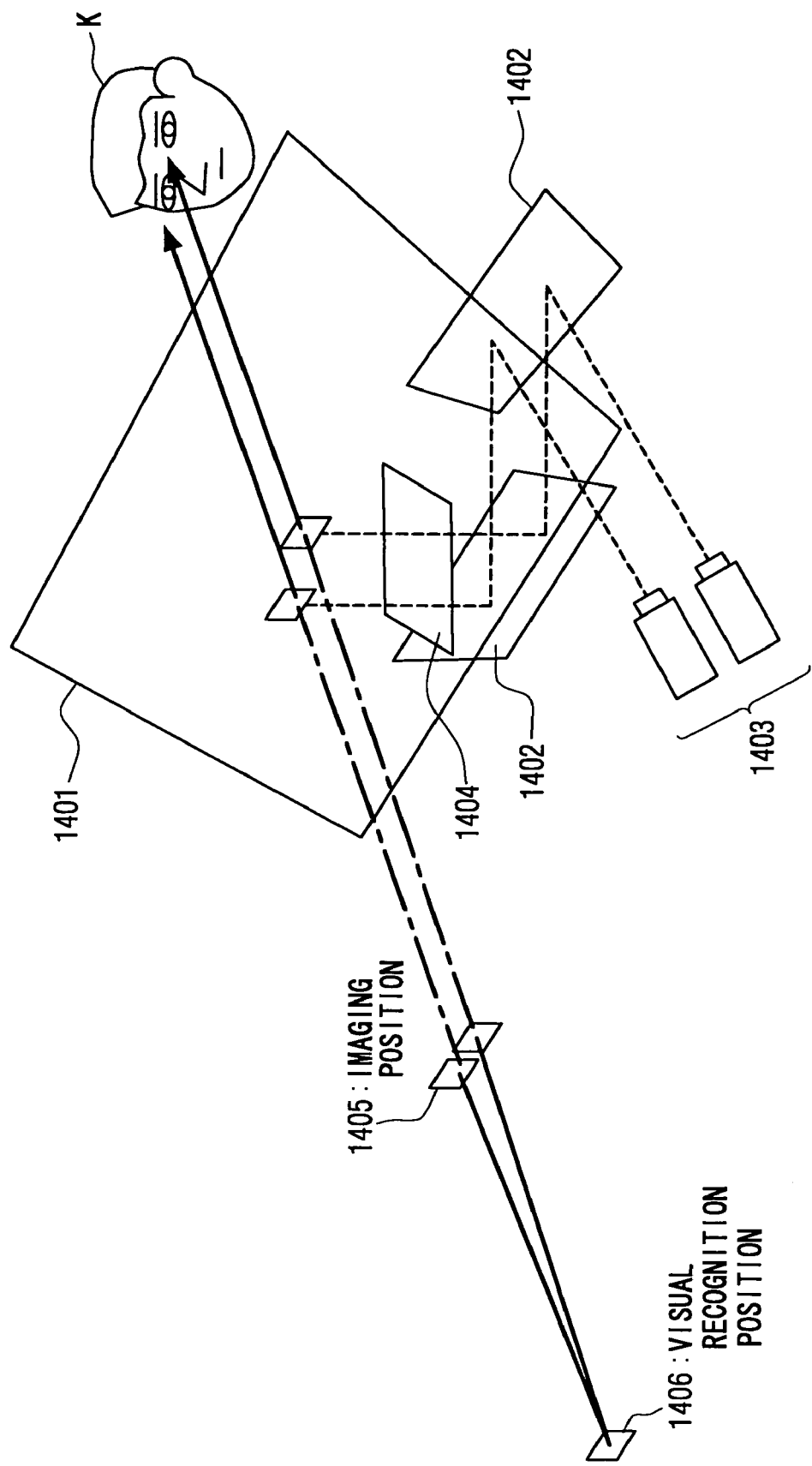
FIG. 15 is an explanatory diagram showing the principle of displaying a perspective image.

Further, instead of the head-up display 1132 described in the first embodiment, it may be preferable to use a head-up display 1132a capable of perspective display based on parallaxes. FIG. 14 is a pattern diagram showing the configuration of the head-up display 1132a. FIG. 15 is an explanatory diagram showing the principle of the display.

In this case, the head-up display 1132a includes a windshield 1401, a mirror 1402, a video projector 1403, and a condenser lens 1404. The video projector 1403 further includes a video projector 1403a for the right eye and a video projector 1403b for the left eye.

The control unit 1200 uses the HUD display process at Step S1150 to generate two pieces of display data having a parallax. The control unit 1200 supplies display data for the right eye to the video projector 1403a and display data for the left eye to the video projector 1403b. As a result, the video projector 1403a projects images for the right eye. The video projector 1403b projects images for the left eye.

The two images projected from the video projectors 1403a and 1403b enter the condenser lens 1404 via the mirror 1402. The condenser lens 1404 allows both incident images to be reflected on the windshield 1401. The reflected images converges as display images on the driver K's left and right eyes.

As shown in FIG. 15, both images are formed at an imaging position 1405 opposite the driver across the windshield 1401. The imaging position 1405 is defined as being apart from the windshield 1401 for a distance equal to an optical distance from the video projectors 1403a and 1403b to the windshield 1401. The driver can visually recognize a three-dimensional display at a visual recognition position 1406 corresponding to an intersecting point between two extended lines. One extended line is formed along a virtual line connecting the driver's right eye with the right-eye image formed at the imaging position 1405. The other extended line is formed along a virtual line connecting the driver's left eye with the left-eye image formed at the imaging position 1405.

That is to say, display data can be generated by appropriately controlling an interval between the right-eye image and the left-eye image. This can allow the driver K to visually recognize a perspective image due to the parallax.

Second Embodiment

First Example

Figure 16:
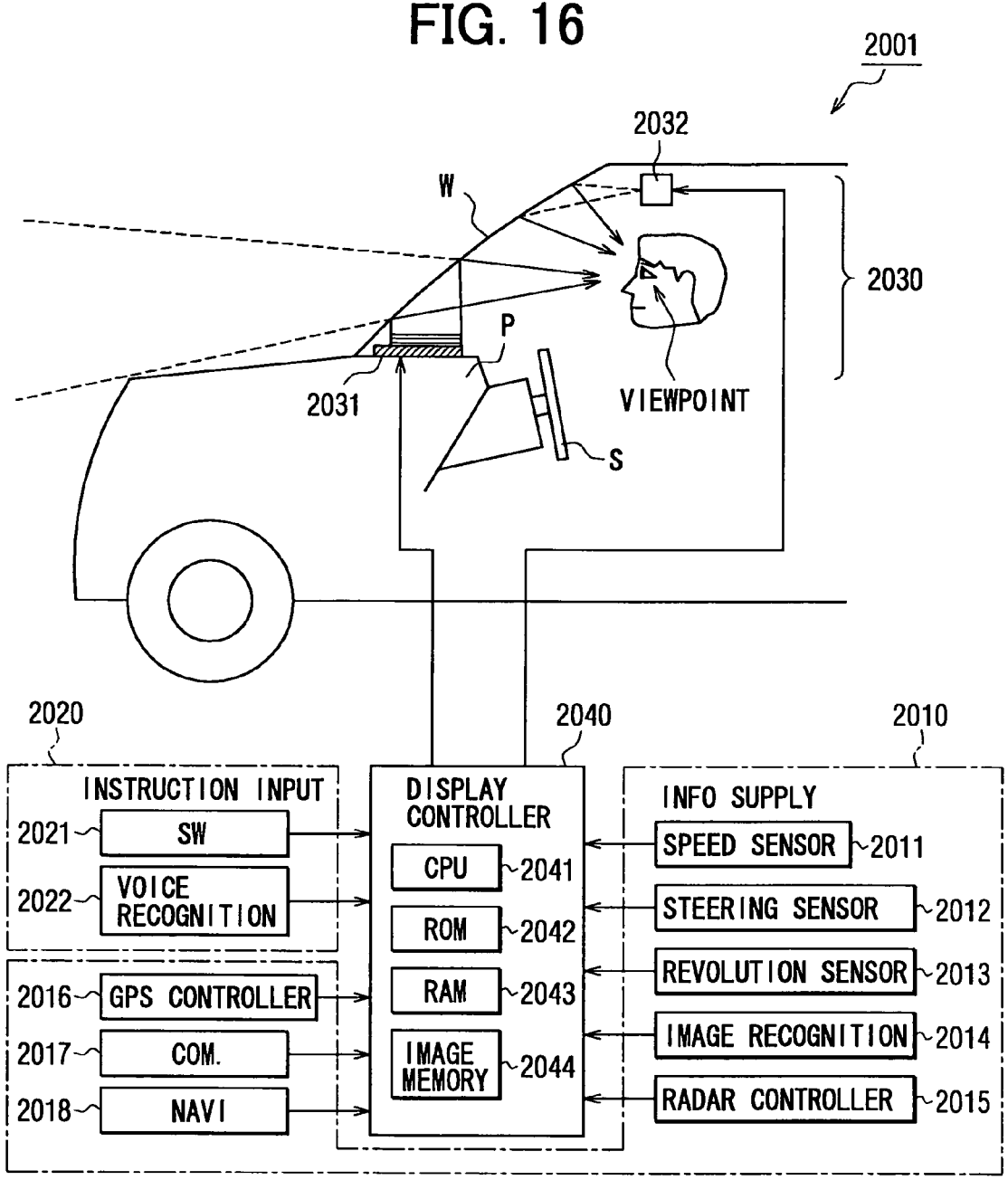
FIG. 16 is an explanatory diagram showing the configuration of a vehicle information display system of a first example according to a second embodiment of the present invention and the disposition of major parts of the system.

FIG. 16 is an explanatory diagram showing the configuration of a vehicle information display system according to a first example according to a second embodiment of the present invention and the disposition of major parts of the system.

As shown in FIG. 16, a vehicle information display system 2001 includes: an information supply section 2010 for functioning as a source to supply information about operation states of an own vehicle and circumstances around the own vehicle; an instruction input section 2020 for inputting instructions from the own vehicle's occupant; an information presentation section 2030 for displaying a video and projecting the displayed video on a windshield W; and a display controller 2040 for controlling videos displayed by the information presentation section 2030 based on information supplied from the information supply section 2010 and input instructions from the instruction input section 2020.

The information supply section 2010 further includes: a vehicle speed sensor 2011 for detecting own vehicle's speeds; a steering sensor 2012 for detecting own vehicle's steering angles; an engine speed sensor 2013 for detecting an engine's revolution speed; an image recognition apparatus 2014 for processing images from a camera (not shown) in front of the own vehicle, recognizing roads, preceding vehicles, obstacles, and the like, and finding a width of the recognized road, distances to the recognized objects (such as preceding vehicles and obstacles), and the like; a radar controller 2015 for sending and receiving radar waves (such as laser and radio waves) to find relative speeds and distances with respect to objects (such as preceding vehicles and obstacles) in front of the own vehicle; a GPS controller 2016 for receiving GPS (global positioning system) signals to find the own vehicle's position; a communication apparatus 2017 for acquiring road traffic information and the like by receiving FM broadcast and making radio communication with ground devices installed near roads; and a navigation apparatus 2018 for displaying a map around the own vehicle and the like.

The road traffic information acquired by the communication apparatus 2017 includes not only congestion information and various kinds of restriction information, but also information indicating traffic signal states.

The navigation apparatus 2018 is a known apparatus including a storage apparatus to store map data and having at least the following functions. That is to say, the navigation apparatus 2018 reads map data from the storage apparatus based on the positional information from the GPS controller 2016. The navigation apparatus 2018 uses a display screen (not shown) to display a mark representing the own vehicle, separately supplied route information, congestion information acquired via the communication apparatus 2017, and the like. Based on the route information, the navigation apparatus 2018 provides the route guidance by means of images and sound.

The map data stores data about road shapes, names of various buildings, names of intersections, geographic names, and the like associated with the positional data. The map data also contains lane information about each of a plurality of lanes if any. The lane information provides selectable directions at an intersection, for example.

The information presentation section 2030 includes: a liquid crystal (LC) panel 2031 which displays video in accordance with display data supplied from the display controller 2040 and is disposed on an instrument panel P in a vehicle compartment so that the displayed video is projected on the bottom of a windshield W; and a projector 2032 which likewise displays a video in accordance with display data supplied from the display controller 2040 and is disposed at a roof in the vehicle compartment so that the displayed video is projected on the top of the windshield W.

Figure 17:
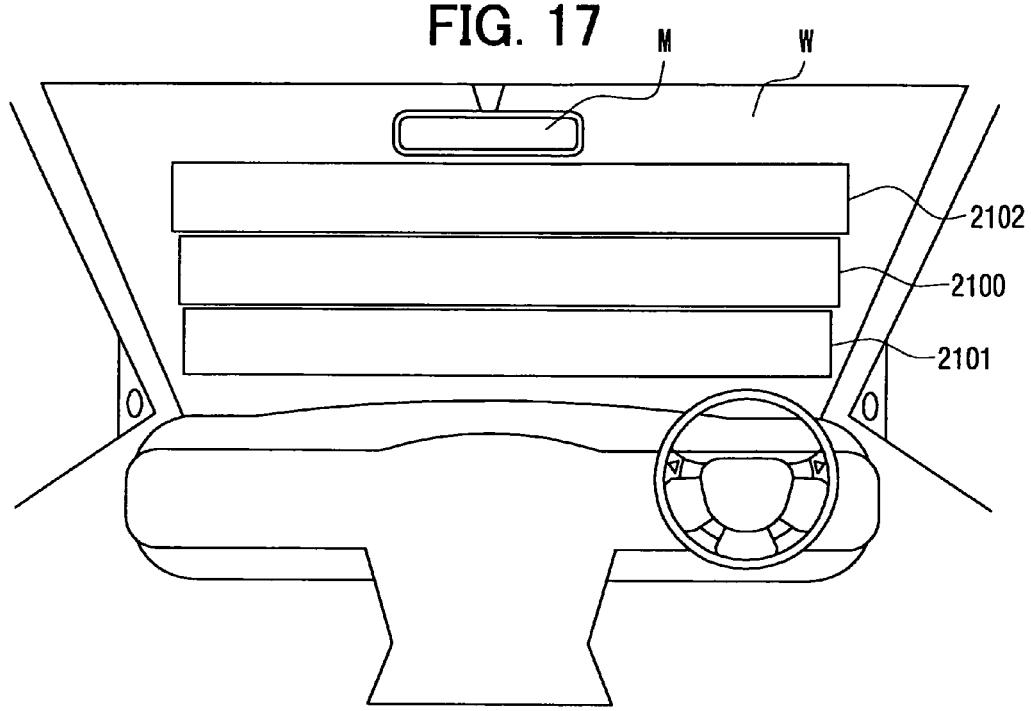
FIG. 17 is an explanatory diagram showing a setting example of display areas on a windshield.

As shown in FIG. 17, it is assumed that a visual field area 2100 is used for a visual field needed for a driver to confirm traffic circumstances. A video displayed from the liquid crystal panel 2031 is projected on a bottom area 2101 below the visual field area 2100. A video displayed from the projector 2032 is projected on a top area 2102 above the visual field area 2100 below an inside rear view mirror M. The visual field area 2100 is configured to include at least test area A as specified in JIS standard R3212.

That is to say, a vehicle's occupant does not directly view a video displayed from the liquid crystal panel 2031 or the projector 2032. The video is projected on the windshield W and is reflected thereon to produce a virtual image or a reflected image. The occupant visually recognizes this image.

The instruction input section 2020 includes: a switch 2021 which is mounted near a steering wheel S (or a position to provide a driver with easy access) and is used to enter instructions for permitting or inhibiting display of videos on the windshield W; and a voice recognition apparatus 2022 which has a microphone (not shown) to collect voice uttered by a vehicle's occupant, performs voice recognition for the collected voice, and notifies the display controller 2040 of a match, if any, between the recognition result and a predetermined reserved word. Available reserved words include types of information displayed on the windshield W such as "Lane information," "Vehicle information," "Route guide," and "Traffic signal." The display controller 2040 mainly includes a known microcomputer composed of a CPU 2041, ROM 2042, and RAM 2043. The display controller has image memory 2044 for storing display data supplied to the liquid crystal panel 2031 and the projector 2032.

Figure 18:
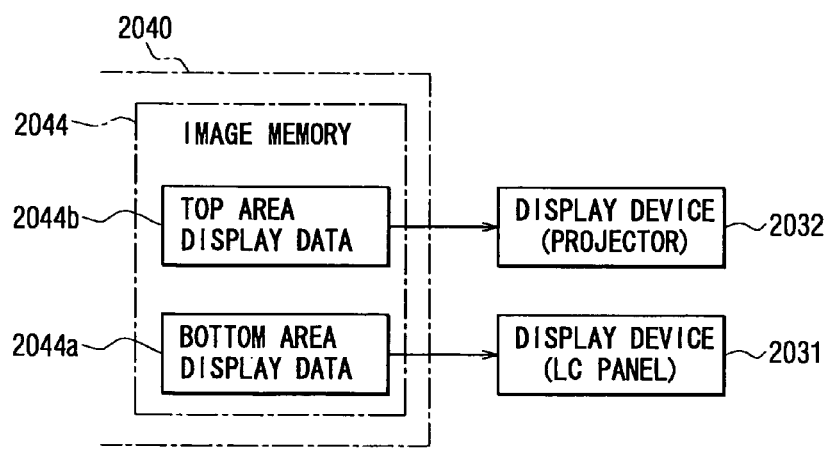
FIG. 18 is a block diagram showing relationship between a display controller and an information presentation section.

As shown in FIG. 18, the image memory 2044 is allocated with: an area 2044a for storing display data displayed on the bottom area 2101; and an area 2044b for storing display data displayed on the top area 2102. Display data stored in the area 2044a is hereafter referred to as "bottom area display data" and is supplied to the liquid crystal panel 2031. Display data stored in the area 2044b is hereafter referred to as "top area display data" and is supplied to the projector 2032.

The CPU 2041 constituting the display controller 2040 functions as follows. An ignition switch is turned on and the switch 2021 is operated to input an instruction for permitting display on the windshield W. When the voice recognition apparatus 2022 recognizes a reserved word in this state, the CPU 2041 performs processes for displaying information corresponding to reserved words on the windshield W.

When "Lane information" is recognized as a reserved word, the CPU performs a lane information display process. As shown in FIG. 19, this process displays a video 2051 on a top area 2102. The video 2051 is hereafter referred to as a "virtual signboard" which indicates selectable directions at the next intersection for each lane. When "Vehicle information" is recognized as a reserved word, the CPU performs a vehicle information display process. This process displays a video 2052 on a bottom area 2101. The video 2052 uses numbers and graduations to represent vehicle speed information from the vehicle speed sensor 2011 and engine revolution speed information from the engine speed sensor 2013. When "Route guide" is recognized as a reserved word, the CPU performs a route guide display process. This process displays a video 2053 on the bottom area 2101. When the vehicle approaches a guide point along the route predetermined by the navigation apparatus 2018, the video 2053 uses letters, numbers, and symbols to represent a distance to the guide point and the guide content. When "Traffic signal" is recognized as a reserved word, the CPU performs a traffic signal display process. This process displays a traffic signal video (not shown) on the top area 2102 based on the road traffic information acquired from the communication apparatus 2017.

Figure 20:
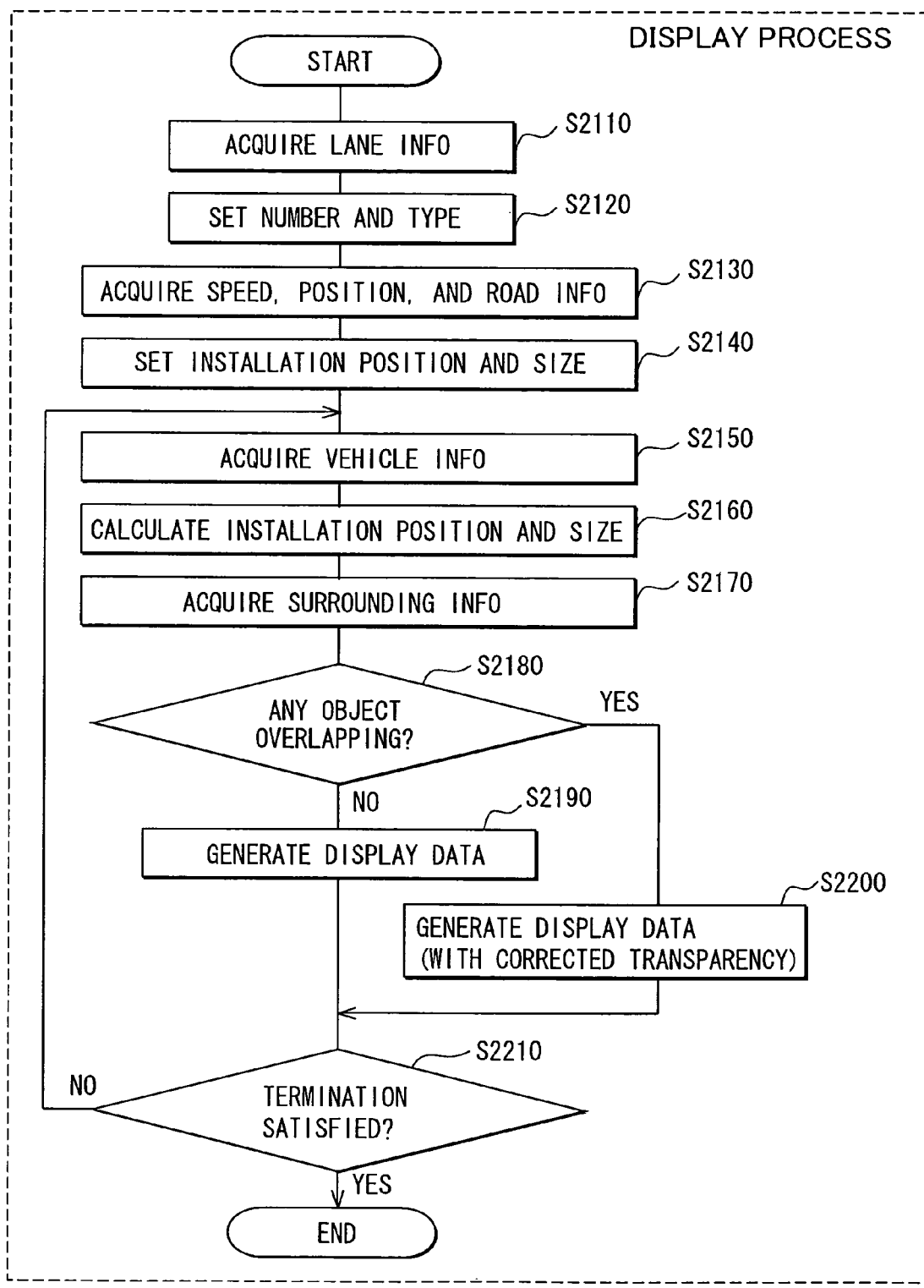
FIG. 20 is a flowchart showing the contents of a lane information display process.

Of the above-mentioned display processes, the lane information display process will be described in further detail with reference to a flowchart in FIG. 20.

When started, the process acquires lane information about a currently traveled road from the navigation apparatus 2018 (Step S2110). The lane information includes the number of lanes and the information about each lane such as selectable directions at the next intersection and the lane width. Based on the acquired lane information, the process selects the number of signboards to be displayed and signboard types such as straight, right turn, left turn, straight or right turn, and straight or left turn (Step S2120).

The process then acquires vehicle speed information from the vehicle speed sensor 2011 and road information representing a road shape and positional information representing the current position from the navigation apparatus 2018 (Step S2130). Based on the acquired information, the process determines a virtual installation position and a size of the virtual signboard (Step S2140).

The display position is configured so that accelerating the vehicle speed extends a distance to the virtual installation position of the virtual signboard and increases the size of the virtual signboard. Specifically, the distance to the virtual installation position is configured so that the time to reach the virtual installation position remains approximately constant. At this time, it is assumed that the vehicle is running at the current speed constantly. The virtual signboard size is configured so that an initially displayed size remains approximately constant independently of the vehicle speed (the distance to the virtual installation position).

The process then acquires speed information from the vehicle speed sensor 2011, steering angle information from the steering sensor 2012, and road information and positional information from the navigation apparatus 2018 (Step S2150). The process calculates the display position and the display size of the virtual signboard based on the acquired information and the values determined at Step S2140 above (Step S2160). Specifically, the process calculates the own vehicle's position and traveling direction based on the vehicle speed information and the steering angle information. Based on the calculated value, the process determines how the virtual signboard is viewed at the virtual installation position to find the virtual signboard's display position and size.

The process then acquires surrounding information (object position and size) from the image recognition apparatus 2014 (Step S2170). The surrounding information concerns objects in the foreground visually recognized through the windshield W. The acquired surrounding information is used to specify an object. The process determines whether or not the specified object is an obstacle or the like which should be recognized by the driver and whether or not the object is positioned so as to be superimposed on the virtual signboard (Step S2180).

If the determination result is negative at Step S2180, the process generates display data in accordance with the virtual signboard's display position and size found at Step S2160. This display data is used to display a virtual signboard video from the projector 2032. The process writes the generated display data in the area 2044*b* of the image memory 2044 (Step S2190). When the determination result is affirmative at Step S2180, the process generates display data, being similar to that generated at Step S2190, with its video brightness corrected so as to increase the video transparency. The process writes the generated display data in the area 2044*b* of the image memory 2044 (Step S2200).

The process at Steps S2190 and S2200 repeatedly supplies the projector 2032 with the data written in the area 2044*b* of the image memory 2044. In this manner, the top area 2102 of the windshield W displays the virtual signboard video.

The windshield W is curved, not flat, and has different curvatures depending on positions. The process at Steps S2190 and S2200 also provides a function to correct the display data depending on display positions (projection positions on the windshield W) to prevent the projected video from being deformed.

The process determines whether or not a condition to terminate the virtual signboard display is satisfied (Step S2210). In this case, the process determines whether or not the own vehicle passes through the virtual signboard's virtual installation position. When the termination condition is not satisfied, the process returns to Step S2150 and repeatedly updates the display data as needed based on the information from the information supply section 2010. When the termination condition is satisfied, the process terminates.

Having the above-mentioned configuration, the vehicle information display system 2001 according to the first example operates as follows. The ignition switch is turned on and the switch 2021 is set to enable displays on the windshield W. When a vehicle's occupant utters "Lane information" in this state, the system displays the virtual signboard 2051 on the top of each lane viewed in the foreground through the windshield W as shown in FIG. 19. The virtual signboard 2051 represents the information about the corresponding lane.

FIG. 19 shows that the vehicle is running in the middle of a 3-lane road 300 meters short of the intersection (guide point) defined to make a left turn according to the route setting. The windshield W displays the lane information, the vehicle information, and the route guide information. In FIG. 19, the inside rear view mirror M is omitted for simplicity of illustration.

As mentioned above, the vehicle information display system 2001 according to the first example is configured to display information not only on the bottom area 2101, but also on the top area 2102. Accordingly, the HUD can be used to display much information without hindering the driver's visual field.

The first example uses the signboard video (virtual signboard) 2051 to display the lane information. The virtual signboard 2051 is controlled with respect to its display position and display size depending on vehicle's running circumstances such as running speed, road width, and road curve. The virtual signboard 2051 is displayed so as to be fixed to a virtual installation position, i.e., as if it were an ordinary road sign. Accordingly, the driver can visually recognize the virtual signboard without uncomfortable feeling as if he or she looked at an ordinary signboard and the like indicating road signs. Since there is no need to pay special attention, the driver can accept the information safely.

The first example configures the top area 2102 between the visual field area 2100 and the inside rear view mirror M. Further, as shown in FIG. 21, the top area 2102 may include areas at both ends of the inside rear view mirror M.

In this case, it is desirable to adjust the display data or an area to which the projector 2032 projects videos so that videos are not projected on part of the visual field obstructed by the inside rear view mirror M.

In the first example, the information presentation section 2030 is equivalent to video display means and projection means. The switch 2021 is equivalent to input means. The image recognition apparatus 2014 is equivalent to external circumstance detection means. Steps S2180 to S2200 are equivalent to adjustment means. The information supply section 2010 is equivalent to information collection means.

Second Example

A second example differs from the first example only in part of the configuration of the information presentation section 2030a and the display controller 2040a. The following chiefly describes these differences.

In the vehicle information display system 2001a according to the second example, as shown in FIG. 22, an information presentation section 2030a includes: a display device (e.g., a liquid crystal panel) 2031 which displays videos to be projected on the windshield W; a half mirror 2033 which reflects and transmits a video (light from the display device 2031) displayed on the display device 2031 for branching in two directions; a reflective optical element 2034 which reflects a video reflected on the half mirror 2033 and projects it on the bottom area 2101 of the windshield W; a reflective optical element 2035 which reflects a video passing through the half mirror 2033 and projects it on the top area 2102 of the windshield W; a liquid crystal shutter 2036 provided on a path from the half mirror 2033 to the reflective optical element 2034; and a liquid crystal shutter 2037 provided on a path from the half mirror 2033 to the reflective optical element 2035.

These components constituting the information presentation section 2030a are stored in a recess formed on the instrument panel P. The parts other than the information presentation section 2030a are omitted from FIG. 22.

The liquid crystal shutters 2036 and 2037 are driven by a single drive signal and are configured to operate complementarily. That is to say, when one shutter turns on (to transmit the light), the other turns off (to block off the light).

In the information presentation section 2030a having this configuration, a video displayed by the display device 2031 is projected on the bottom area 2101 when the liquid crystal shutter 2036 turns on (the liquid crystal shutter 2037 turns off). The video is projected on the top area 2102 when the liquid crystal shutter 2037 turns on (the liquid crystal shutter 2036 turns off).

As shown in FIG. 23A, the display controller 2040a includes a data synthesis section 2045 in addition to the CPU 2041, the ROM 2042, the RAM 2043, and the image memory 2044 that are configured similarly to the first example.

The data synthesis section 2045 generates time division multiplexed data from bottom area display data and top area display data. The bottom area display data is stored in the area 2044a of the image memory 2044. The top area display data is stored in the area 2044b thereof. The data synthesis section 2045 supplies the display device 2031 with the multiplexed display data. The data synthesis section 2045 also supplies the liquid crystal shutters 2036 and 2037 with a drive signal whose signal levels changes synchronously with the multiplexing.

Having this configuration, the vehicle information display system 2001a according to the second example operates as follows. When a video displayed on the display device 2031 corresponds to the bottom area display data, the liquid crystal shutter 2036 turns on to project the video on the bottom area 2101 of the windshield W. When a video displayed on the display device 2031 corresponds to the top area display data, the liquid crystal shutter 2037 turns on to project the video on the top area 2102 of the windshield W.

The second example is configured to be able to project videos displayed from the single display device 2031 on any of the bottom area 2101 and the top area 2102 by changing the projection paths for videos.

In the vehicle information display system 2001a according to the second example, the information presentation section 2030a includes the single display device 2031. Compared to the first example, it is possible to save manufacturing costs of the information presentation section 2030a and reduce an installation space on the vehicle.

Third Example

Like the second example, a third example differs from the first example only in part of the configuration of the information presentation section 2030b and the display controller 2040b. The following chiefly describes these differences.

Figure 24:
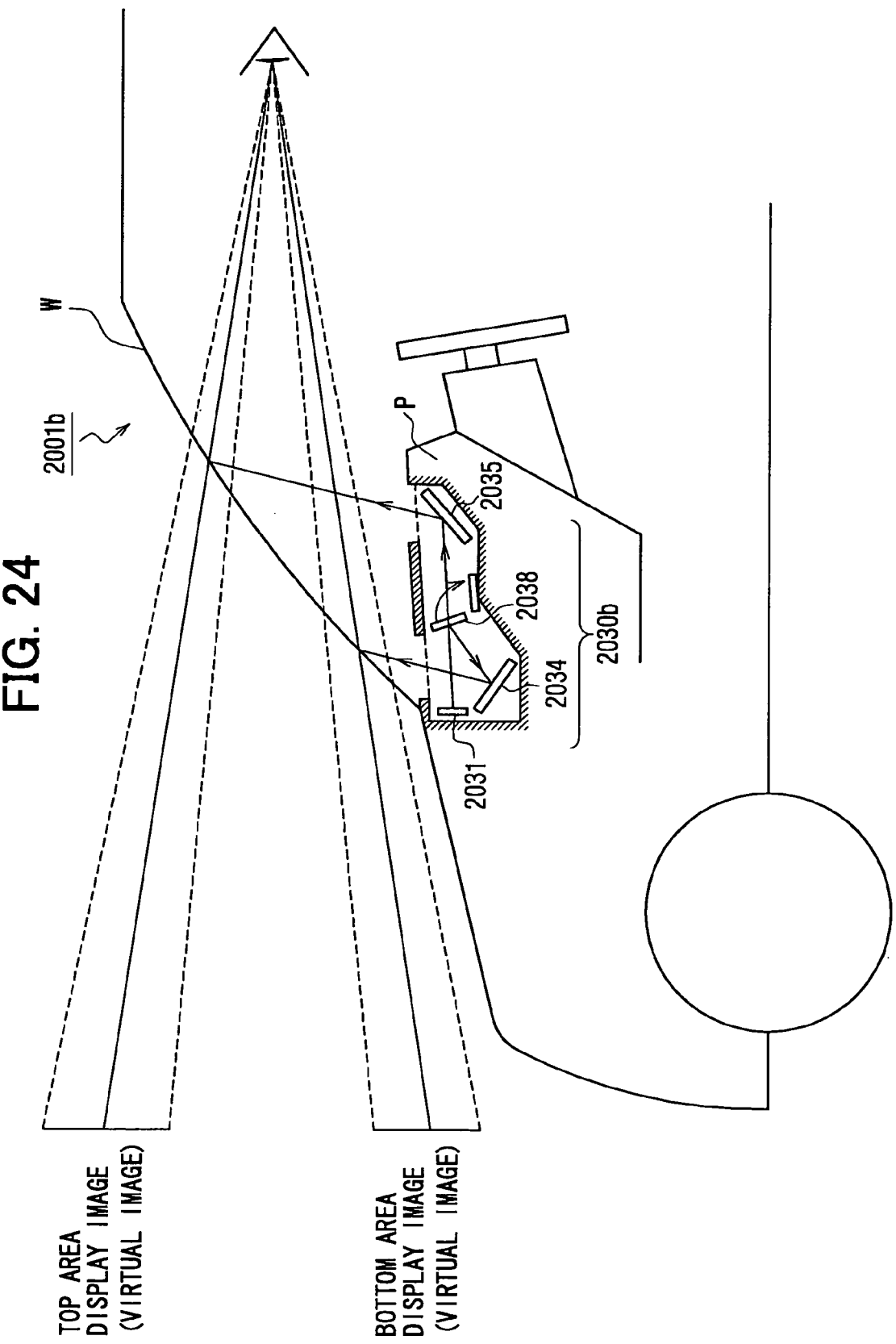
FIG. 24 is an explanatory diagram showing the configuration of the information presentation section of the third example.

In a vehicle information display system 2001b according to the third example, as shown in FIG. 24, an information presentation section 2030b includes: a display device (e.g., a liquid crystal panel) 2031 which displays videos to be projected on the windshield W; the reflective optical element 2035 which reflects a video (light from the display device 2031) displayed from the display device 2031 and projects it on the top area 2102 of the windshield W; a movable reflector 2038 maintained to either a block-off position to obstruct a path from the display device 2031 to the reflective optical element 2035 or a pass-through position deviating from the path in accordance with drive signals from the display controller 2040a; and the reflective optical element 2034 which re-reflects the video reflected on the movable reflector 2038 maintained to the block-off position and projects the video on the bottom area 2101 of the windshield W. That is to say, the information presentation section 2030b is configured to omit the liquid crystal shutters 2036 and 2037 from the information presentation section 2030b of the second example and provide the movable reflector 2038 instead of the half mirror 2033.

Like the second example, these components constituting the information presentation section 2030b are stored in the recess formed on the instrument panel P. The parts other than the information presentation section 2030b are omitted from FIG. 24.

In the information presentation section 2030b having this configuration, a video displayed from the display device 2031 is projected on the bottom area 2101 when the movable reflector 2038 maintained at the block-off position. That video is projected on the top area 2102 when the movable reflector 2038 is maintained at the pass-through position.

As shown in FIG. 23B, the display controller 2040b includes a data synthesis section 2046 in addition to the CPU 2041, the ROM 2042, the RAM 2043, and the image memory 2044 that are configured similarly to the first example.

The data synthesis section 2046 generates time division multiplexed data from bottom area display data and top area display data. The bottom area display data is stored in the area 2044a of the image memory 2044. The top area display data is stored in the area 2044b thereof. The data synthesis section 2045 supplies the display device 2031 with the multiplexed display data. The data synthesis section 2045 also supplies the movable reflector 2038 with a drive signal whose signal levels changes synchronously with the multiplexing.

Having this configuration, the vehicle information display system 2001b according to the second example operates as follows. When a video displayed on the display device 2031 corresponds to the bottom area display data, the movable reflector 2038 is maintained at the block-off position to project the video on the bottom area 2101 of the windshield W. When a video displayed on the display device 2031 corresponds to the top area display data, the movable reflector 2038 is maintained at the pass-through position to project the video on the top area 2102 of the windshield W.

Like the second example, the third example is configured to be able to project videos displayed from the single display device 2031 on any of the bottom area 2101 and the top area 2102 by changing the projection paths for videos. It is possible to provide the same effect as that of the second example.

Fourth Example

Like the second example, a fourth example differs from the first example only in part of the configuration of the information presentation section 2030c and the display controller 2040c. The following chiefly describes these differences.

Figure 25:
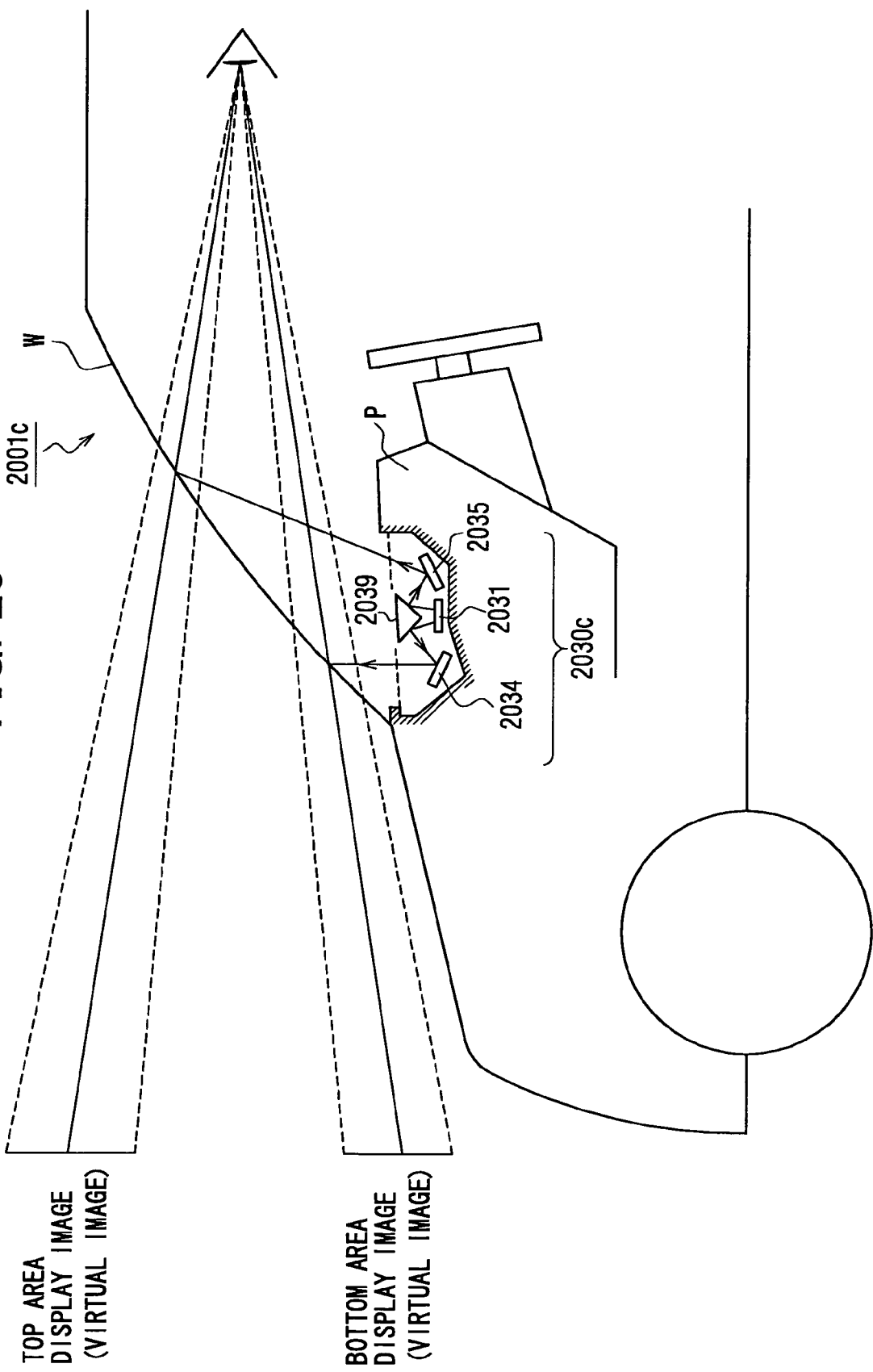
FIG. 25 is an explanatory diagram showing the configuration of the information presentation section of the fourth example.

In a vehicle information display system 2001b according to the fourth example, as shown in FIG. 25, an information presentation section 2030c includes: the display device (e.g., a liquid crystal panel) 2031 which displays videos to be projected on the windshield W; a double reflecting mirror 2039 which reflects part of a video (light from the display device 2031) displayed from the display device 2031 in a first direction and reflects the remaining part in a second direction different from the first direction; the reflective optical element 2034 which re-reflects the video reflected by the double reflecting mirror 2039 in the first direction and projects the video on the bottom area 2101 of the windshield W; and the reflective optical element 2035 which re-reflects the video reflected by the double reflecting mirror 2039 in the second direction and projects the video on the top area 2102 of the windshield W.

Like the second and third examples, these components constituting the information presentation section 2030c are stored in the recess formed on the instrument panel P. The parts other than the information presentation section 2030c are omitted from FIG. 25.

The information presentation section 2030c having this configuration displays part of a video displayed from the display device 2031 on the bottom area 2101 and the other part of the video on the top area 2102.

As shown in FIG. 23C, the display controller 2040c includes a data synthesis section 2047 in addition to the CPU 2041, the ROM 2042, the RAM 2043, and the image memory 2044 that are configured similarly to the first embodiment.

The data synthesis section 2047 is configured as follows. The area 2044a of the image memory 2044 stores the bottom area display data. A video displayed based on the bottom area display data is disposed to part of the double reflecting mirror 2039 so as to be reflected in the first direction. The area 2044b of the image memory 2044 stores the top area display data. A video displayed based on the top area display data is disposed to another part of the double reflecting mirror 2039 so as to be reflected in the second direction. For this purpose, the data synthesis section 2047 synthesizes the bottom area display data and the top area display data to generate display data. The data synthesis section 2047 then supplies the synthesized display data to the display device 2031.

Having the above-mentioned configuration, the vehicle information display system 2001c according to the fourth example allows the display device 2031 to display videos as follows. A video based on the bottom area display data is projected on the bottom area 2101 of the windshield W. A video based on the top area display data is projected on the top area 2102 of the windshield W.

That is to say, the fourth example simultaneously displays the video to be projected on the bottom area 2101 and the video to be projected on the top area 2102. Since the projection path of videos is branched, videos displayed on the single display device 2031 can be projected on any of the bottom area 2101 and the top area 2102.

Accordingly, the vehicle information display system 2001c according to the fourth example can provide the same effect as that of the second and third examples.

Modifications

While there have been described some examples of the present invention, it is not limited thereto but may be otherwise variously embodied.

For example, the above-mentioned examples use the liquid crystal panel and the projector as the display devices 2031 and 2032 constituting the information presentation sections 2030 and 2030a to 2030c. It may be also preferable to use a display device including light emitting elements such as EL.

In the above-mentioned examples, the instruction input section 2020 has the switch 2021 and the voice recognition apparatus 2022. The instruction input section 2020 may be also configured to have an image recognition apparatus for recognizing captured images of an occupant so as to detect predetermined specific gestures as instructions.

Third Embodiment

Figure 26:
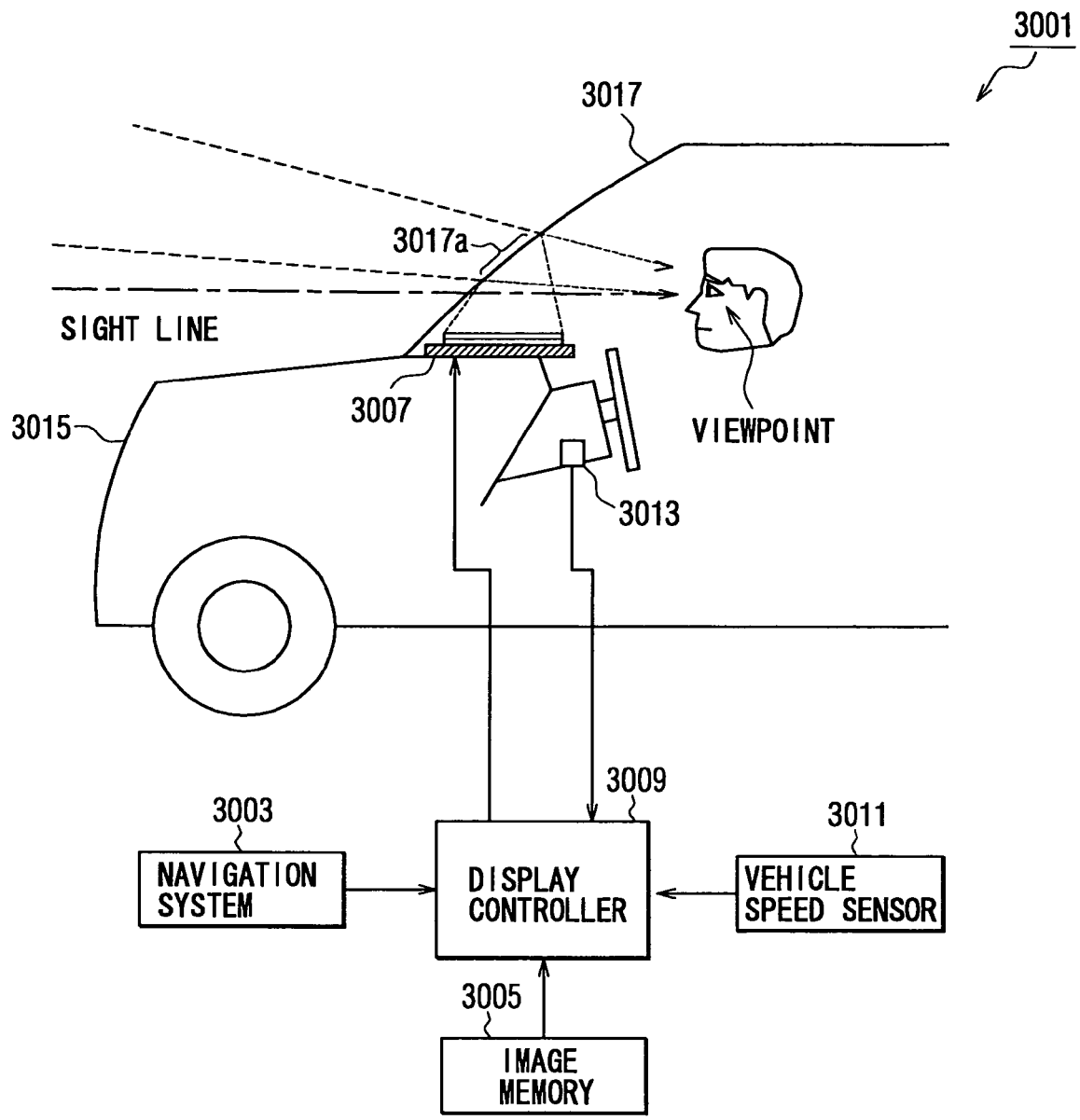
FIG. 26 is an explanatory diagram showing the configuration of a vehicle display apparatus of a first example according to a third embodiment of the present invention.

First Example a) The following describes the configuration of the vehicle display apparatus, as a vehicle information display system, according to a first example of a third embodiment with reference to FIG. 26. A vehicle display apparatus 3001 includes a navigation system 3003, an image memory 3005, a liquid crystal (LC) panel 3007, a display controller 3009, a vehicle speed sensor 3011, and a switch 3013. The vehicle display apparatus 3001 is mounted on a vehicle 3015.

The navigation system 3003 is a known system and has map data. Using the GPS and the like, the navigation system 3003 can detect positions of the vehicle 3015 in the map data. The navigation system 3003 can guide the vehicle 3015 to an input destination.

Along a route to the destination, the navigation system 3003 generates route guide information when the vehicle 3015 arrives at positions 100 m and 300 m short of a point where the vehicle 3015 should make a turn. The route guide information requests a right turn display when the vehicle 3015 is to turn to the right next. The route guide information requests a left turn display when the vehicle 3015 is to turn to the left next.

The navigation system 3003 defines reference positions on the map data to display the road information. The navigation system 3003 generates the road information when the detected position of the vehicle 3015 reaches a position 100 m short of the reference position. The road information provides road states such as temporary stop and speed limit at the reference position.

Figure 30A:
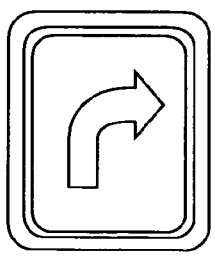
FIG. 30A is an explanatory diagram showing an image for guide display.
Figure 30B:
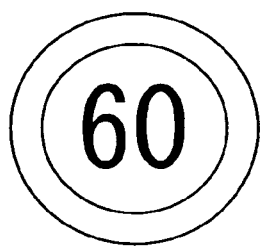
FIGS. 30B, 30C are explanatory diagrams showing images for road information.
Figure 30C:
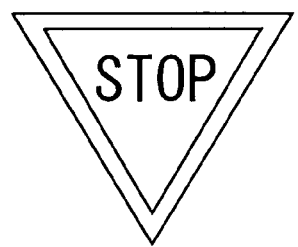

The image memory 3005 stores image data for displaying guide images corresponding to the route guide information and images corresponding to the road information on the liquid crystal panel 3007. A guide image corresponding to the route guide information is displayed when the navigation system 3003 generates the route guide information. Example guide images include those of traveling direction signboards such as an image of right turn indication as shown in FIG. 30A. An image corresponding to the road information is displayed when the navigation system 3003 generates the road information. Example images include an image of the speed limit signboard as shown in FIG. 30B and an image of the temporary stop signboard as shown in FIG. 30C.

The liquid crystal panel 3007 is disposed on an instrument panel and is capable of displaying images using the image data stored in the image memory 3005. When the liquid crystal panel 3007 displays an image, this is reflected on a windshield 3017 and is visually recognized as a virtual image by a driver. The virtual image appears at a position on the windshield 3017 from the driver's viewpoint as shown in FIG. 26. That is to say, this position is higher than the driver's sight line when the driver straight (horizontally) looks at in front of the vehicle.

The display controller 3009 has a CPU and memory (not shown) such as RAM and ROM. The memory stores a program that allows the CPU to perform the following process.

Based on the route guide information generated by the navigation system 3003, the display controller 3009 reads image data corresponding to the route guide information from the image memory 3005. The display controller 3009 then output the read image data to the liquid crystal panel 3007. Further, based on the road information generated by the navigation system 3003, the display controller 3009 reads image data corresponding to the road information from the image memory 3005. The display controller 3009 then output the read image data to the liquid crystal panel 3007.

When the switch 3013 is operated to enter a removal instruction (to be described), the display controller 3009 removes the image displayed on the liquid crystal panel 3007. When the switch 3013 is operated to enter a stop instruction (to be described), the display controller 3009 stops the image displayed on the liquid crystal panel 3007 by keeping the image state at that time. Based on a display position setup instruction (to be described) entered from the switch 3013, the display controller 3009 defines a position to display the image on the liquid crystal panel 3007. The position is used to display a virtual image on the windshield 3017.

The vehicle speed sensor 3011 measures a speed of the vehicle 3015 and outputs speed information to the display controller 3009. The speed information can be used to calculate the mileage of the vehicle 3015.

Figure 27:
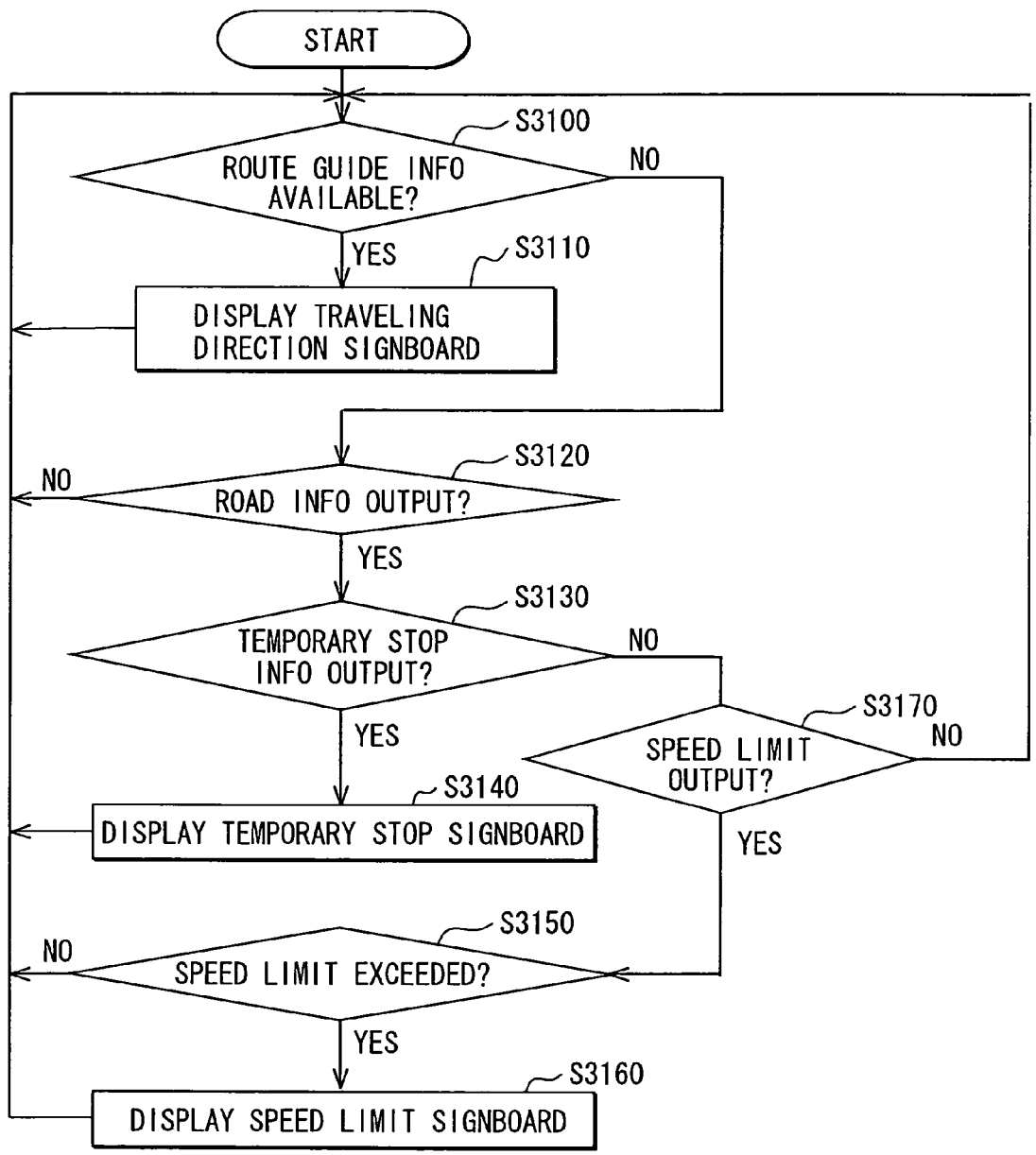
FIG. 27 is a flowchart showing a process performed by the vehicle display apparatus.
Figure 28:
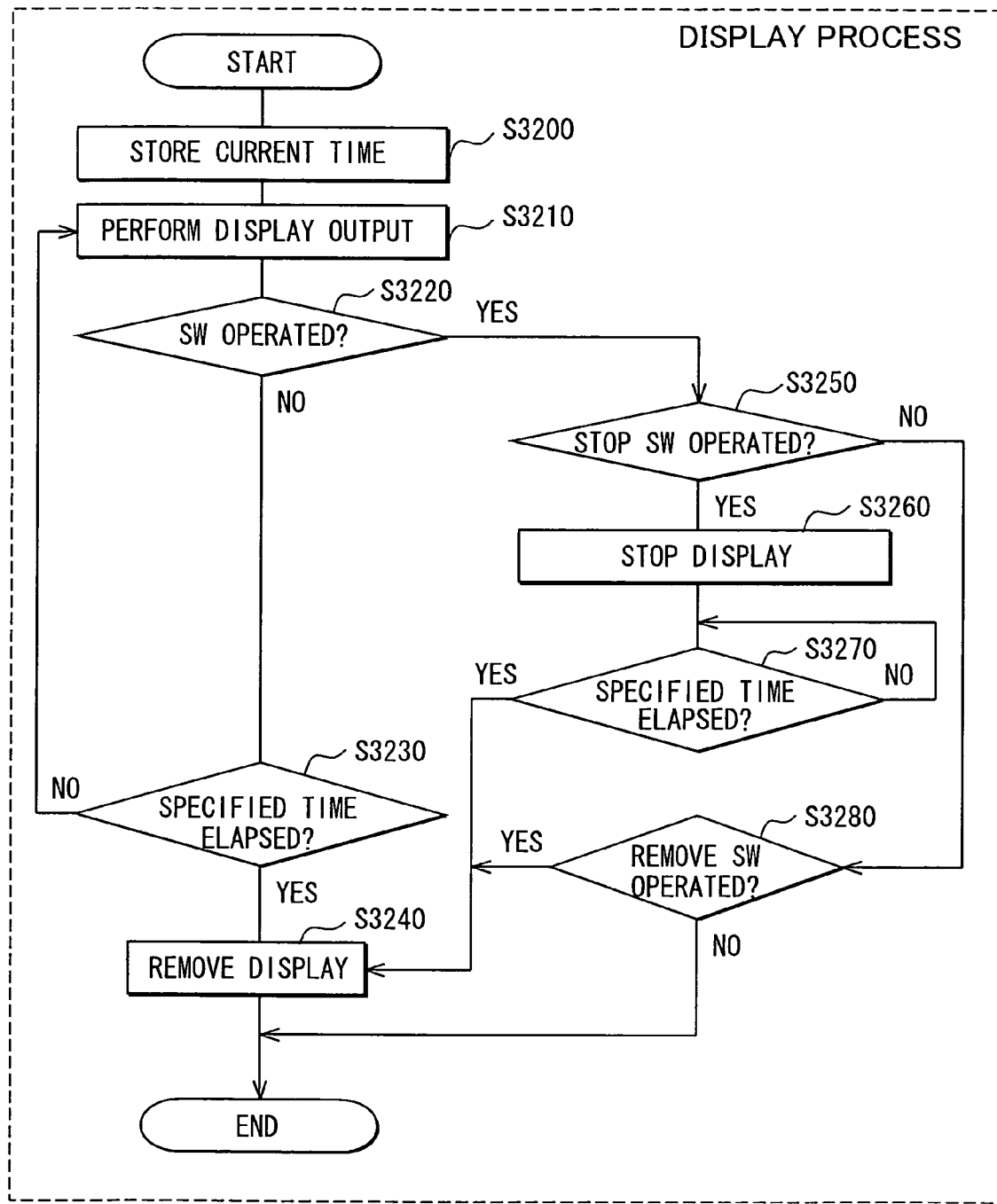
FIG. 28 is a flowchart showing a process performed by the vehicle display apparatus.
Figure 29:
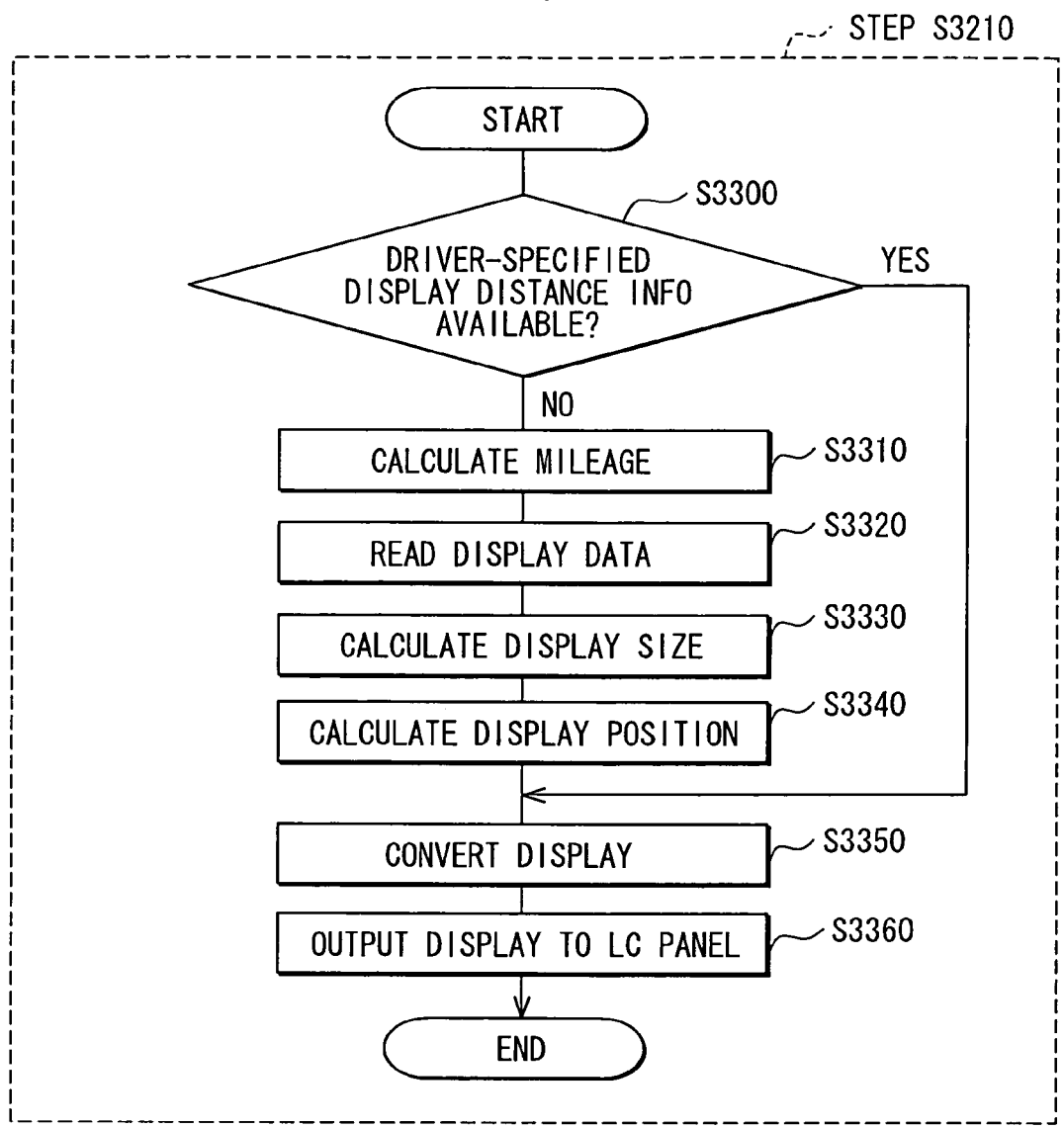
FIG. 29 is a flowchart showing a process performed by the vehicle display apparatus.

The switch 3013 includes a group of switches the driver operates. The switch 3013 includes a stop switch that inputs an instruction (removal instruction) to remove an image displayed on the liquid crystal panel 3007. The switch 3013 includes another stop switch that inputs an instruction (stop instruction) to stop an image displayed on the liquid crystal panel 3007 by keeping the image state at that time. The switch 3013 also includes a display distance information switch that inputs the size and the display position of a virtual image displayed on the windshield 3017.

b) The following describes operations of the vehicle display apparatus 3001 according to the first example with reference to FIGS. 27 to 29.

First, a flowchart in FIG. 27 is used to describe a process performed by the display controller 3009 of the vehicle display apparatus 3001.

The process starts when an engine of the vehicle 3015 starts. At Step S3100, the process determines whether or not the navigation system 3003 outputs route guide information. When the result is YES, the process proceeds to Step S3110. When the result is NO, the process proceeds to Step S3120.

At Step S3110, the process allows the liquid crystal panel 3007 to display an image of the traveling direction signboard corresponding to the route guide information. This process will be described later in more detail. After completion of Step S3110, the process returns to Step S3100.

At Step S3120, the process determines whether or not the navigation system 3003 outputs road information. When the result is YES, the process proceeds to Step S3130. When the result is NO, the process proceeds to Step S3100.

At Step S3130, the process determines whether or not the road information indicates temporary stop information. When the result is YES, the process proceeds to Step S3140. When the result is NO, the process proceeds to Step S3170.

At Step S3140, the process allows the liquid crystal panel 3007 to display an image of the temporary stop signboard. This process will be described later in more detail. Upon completion of Step S3140, the process returns to Step S3100.

When the determination result is NO at Step S3130, the process proceeds to Step S3170. At Step S3170, the process determines whether or not the road information output at Step S3120 indicates speed limit information. When the result is YES, the process proceeds to Step S3150. When the result is NO, the process proceeds to Step S3100.

At Step S3150, the process determines whether or not a speed of the vehicle 3015 at the time exceeds the speed limit specified in the speed limit information. When the result is YES, the process proceeds to Step S3160. When the result is NO, the process proceeds to Step S3100.

At Step S3160, the process allows the liquid crystal panel 3007 to display an image of the speed limit signboard. This process will be described later in more detail. Upon completion of Step S3160, the process returns to Step S3100.

The following describes the display process at Steps S3110, S3140, and S3160 in FIG. 27 with reference to FIGS. 28 to 31.

At Step S3200, the process acquires the time at the point from a clock (not shown) provided for the display controller 3009 and stores that time in memory (not shown) provided for the display controller 3009.

At Step S3210, the process allows the liquid crystal panel 3007 to display an image corresponding to the input information (the route guide information or the road information). This process will be described with reference to a flowchart in FIG. 29. At Step S3300, the process determines whether or not the driver uses the switch 3013 to set the display distance information such as the position and the size of an image to be displayed. When the result is NO, the process proceeds to Step S3310. When the result is YES, the process proceeds to Step S3350.

At Step S3310, the process finds a distance the vehicle 3015 has traveled from the process point at Step S3200 (see FIG. 28). Specifically, the distance is found by integrating traveling speeds of the vehicle 3015 from the time stored at Step S3200 to the point at Step S3310.

At Step S3320, the process reads image data corresponding to an image to be displayed from the image memory 3005. To display an image of the traveling direction signboard at Step S3110, for example, the process reads image data for an image as shown in FIG. 30A. To display an image of the temporary stop signboard at Step S3140, the process reads image data for an image as shown in FIG. 30C. To display an image of the speed limit signboard at Step S3160, the process reads image data for an image as shown in FIG. 30B.

At Step S3330, the process calculates the size of an image displayed on the liquid crystal panel 3007, i.e., the size of a virtual image displayed on the windshield 3017. Specifically, the process calculates size S of the display image according to equation (1). In this equation, S0 is an initial value of the image size, D the mileage calculated at Step S3310, and A the specified constant. The value of constant A is assumed to be adjusted so that the driver does not feel uncomfortable with changes in the size of an image displayed on the windshield 3017. In this case, it is assumed that a signboard is installed ahead of the road. As the vehicle 3015 approaches the signboard, the size of the image displayed on the windshield 3017 changes as if the signboard looks to be larger gradually.

$$S = S0 \times D/A \quad \text{Equation (1)}$$

At Step S3340, the process calculates the position of an image on the liquid crystal panel 3007, i.e., the position of a virtual image on the windshield 3017. Specifically, the process calculates position Xp in the X-axis direction (vertical direction) of an image to be displayed according to equation (2). The process calculates position Yp in the Y-axis direction (horizontal direction) of an image to be displayed according to equation (3). In these equations, the X-axis increases positively up; the Y-axis increases positively to the right. The X-axis and the Y-axis cross at an intersection point (an origin of the display position). This point corresponds to a position on the windshield 3017 where the driver's sight line crosses when the driver straight (horizontally) looks at in front of the vehicle. In the equations, B and C are specified constants.

$$Xp = B/D \quad \text{Equation (2)}$$

$$Yp = C/D \quad \text{Equation (3)}$$

Figure 33A:
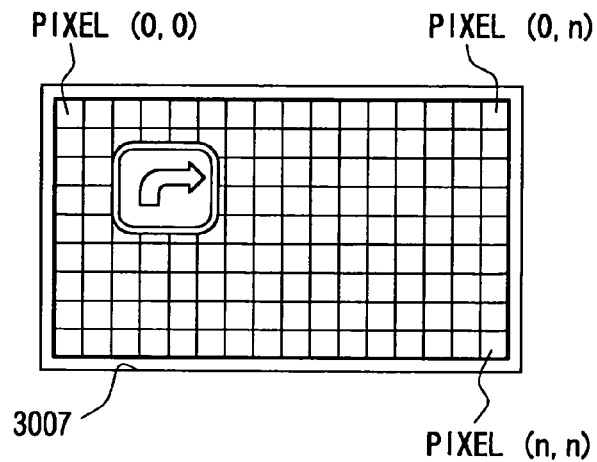
FIGS. 33A and 33B are explanatory diagrams showing relationship between (a) pixel positions on a liquid crystal panel and (b) pixel positions capable of being displayed on a windshield.
Figure 33B:
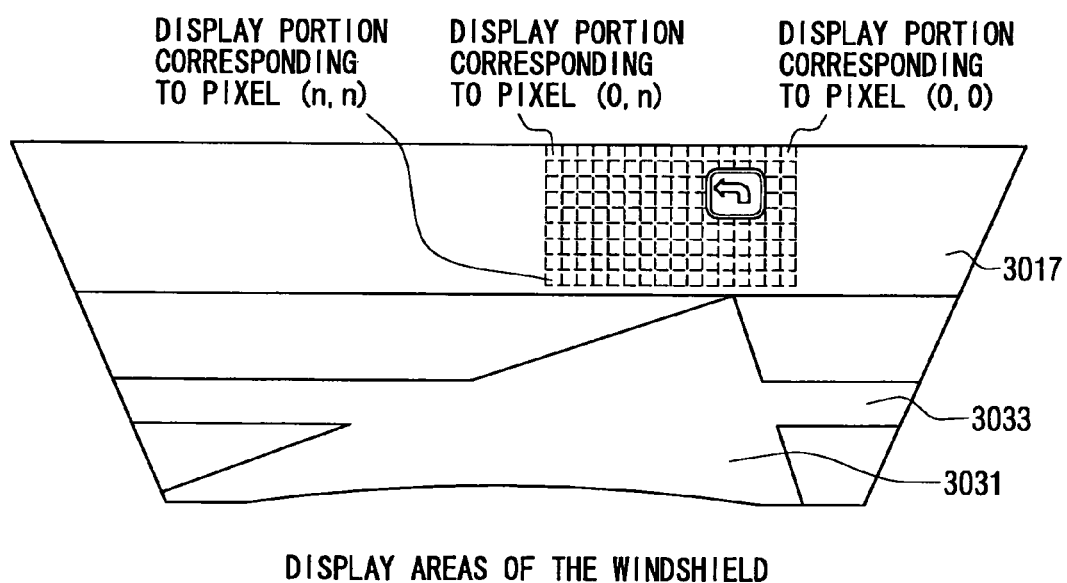

As mentioned above, an image is displayed on the windshield 3017 at the position higher than the driver's sight line when the driver straight (horizontally) looks at in front of the vehicle. Therefore, an image displayed on the windshield 3017 appears above the Y-axis. As mileage D increases, the image becomes distant from the origin of the display position. The values of constants B and C are assumed to be adjusted so that the driver does not feel uncomfortable with changes in the size of an image displayed on the windshield 3017. In this case, it is assumed that a signboard is installed ahead of the road. As the vehicle 3015 approaches the signboard, the size of the image displayed on the windshield 3017 changes as if the signboard appears at varying positions. FIGS. 33A, 33B show a relationship between pixel positions on the liquid crystal panel 3007 and pixel positions capable of being displayed on the windshield 3017.

At Step S3350, the process converts the image data read from the image memory 3005. When the determination result is NO at Step S3300, the process converts the image data so that the image corresponds to the size calculated at Step S3330 above and is displayed at the position calculated at Step S3340 above.

If the determination result is YES at Step S3300, the process converts the image data so that the image matches the size and the display position specified by the driver.

At Step S3360, the process outputs the image data to the liquid crystal panel 3007. After completion of Step S3360, the process returns to Step S3220 in FIG. 28.

At Step S3220, the process determines whether or not the driver operates any switch in the switch 3013. When the result is NO, the process proceeds to Step S3230. When the result is YES, the process proceeds to Step S3250.

At Step S3230, the process determines whether or not a specified time has elapsed from the time stored at Step S3200 above. When the result is YES, the process proceeds to Step S3240. When the result is NO, the process returns to Step S3210.

At Step S3240, the process removes the image displayed on the liquid crystal panel 3007. After the process at Step S3240, the process returns to Step S3100 in FIG. 27.

If the determination result is YES at Step S3220, the process proceeds to Step S3250 and determines whether or not the stop switch is operated. When the result is YES, the process proceeds to Step S3260. When the result is NO, the process proceeds to Step S3280.

At Step S3260, the process stops the image displayed on the liquid crystal panel 3007 by keeping the image state at that time. At Step S3270, the process determines whether or not a specified time has elapsed from the time the display is stopped at Step S3260 above. When the result is YES, the process proceeds to Step S3240. When the result is NO, the process stays at Step S3270.

If the determination result is NO at Step S3250, the process proceeds to Step S3280 and determines whether or not the remove switch is operated. When the result is YES, the process proceeds to Step S3240. When the result is NO, the process terminates the display process and returns to Step S3100 in FIG. 27.

c) The following describes effects of the vehicle display apparatus 3001 according to the first example.

i) The vehicle display apparatus 3001 according to the first example displays images for the route guide information and the road information on the windshield 3017 above the direction along the driver's sight line. Therefore, the images do not overlap with preceding vehicles, nor cause trouble with the driver's driving.

ii) The vehicle display apparatus 3001 according to the first example displays the images similar to signboards and traffic signs actually installed on the road. This method differs from displaying arrows, letters, and the other images that are quite different from the real world. Accordingly, the driver can read the route guide information and the road information from the displayed images without uncomfortable feeling and reliably obtain the information.

Figure 31:
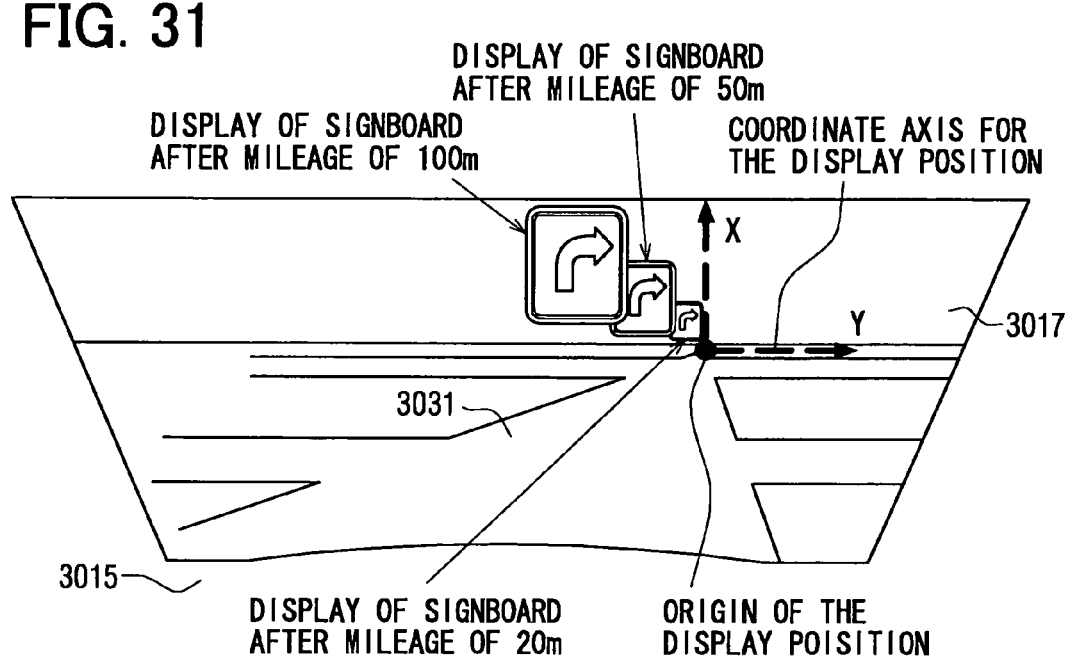
FIG. 31 is an explanatory diagram showing sizes and positions of images displayed on a windshield.

In the vehicle display apparatus 3001 according to the first example, the size of an image displayed on the windshield 3017 increases as the mileage of the vehicle 3015 increases as shown in FIG. 31. Also as shown in FIG. 31, the position of the image displayed on the windshield 3017 becomes distant from the XY coordinate origin as the mileage of the vehicle 3015 increases. The XY coordinate origin corresponds to an intersection point between the driver's sight line and the windshield 3017. Sizes and positions of the images change in the same manner as viewing the signboard installed ahead of the vehicle 3015 when it approaches the signboard. Accordingly, the first example can display images on the windshield 3017 in the same manner as viewing the signboard installed ahead of the vehicle 3015 when it runs toward the signboard.

In this manner, the driver can feel as if he or she were looking at signboards actually installed on the road. The driver can read the route guide information and the road information from the displayed images without uncomfortable feeling and reliably obtain the information.

Figure 32:
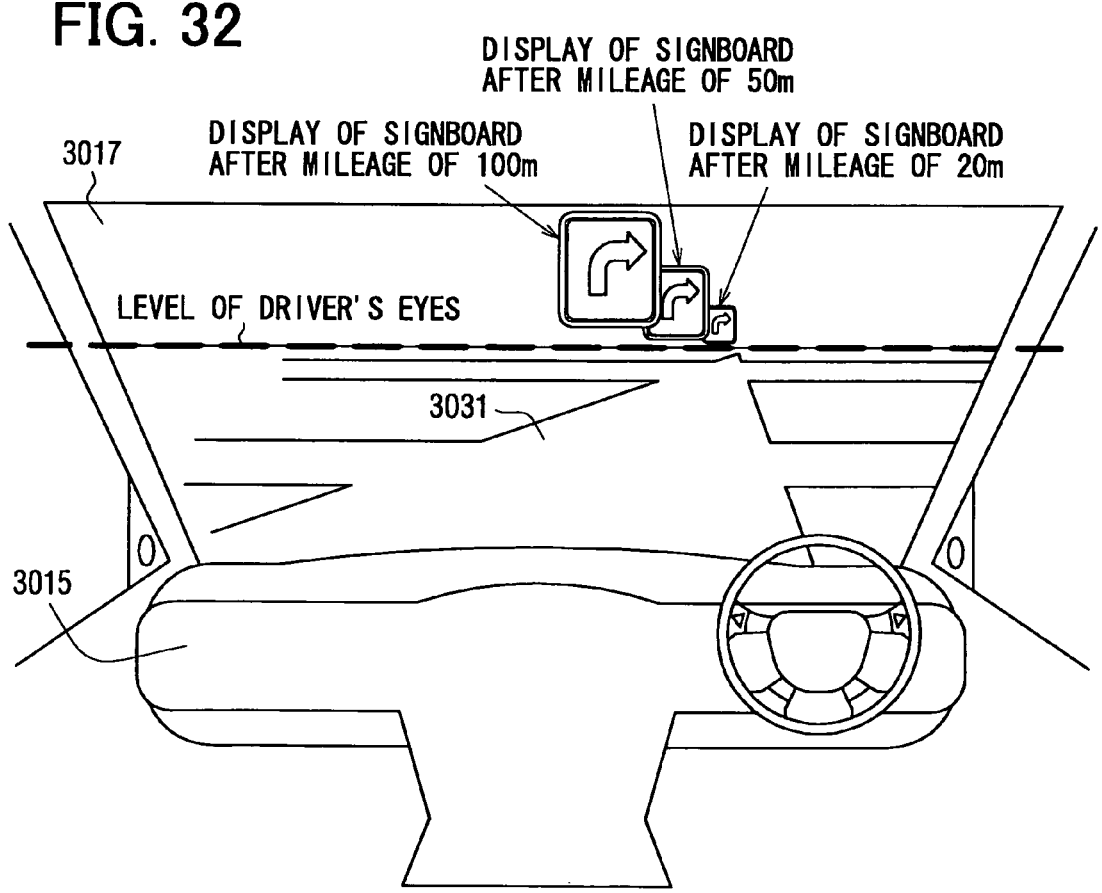
FIG. 32 is an explanatory diagram showing a plurality of images displayed on the windshield.

When repeating the display output process at Step S3210 (see FIG. 28), the first example may remove a previous image and display only the most recent image on the windshield 3017. Further, as shown in FIG. 32, it may be preferable to overlap respective images for the mileages of 20 m, 50 m, and 100 m without removing the preceding images. This method increases chances for the driver to view the images and decreases possibilities of missing them.

Figure 34:
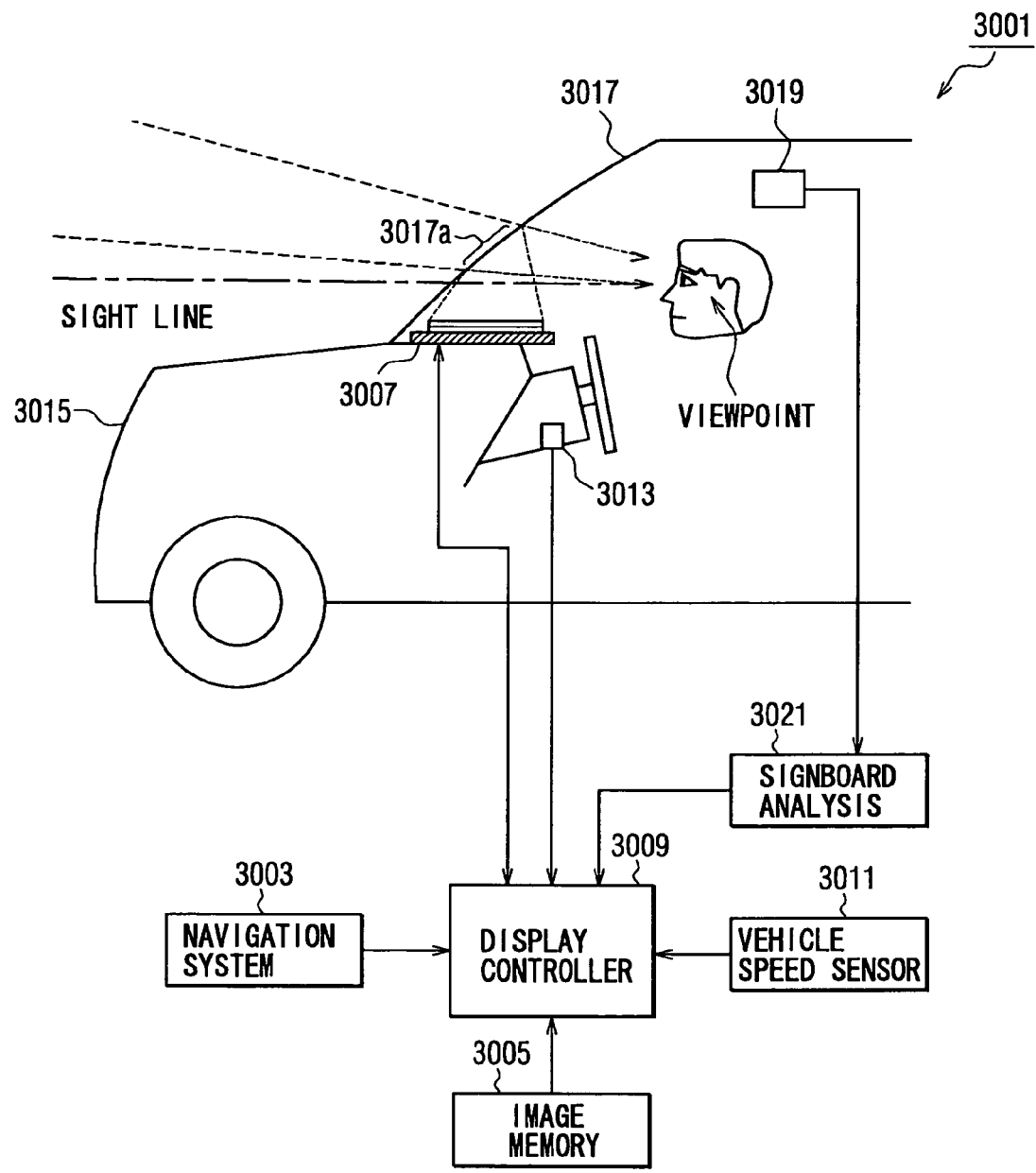
FIG. 34 is an explanatory diagram showing the configuration of the vehicle display apparatus of a second example according to the third embodiment.
Figure 35:
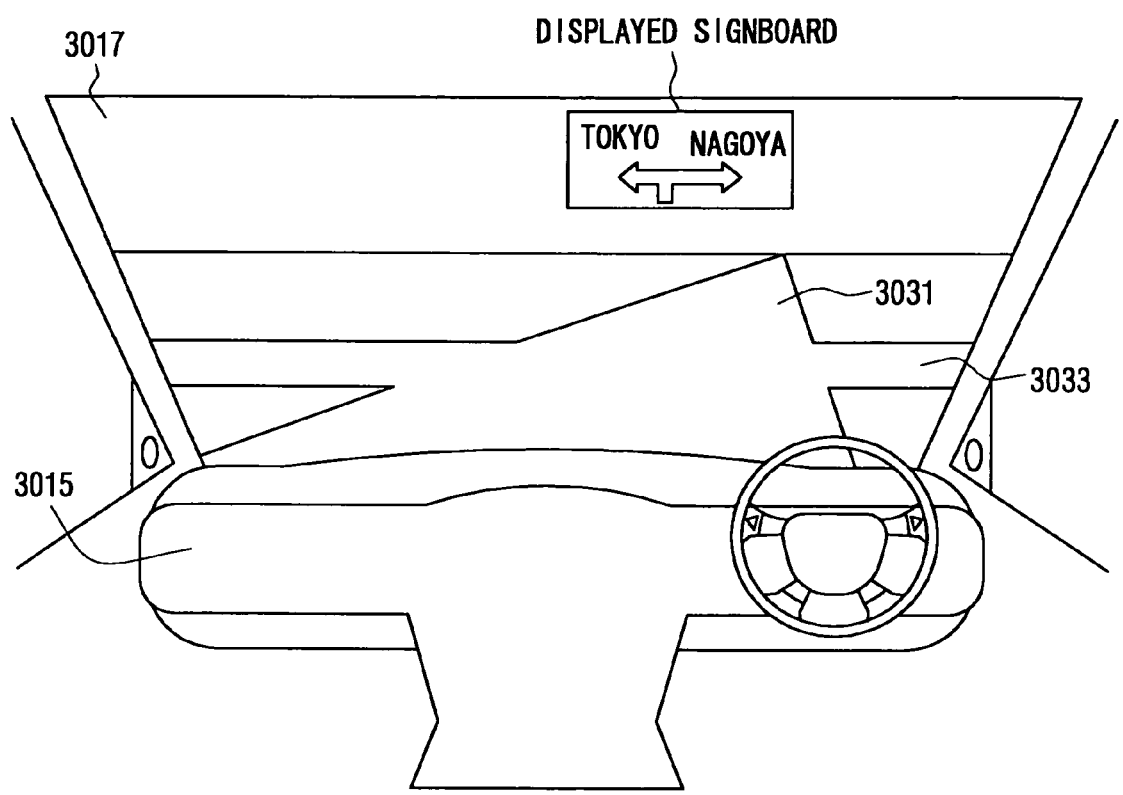
FIG. 35 is an explanatory diagram showing a signboard image displayed on the windshield.

Second Example a) The configuration of the vehicle display apparatus 3001 for a second example is basically the same as that for the first example. In addition to the configuration of the first example, however, the vehicle display apparatus 3001 further includes a camera 3019 and a signboard analysis apparatus 3021 as shown in FIG. 34.

The camera 3019 captures scenes in front of the vehicle and creates the associated image data.

The signboard analysis apparatus 3021 identifies whether or not a signboard is included in the image data captured and created by the camera 3019. When a signboard is included, the signboard analysis apparatus 3021 extracts an image corresponding to the signboard and creates associated image data (hereafter referred to as signboard image data) and stores it in the image memory 3005. After the signboard analysis apparatus 3021 stores signboard image data in the image memory 3005, further creating signboard image data overwrites the existing signboard image data for storage. The image memory 3005 stores the most recent signboard image data.

The display controller 3009 controls the camera 3019 and the signboard analysis apparatus 3021. The display controller 3009 can read signboard image data from the image memory 3005 and output it to the liquid crystal panel 3007. The liquid crystal panel 3007 displays an image of the signboard. For example, the signboard image is displayed as a virtual image on the windshield 3017.

The switch 3013 has a switch (display switch) for giving an instruction to display a signboard image on the windshield 3017.

b) The vehicle display apparatus 3001 according to the second example provides not only the same operations as the first example, but also the following operation. The camera 3019 captures a signboard indicating the road information. In response to a driver's request, the vehicle display apparatus 3001 displays the content of the most recent signboard on the windshield 3017. This operation will be described with reference to FIGS. 36 to 38.

Figure 36:
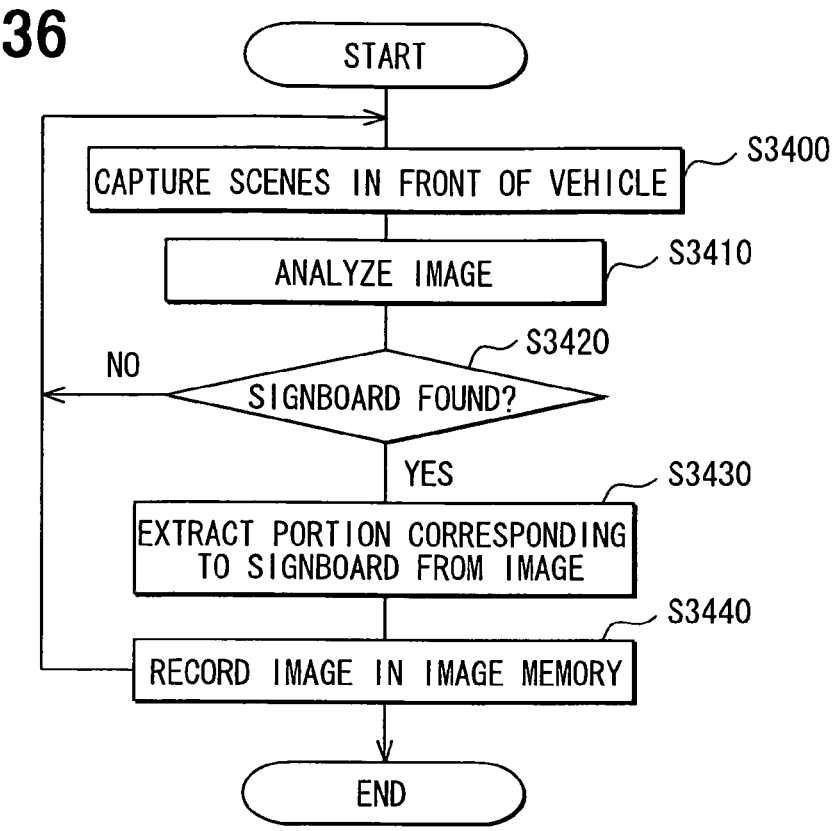
FIG. 36 is a flowchart showing a process performed by the vehicle display apparatus.

The following describes a process performed by the signboard analysis apparatus 3021 of the vehicle display apparatus 3001 with reference to a flowchart in FIG. 36.

The process starts when the engine of the vehicle 3015 starts. At Step S3400, the process allows the camera 3019 to capture scenes in front of the vehicle 3015 and create the associated image data. The created image data is transmitted to the signboard analysis apparatus 3021.

At Step S3410, the signboard analysis apparatus 3021 analyzes the image data. This analysis process will be described later in more detail.

At Step S3420, the process determines whether or not the image data contains a signboard image. When the result is YES, the process proceeds to Step S3430. When the result is NO, the process returns to Step S3400.

At Step S3430, the process extracts image data corresponding to the signboard from the image data to generate signboard image data.

At Step S3440, the process stores the signboard image data in the image memory 3005. When the signboard image data is already stored, it is overwritten with the new one.

Figure 37:
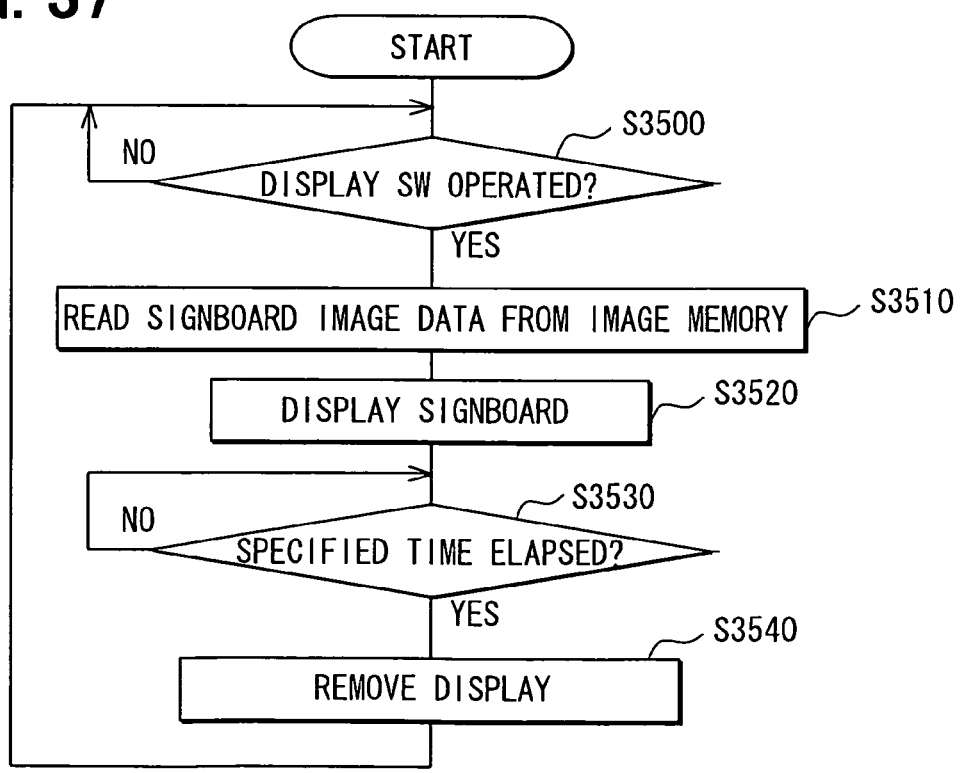
FIG. 37 is a flowchart showing a process performed by the vehicle display apparatus.

The following describes a process performed by the display controller 3009 with reference to FIG. 37.

The process starts when the engine of the vehicle 3015 starts. At Step S3500, the process determines whether or not the display switch of the switch 3013 is operated. When the result is YES, the process proceeds to Step S3510. When the result is NO, the process stays at Step S3500.

At Step S3510, the process reads signboard image data from the image memory 3005.

At Step S3520, the process outputs the signboard image data to the liquid crystal panel 3007 and displays the signboard image.

At Step S3530, the process determines whether or not a specified time has elapsed from the time the signboard image is displayed at Step S3520 above. When the result is YES, the process proceeds to Step S3540. When the result is NO, the process stays at Step S3530.

At Step S3540, the process removes the signboard image on the liquid crystal panel 3007.

Figure 38:
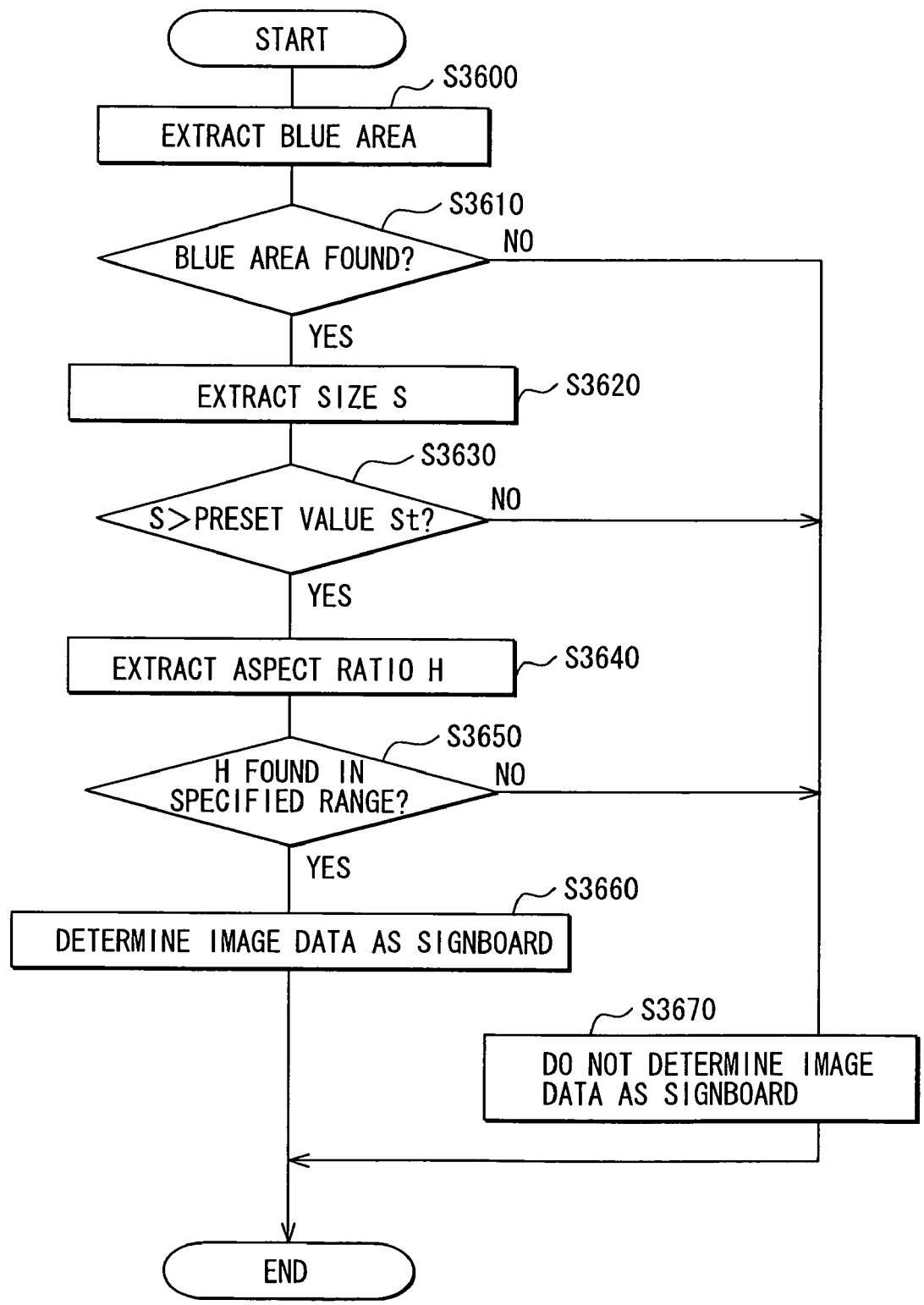
FIG. 38 is a flowchart showing a process performed by the vehicle display apparatus.

The following describes the image analysis process at Step S3410 above (see FIG. 36) with reference to a flowchart in FIG. 38.

At Step S3600, the process extracts image data for a blue area (hereafter referred to as blue area image data) from the image data captured and created by the camera 3019. The blue area image data can be extracted through the analysis of RGB components. Specifically, a condition for the blue area is assumed to be R<10, G<10, and B>230 as 256-gradation camera image data, for example. It is possible to identify an area satisfying this condition as the blue area. Generally, the blue color is used for signboards indicative of the road information. Extracting the blue area image data makes it possible to distinguish image data for signboards indicative of the road information from the other image data.

At Step S3610, the process determines whether or not the blue area image data is found at Step S3600 above. When the result is YES, the process proceeds to Step S3620. When the result is NO, the process proceeds to Step S3670.

At Step S3620, the process confirms size S of the blue area image data extracted at Step S3600 above.

At Step S3630, the process determines whether or not size S of the blue area image data is greater than specified preset value St. For example, a value for St can be a quarter of the entire width of the image data captured by the camera 3019. When the determination result at Step S3630 is YES, the process proceeds to Step S3640. When the result is NO, the process proceeds to Step S3670.

At Step S3640, the process extracts aspect ratio H (vertical length divided by horizontal length) of the blue area image data.

At Step S3650, the process determines whether or not aspect ratio H ranges from lower bound H1 to upper bound H2. For example, a value for H1 can be 0.7 and a value for H2 can be 0.8. When the determination result at Step S3650 is YES, the process proceeds to Step S3660. When the result is NO, the process proceeds to Step S3670.

At Step S3660, the process determines that the blue area image data represents image data of a signboard indicating the road information. That is to say, the blue area image data is assumed to be the signboard image data.

The vehicle display apparatus 3001 according to the second example uses the image memory 3005 to store image data for signboard images in advance. The image memory 3005 registers the reference position for displaying the signboard images in the map data for the navigation system 3003. The navigation system 3003 outputs the signboard display information to the display controller 3009 when the detected position of the vehicle 3015 changes from the reference position to the specified range. Then, the display controller reads the signboard image data corresponding to the reference position from the image memory 3005 to display the signboard image on the windshield 3017.

c) The vehicle display apparatus 3001 according to the second example can provides the following effects.

i) In the second example, the signboard image data is extracted from image data captured by the camera 3019 and is stored in the image memory 3005. When the driver operates the display switch, the vehicle display apparatus 3001 reads the signboard image data from the image memory 3005 and displays the signboard image on the windshield 3017. When the driver misses an actual signboard, he or she can display an image for that signboard on the windshield 3017 later to recognize the road information. Since there is no need to worry about missing signboards, the driver can drive the vehicle safely.

ii) In the second example, signboard image data is repeatedly stored at Step S3440 in FIG. 36. Newly created signboard image data overwrites the existing signboard image data. For this reason, the most recent signboard image data is read from the image memory 3005. The windshield 3017 displays the most recent signboard image. Therefore, the driver can be notified of the most recent road information.

iii) In the second example, blue area image data is extracted at Step S3600 in FIG. 38. As shown at Steps S3620 to S3650 in FIG. 38, the extracted blue area image data is identified as signboard image data only when size S and aspect ratio H satisfy the specified conditions. There may be blue areas that are too small to be viewed if displayed or are actually not signboards to display the road information. The windshield 3017 can be prevented from displaying such blue areas as signboard images.

iv) The vehicle display apparatus 3001 according to the second example can previously store signboard images in the image memory 3005 and display the stored signboard images on the windshield 3017. Therefore, the driver can obtain information about the signboards without fail.

Figure 39:
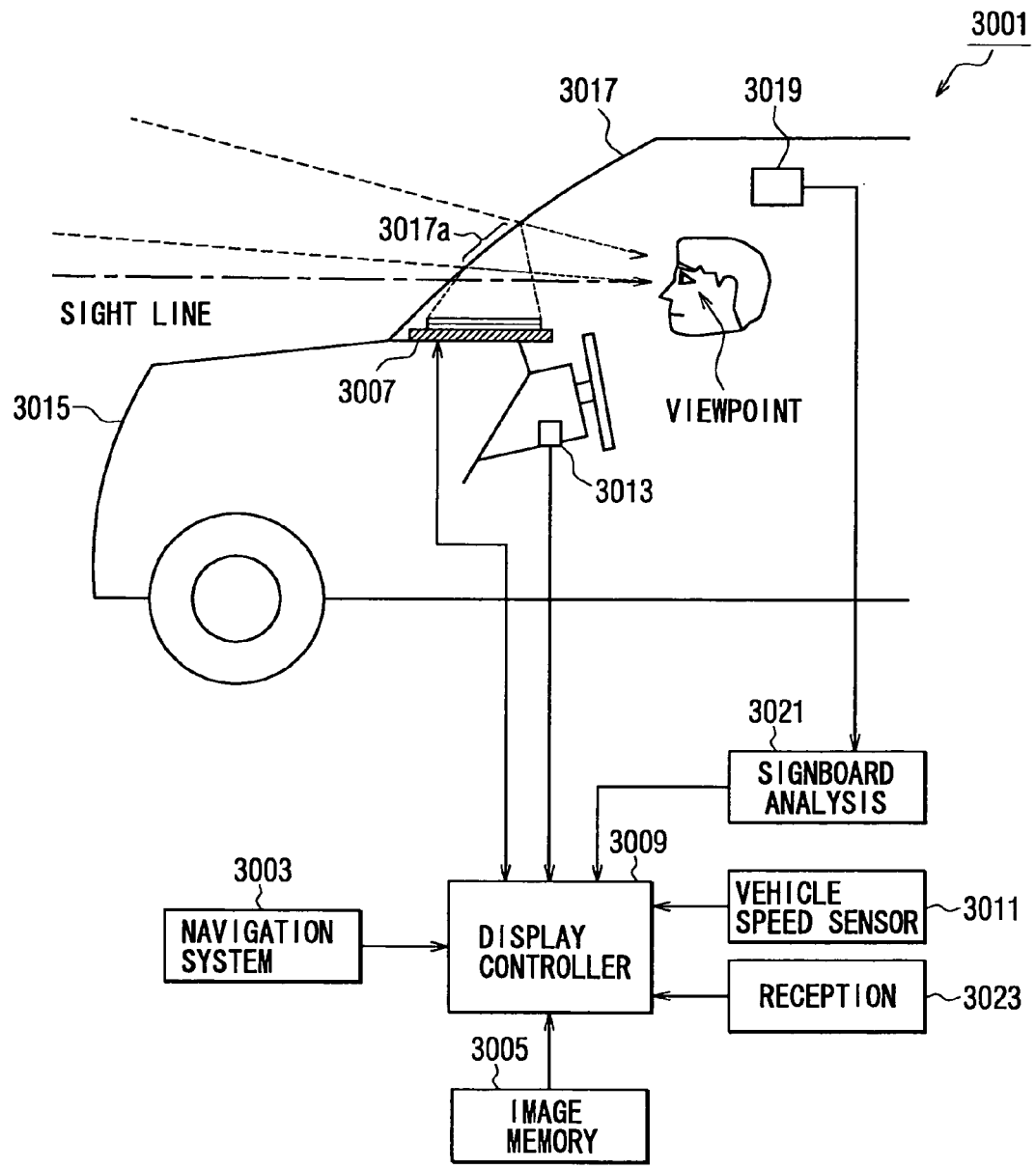
FIG. 39 is an explanatory diagram showing the configuration of a vehicle display apparatus of a third example according to the third embodiment.
Figure 40:
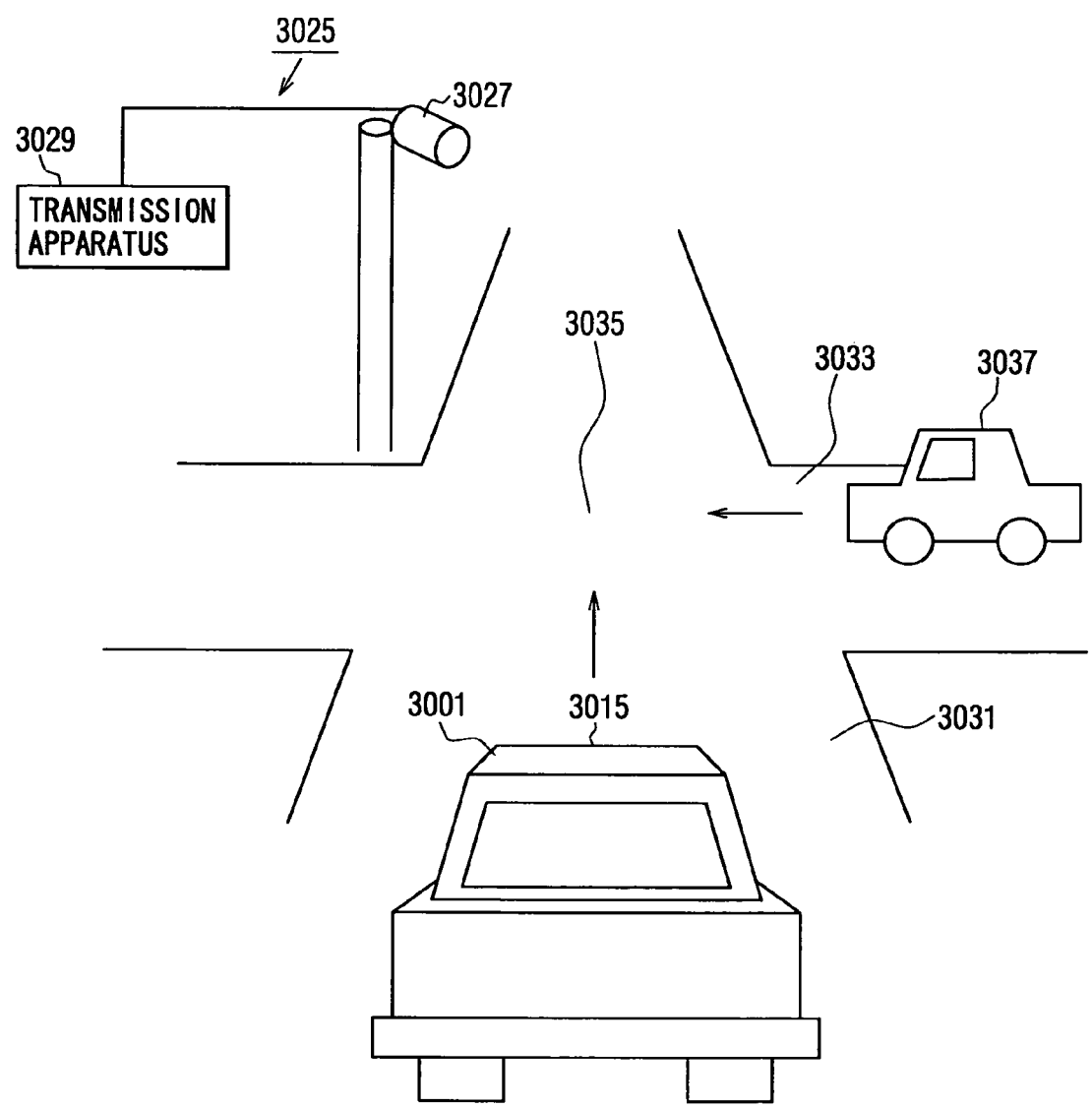
FIG. 40 is an explanatory diagram showing the configuration of an external apparatus installed near an intersection.
Figure 41:
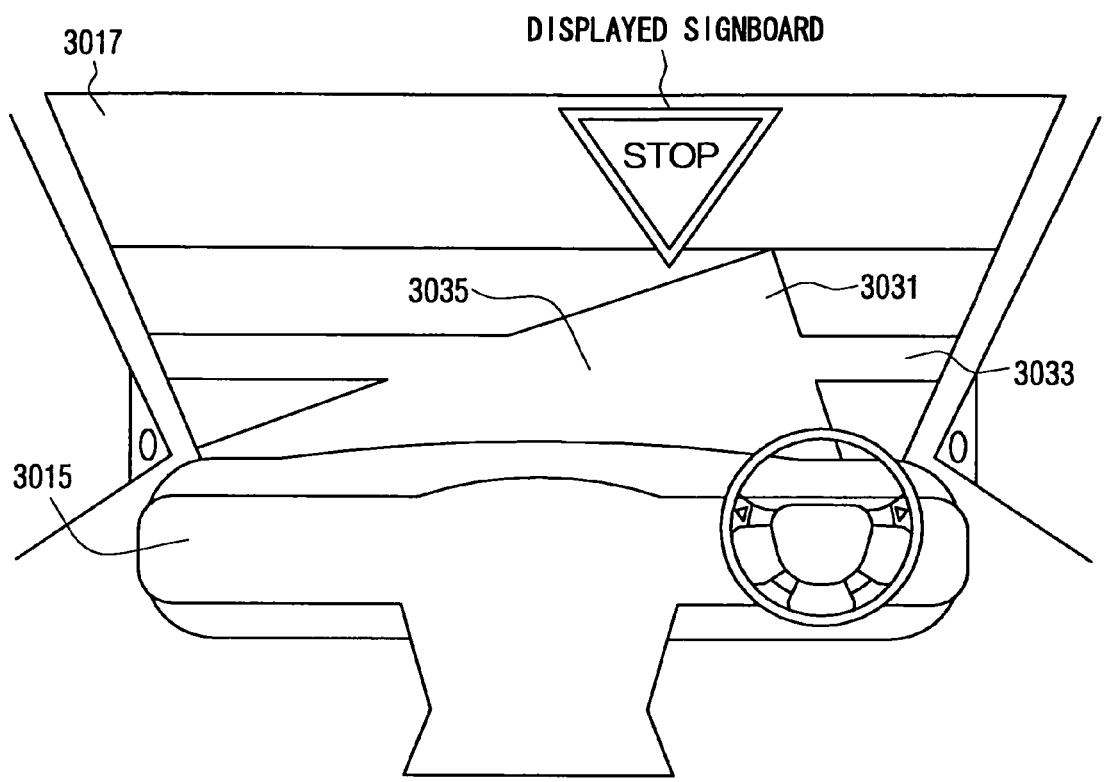
FIG. 41 is an explanatory diagram showing a temporary stop image displayed on a windshield.

Third Example a) The following describes the configuration of a vehicle display system according to a third example with reference to FIGS. 39 to 41. The vehicle display system includes the vehicle display apparatus 3001 in FIG. 39 and an external apparatus 3025 in FIG. 40.

The vehicle display apparatus 3001 has basically the same configuration as that of the second example and further includes a reception apparatus 3023. The reception apparatus 3023 receives sensing information (to be described) transmitted from the external apparatus 3025 and transmits that sensing information to the display controller 3009. After receiving the sensing information, the display controller 3009 reads image data corresponding to the sensing information from the image memory 3005. The display controller 3009 then outputs that image data to the liquid crystal panel 3007.

The image memory 3005 stores image data for images to be displayed when the sensing information is received. For example, the image data represents a temporary stop signboard as shown in FIG. 41.

As shown in FIG. 40, the external apparatus 3025 is installed near an intersection 3035 with no traffic lights. The intersection 3035 is formed between a road 3033 and a road 3031 where the vehicle 3015 mounted with the vehicle display apparatus 3001 is running. The external apparatus 3025 includes a sensing apparatus 3027 and a transmission apparatus 3029.

Figure 42:
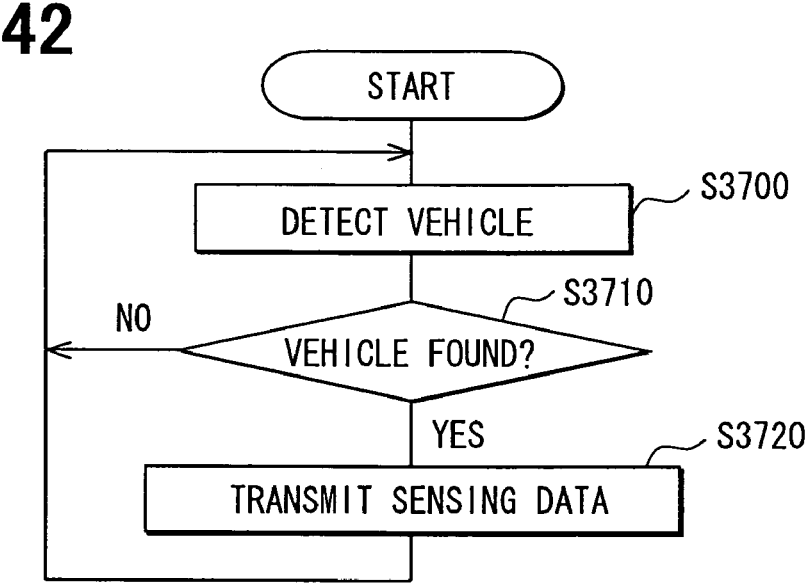
FIG. 42 is a flowchart showing a process performed by the vehicle display system.
Figure 43:
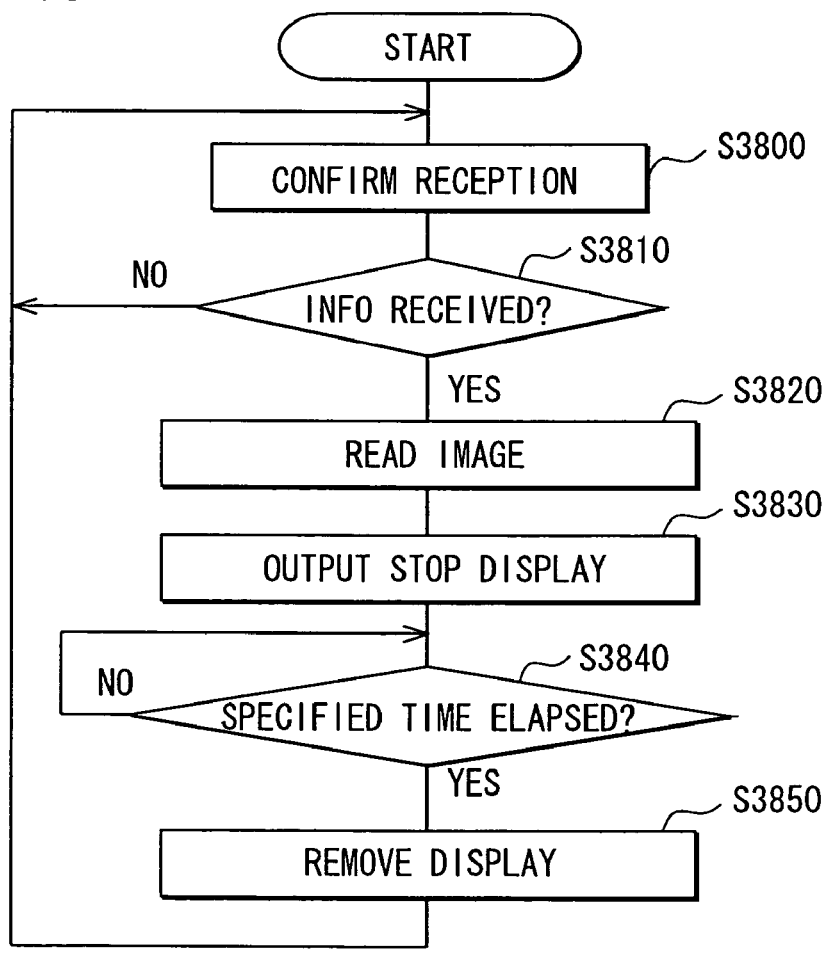
FIG. 43 is a flowchart showing a process performed by the vehicle display system.

The sensing apparatus 3027 detects whether or not another vehicle 3037 is found on the road 3033. For example, a radar-based detection apparatus can be used for the sensing apparatus 3027. When the vehicle 3037 is found on the road 3033, the sensing apparatus 3027 transmits sensing information to the transmission apparatus 3029. The transmission apparatus 3029 transmits the sensing information by means of radio, for example.

b) The following describes operations of the vehicle display system according to the third example with reference to FIGS. 42 and 43. First, a flowchart in FIG. 42 is used to describe a process performed by the external apparatus 3025.

The process starts when the engine of the vehicle 3015 starts. At Step S3700, the process allows the sensing apparatus 3027 to detect another vehicle 3037 running on the road 3033. When another vehicle 3037 is detected, the process allows the sensing apparatus 3027 to generate sensing information.

At Step S3710, the process determines whether or not another vehicle 3037 is detected at Step S3700. When the result is YES, the process proceeds to Step S3720. When the result is NO, the process returns to Step S3700.

At Step S3720, the process transfers the sensing information generated at Step S3700 to the transmission apparatus 3029. The transmission apparatus 3029 transmits the sensing information to the vehicle 3015.

The following describes a process performed by the display controller 3009 and the reception apparatus 3023 in the vehicle display apparatus 3001 with reference to a flowchart in FIG. 43.

The process starts when the engine of the vehicle 3015 starts. At Step S3800, the process confirms whether or not the reception apparatus 3023 receives the sensing information transmitted from the external apparatus 3025.

At Step S3810, the process determines whether or not the sensing information is received at Step S3800 above. When the result is YES, the process proceeds to Step S3820. When the result is NO, the process returns to Step S3800.

At Step S3820, the display controller 3009 reads image data corresponding to the sensing information received from the image memory 3005. When the sensing information indicates that another vehicle 3037 is detected on the road 3033, the display controller 3009 reads image data for the temporary stop signboard as shown in FIG. 41.

At Step S3830, the display controller 3009 outputs the image data read at Step S3820 to the liquid crystal panel 3007. The windshield 3017 displays a virtual image of the image data.

At Step S3840, the display controller 3009 determines whether or not a specified time has elapsed from the time when the image is displayed at Step S3830 above. When the result is YES, the process proceeds to Step S3850. When the result is NO, the process stays at Step S3840.

At Step S3805, the display controller 3009 removes the image displayed on the liquid crystal panel 3007. The process then returns to Step S3800.

c) The vehicle display system according to the third example is applicable to the road 3031 for the vehicle 3015 to travel and the road 3033, both crossing at the intersection 3035 with no traffic lights. When there is another vehicle on the road 3033, the vehicle display system can display an image for the temporary stop on the windshield 3017 of the vehicle 3015. In this manner, the driver of the vehicle 3015 can be notified of the presence of another vehicle 3037 and avoid a collision with it.

It is to be distinctly understood that the present invention is not limited to the above-mentioned examples but may be otherwise variously embodied in various modifications within the spirit and scope of the invention.

For example, the first example may use means other than the liquid crystal panel 3007 for displaying images on the windshield 3017. Specifically, it may be preferable to use means for converting image data into light and reflecting the light on the windshield 3017. It may be also preferable to embed an element capable of displaying images in the windshield 3017 or attach that element to the surface of the windshield 3017.

In the second example, it may be preferable to recognize and extract images of pedestrians and other vehicles from images captured by the camera 3019 and display the extracted images on the windshield 3017. This makes it possible for the driver to decrease the possibilities of missing pedestrians and other vehicles. Images for the pedestrians and other vehicles can be recognized from the images captured by the camera 3019 as follows. It just needs to create conditions for these images and identify parts of images corresponding to the conditions as images for the pedestrians and other vehicles.

The external apparatus 3025 in the third example may detect information about speed limits and one-way traffic for the road 3031 where the vehicle 3015 travels. These information are detected and transmitted as sensing information from the external apparatus 3025. When receiving the sensing information, the vehicle display apparatus 3001 can display the corresponding images on the windshield 3017 of the vehicle 3015.

Fourth Embodiment

First Example

The following describes a first example of applying a vehicle information display system according to a fourth embodiment of the present invention to a combination meter with reference to the accompanying drawings.

Figure 44:
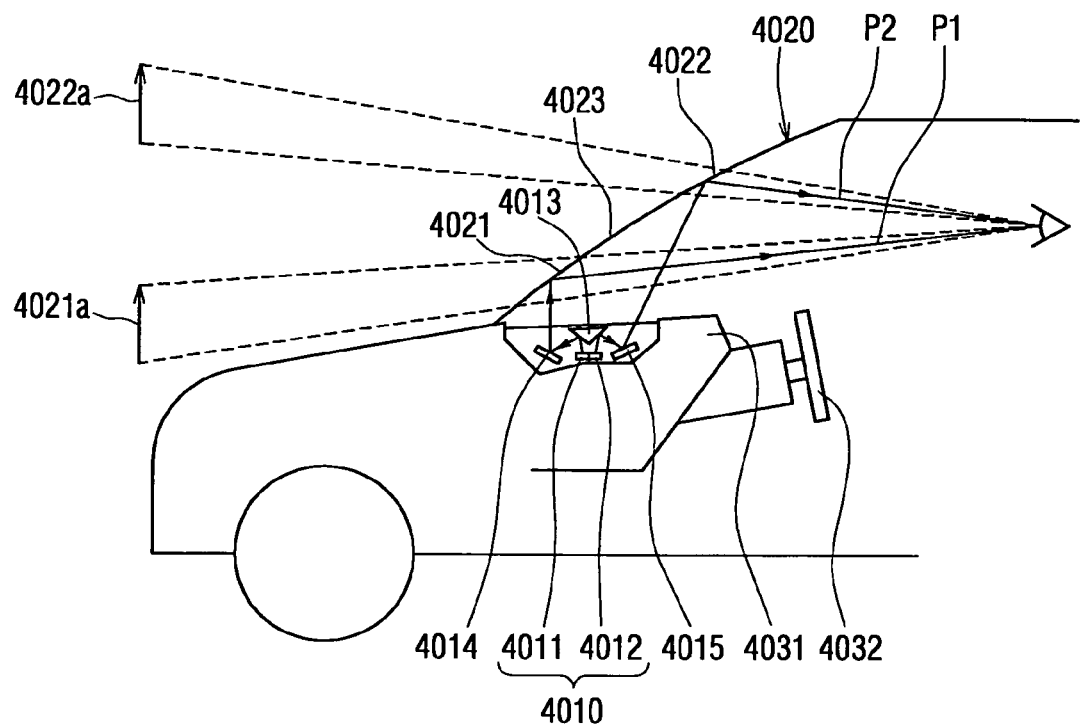
FIG. 44 is a schematic diagram showing the entire configuration of a vehicle display apparatus of a first example according to a fourth embodiment of the present invention.

FIG. 44 is a schematic diagram showing the entire configuration of a vehicle display apparatus as a vehicle information display system according to the first example of the fourth embodiment.

Figure 45:
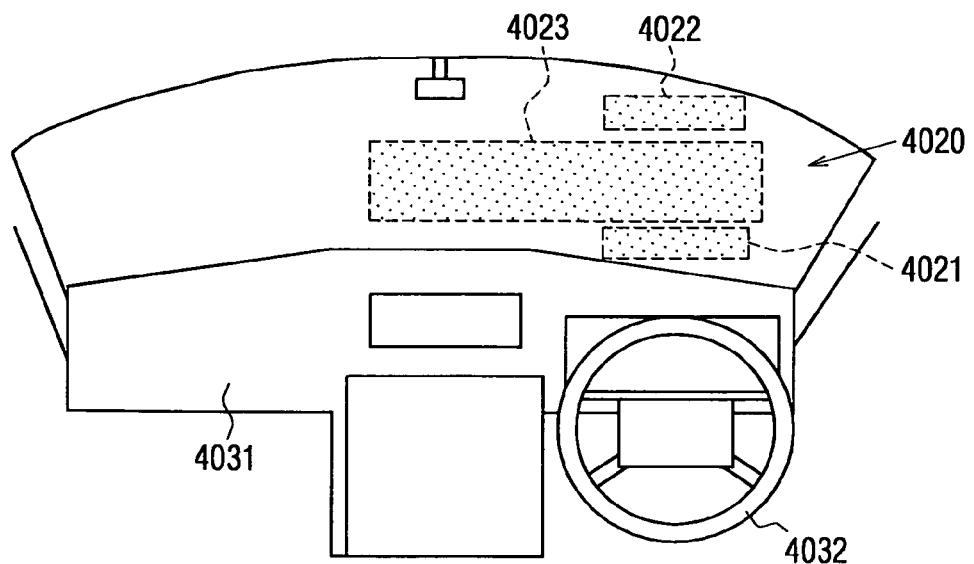
FIG. 45 is a schematic diagram showing an instrument panel 4031 and a windshield 4020 in front of a vehicle compartment.

FIG. 45 is a schematic diagram showing an instrument panel 4031 and a windshield 4020 in front of a vehicle compartment.

Figure 46:
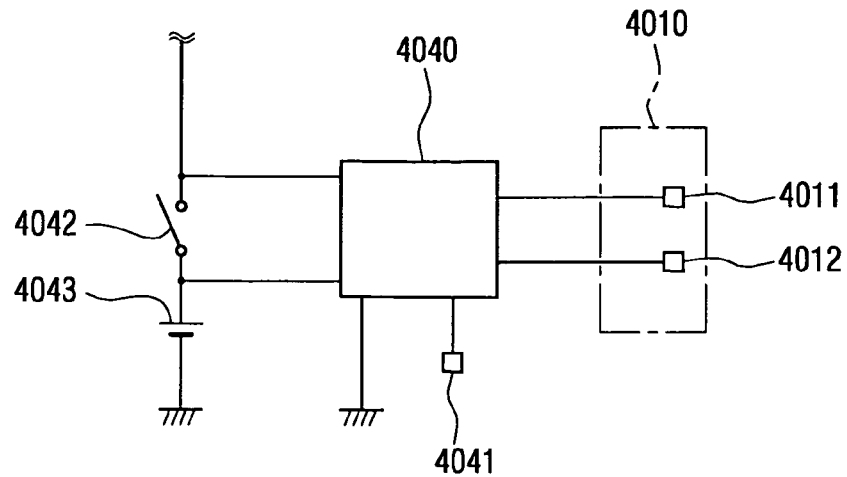
FIG. 46 is a schematic diagram showing the electrical circuit configuration of a combination meter of the first example.

FIG. 46 is a schematic diagram showing the electrical circuit configuration of a combination meter according to the first example.

As shown in FIG. 45, the surface of the windshield 4020 inside the vehicle compartment is provided with surface treatment. The surface treatment functions as a combiner (reflection member) at top and bottom areas with respect to a driving visual field area 4023 in front of a driver. Both areas are formed as a first display area 4021 and a second display area 4022.

The driving visual field area 4023 is approximately the same as or slightly wider than the transparent area prescribed in JIS specifications R3212 (concerning the area preferentially ensuring the driver's visual field). That is to say, the driving visual field area 4023 corresponds to a visual field range at which the driver frequently looks at during driving of his or her own vehicle.

The display areas 4021 and 4022 are not limited to the front of the driver. If positioned below or above the driving visual field area 4023, the display areas 4021 and 4022 may be provided at or near the center of the instrument panel 4031.

In FIG. 44, images for the first display section 4011 and the second display section 4012 are reflected twice on mirrors 4013 to 4015. The images are reflected on the first display area 4021 and the second display area 4022 and are recognized as virtual images 4021a and 4022a by the driver. In this manner, the driver sitting on a driver's seat can visually recognize the images 4021a and 4022a overlapping with actual landscape in front of the own vehicle. This is because the images 4021a and 4022a are projected on the first display area 4021 and the second display area 4022.

The first display section 4011 and the second display section 4012 are integrally formed as a liquid crystal display device 4010. The mirrors 4014 and 4015 are concave mirrors to enlarge the images 4021a and 4022a. In addition, the mirror 4013 or all of the mirrors 4013 to 4015 may be concave mirrors.

As shown in FIG. 46, a control apparatus 4040 includes a microcomputer and the like and is always supplied with power from a battery 4043. The control apparatus 4040 connects with an ignition switch 4042 and can detect its operation state ON or OFF. The control apparatus 4040 also connects with a fluid level sensor 4041 that measures remaining fuel in a fuel tank (not shown) or the like so that detection signals can be input. The liquid crystal display device 4010 (display sections 4011 and 4012) is connected to the control apparatus 4040. The control apparatus 4040 drives the liquid crystal display device 4010 in accordance with signals from the fluid level sensor 4041 and the like.

Figure 47:
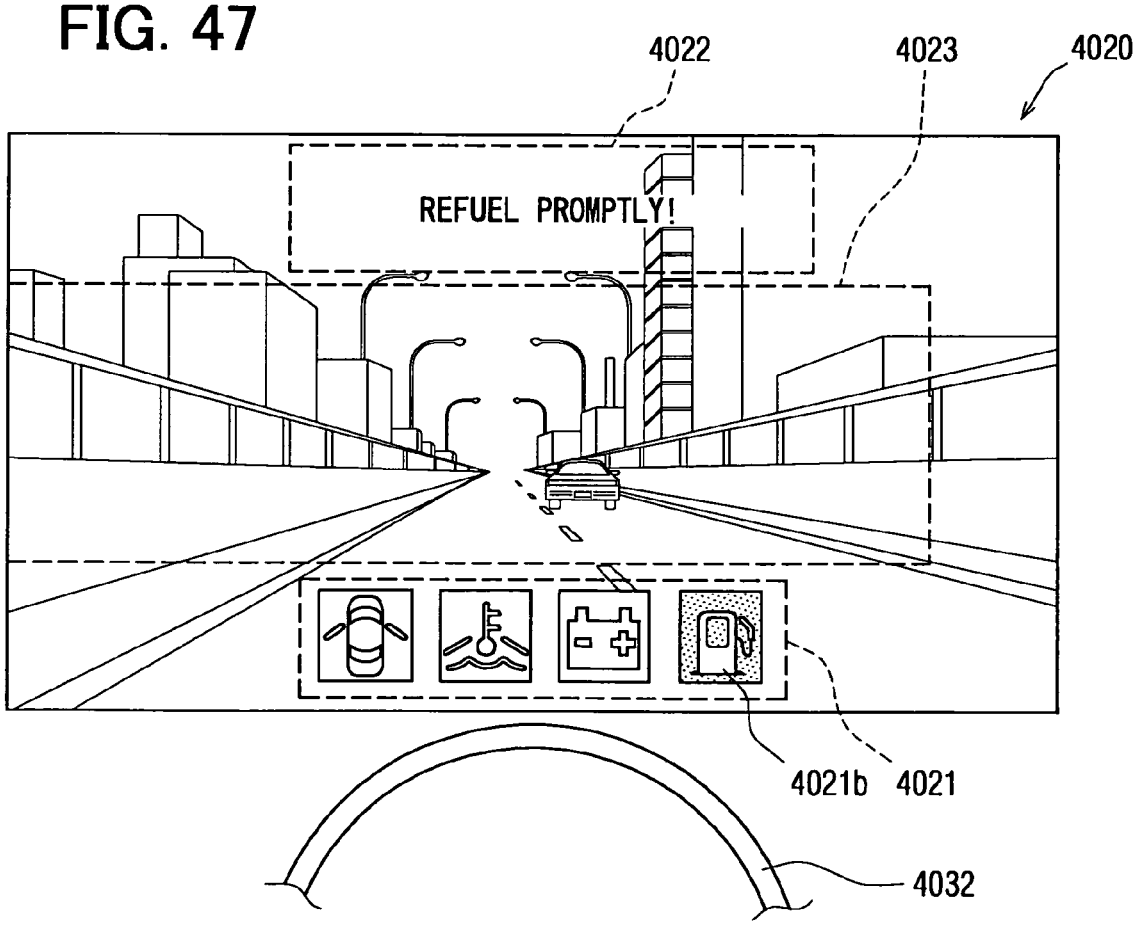
FIG. 47 is a photographic diagram showing a display example of the vehicle display apparatus of the first example.

FIG. 47 shows a display example according to the first example. The first display area 4021 displays information about vehicle anomalies. The second display area 4022 displays information about anomaly countermeasure against the anomaly information.

There are four indicators. Of these, three indicators are used for door, overheat, and battery voltage alarms, and are displayed in green on the first display area 4021. A dot-patterned fuel alarm 4021b is displayed in red to alarm that a small amount of fuel remains. According to levels, the second display area 4022 displays information about the anomaly countermeasures. In FIG. 47, the second display area 4022 displays a message "Refuel promptly!" as the lowest level.

Based on the above-mentioned configuration, the following describes operations of the first example.

First, a user turns on the ignition switch 4042. Then, the user uses an operation apparatus (not shown) to select first and second display objects to be displayed in the first and second display areas 4021 and 4022 of the windshield 4020, respectively.

In FIG. 47, four indicators are selected as the first display object. The information about the anomaly countermeasure is selected as the second display object. The anomaly countermeasure corresponds to the indicator displayed in the first display area 4021 in red.

Specifically, the fuel alarm 4021b is displayed in red. This is because the fluid level sensor 4041 detects the amount of fuel remaining in the fuel tank (not shown) is below a specified value. In addition, since the detection level reaches the minimum level, the second display area 4022 displays the message "Refuel promptly!"

The detection level, if below the specified value, may not require promptly refueling. In this case, the second display area 4022 displays the other messages such as "Refuel recommended."

An image displayed in the first display area 4021 of FIG. 47 is displayed as a real image in the first display section 4011 of FIG. 44. An image displayed in the second display area 4022 of FIG. 47 is displayed as a real image in the second display section 4012 of FIG. 44. The images in the first and second display sections 4011 and 4012 are reflected twice on the mirrors 4013 to 4015. The images are then reflected on the first and second display areas 4021 and 4022 and are visually recognized as the virtual images 4021a and 4022a by the driver.

As shown in FIG. 47, the three indicators and the fuel alarm 4021b in red are displayed as the virtual image 4021a. The message "Refuel promptly!" is displayed as the virtual image 4022a. The driver sitting on the driver's seat can visually recognize the images 4021a and 4022a overlapping with actual landscape in front of the own vehicle. This is because the images 4021*a* and 4022*a* are projected on the first and second display areas 4021 and 4022.

When two indicators are used for alarm in the first display area 4021, the two indicators are displayed in red. Corresponding to these indicators, the second display area 4022 displays two pieces of information, right and left, about anomaly countermeasures associated with the anomaly information.

As mentioned above, the first example displays much information about the indicators separately in the first and second display areas 4021 and 4022. The information can be displayed variously in such a manner that the information is displayed in red or only necessary information is selected and displayed. As a result, the driver can be notified of much information in an easy-to-understand manner.

The above-mentioned example selects the four indicators as the first display object. As the second display object, the example selects information about the anomaly countermeasure corresponding to the indicator displayed in red in the first display area 4021. However, the present invention is not limited thereto. For example, it may be preferable to select a vehicle speed or an engine revolution speed as the first display object. It may be preferable to select alarm displays corresponding to a speed limit and fuel consumption as the second display object.

Second Example

The first example applies the vehicle information display system according to the fourth embodiment of the present invention to the combination meter. The fourth embodiment of the present invention is not limited thereto. A second example applies the vehicle information display system of the fourth embodiment to a navigation display apparatus.

In FIG. 46, the control apparatus 4040 further includes a map database (hereafter referred to as DB). The map DB stores map data including data about roads, institutions, and the like. The data about roads include such data as display forms, colors, and the like to be displayed on the display areas 4021 and 4022 of the windshield 4020. These data are associated with directional arrows and maps, both of which announce areas and directions, for example.

The control apparatus 4040 connects with, though not shown, a GPS (Global Positioning System) antenna, a speed sensor, a direction sensor, and the like. The GPS antenna receives radio waves transmitted from a known GPS satellite. The direction sensor includes a known terrestrial magnetism sensor, gyroscope, and the like.

Based on signals from the GPS antenna, the vehicle speed sensor, and the direction sensor, the control apparatus 4040 generates images to be displayed in the display areas 4021 and 4022 on the windshield 4020.

Figure 48:
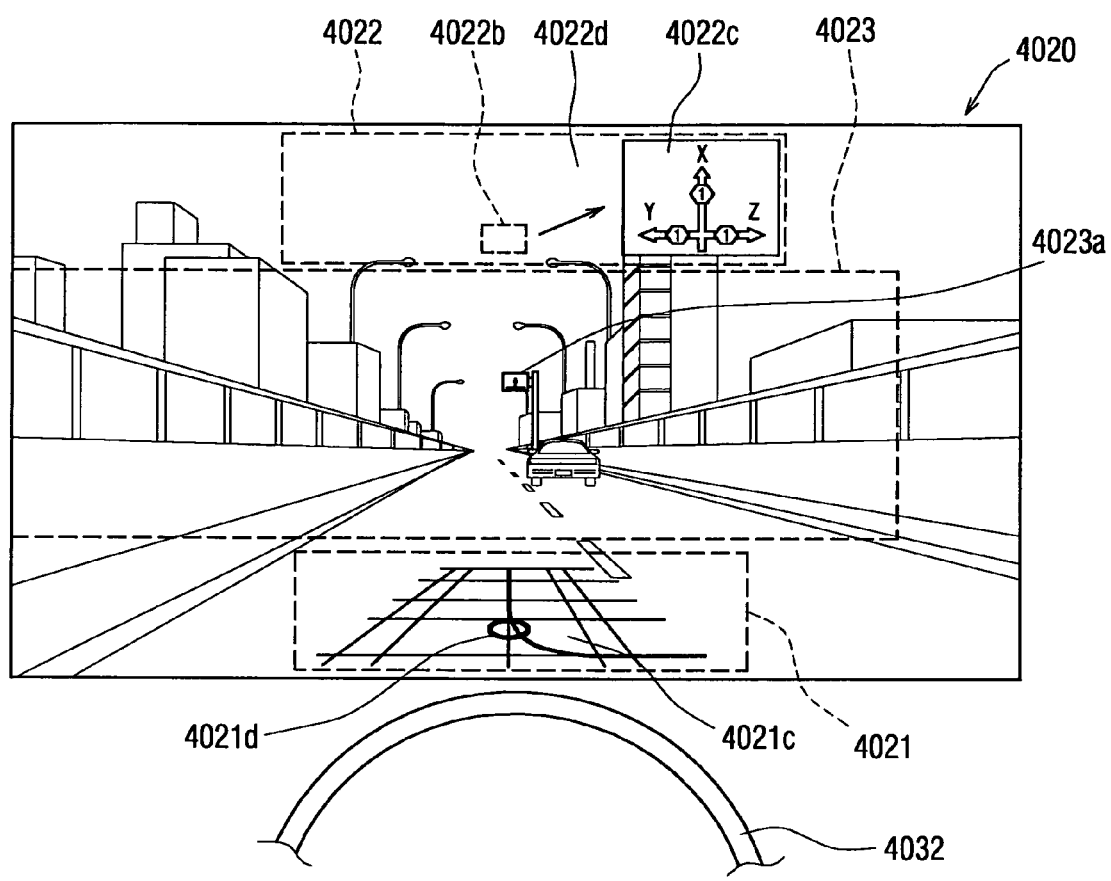
FIG. 48 is a photographic diagram showing a display example of the vehicle display apparatus of a second example.

FIG. 48 shows a display example of the second example. As shown in FIG. 48, the first display area 4021 is positioned above the steering wheel 4032. The first display area 4021 provides displays so as to create a more realistic feeling as if the own vehicle were traveling on a map image 4021*c* around the currently running vehicle itself. That is to say, the reduction scale of the map image 4021*c* is configured to decrease toward the traveling direction of the own vehicle. An even more realistic feeling is available if the reduction rate increases as the vehicle speed increases.

Further, a current position 4021*d* of the own vehicle can be displayed on the map image 4021*c*. In this manner, the driver can recognize the own vehicle's current position during driving.

On the other hand, the driving visual field area 4023 shows a small directional arrow 4023*a*. The directional arrow 4023*a* is displayed as a directional arrow image 4022*b* in the second display area 4022. Control is provided so that the directional arrow image 4022*b* moves toward a directional arrow image 4022*c* in the direction of an arrow 4022*d* and gradually enlarges as the own vehicle approaches the directional arrow 4023*a*. In this manner, the driver is given a realistic feeling and decreases possibilities of missing the directional arrow 4023*a*.

After the directional arrow image 4022*b* disappears from the driving visual field area 4023, control may be provided to continue displaying the directional arrow image 4022*c* for a while. This further decreases possibilities of missing the directional arrow 4023*a*.

As mentioned above, the second example divides much information acquired by the navigation system into two pieces of information associated with each other. Two pieces of information are separately displayed in the first and second display areas 4021 and 4022. In this manner, the driver can be notified of much information in an easy-to-understand manner.

While the second example displays the directional arrow 4023*a* in the second display area 4022, the present invention is not limited thereto. For example, it may be preferable to display eating and drinking establishments along with such information as Japanese or French cuisine, four-star meals, and foodstuffs. Likewise, as the own vehicle approaches an eating and drinking establishment, control is provided so that an image of the eating and drinking establishment is moved and is gradually enlarged. In this manner, the driver is given a realistic feeling and decreases possibilities of missing the eating and drinking establishment.

Figure 49:
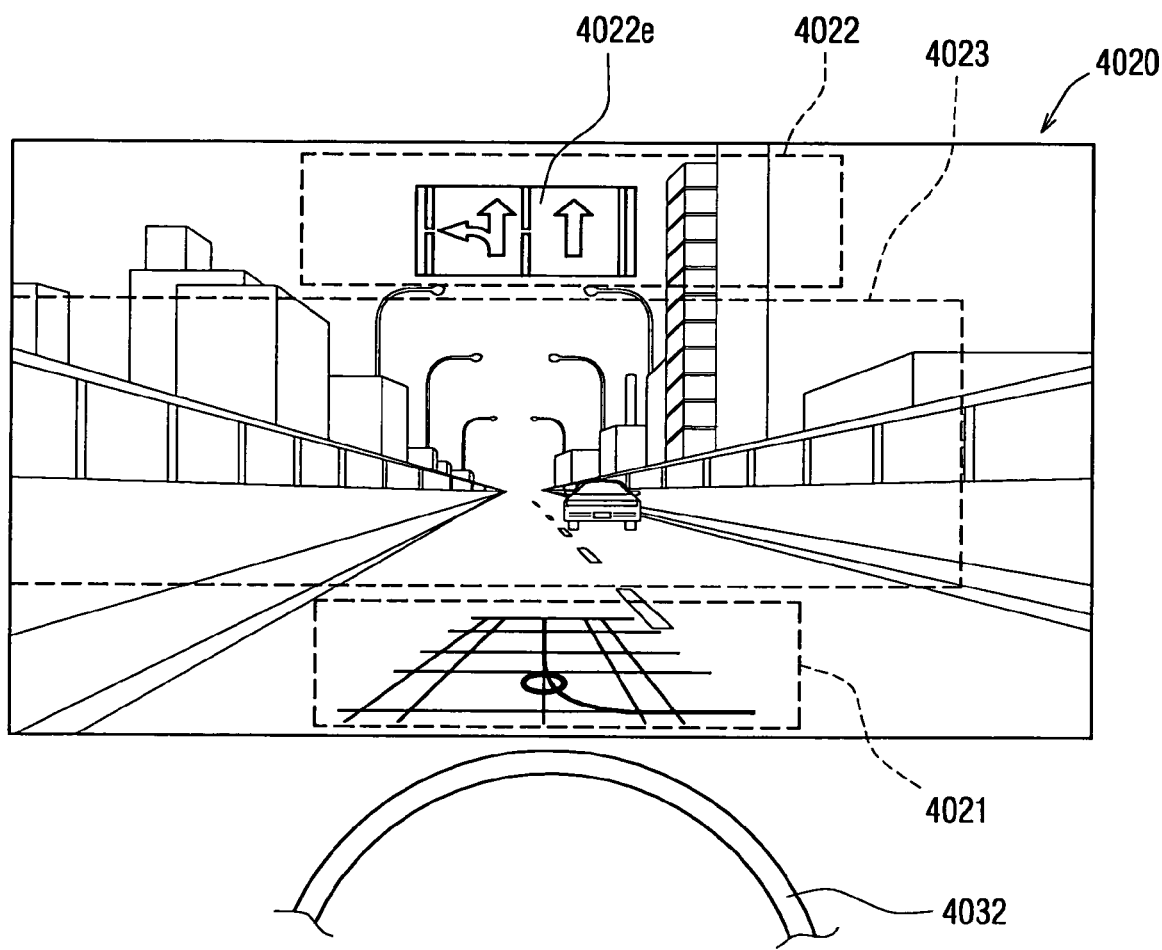
FIG. 49 is a photographic diagram showing another display example of the vehicle display apparatus of the second example.

As shown in FIG. 49, lane information may be displayed in the second display area 4022. In this case, a lane image 4022*e* may or may not be changed with respect to its position and size.

The first display area 4021 may display other information than the map.

A vehicle anomaly may occur while the display in FIG. 48 is provided. In this case, it may be preferable to interrupt the current display and provide the anomaly information and associated information about the anomaly countermeasure as shown in FIG. 47.

As mentioned above, the present invention is characterized in that much information is separately displayed in the top and bottom areas 4021 and 4022 except the driving visual field area 4023. Accordingly, it is needless to maintain association between much information separately displayed in the top and bottom areas 4021 and 4022. For example, it may be preferable to simply enumerate and display the information about the combination meter separately in the top and bottom areas 4021 and 4022. Further, it may be preferable to display more important information in the first display area 4021 and less important information in the second display area 4022.

As mentioned above, the first and second display sections 4011 and 4012 are integrated as the liquid crystal display device 4010 but may be provided separately.

It may be preferable to use a transparent indicator gauge instead of the liquid crystal display device 4010.

It will be obvious to those skilled in the art that various changes may be made in the above-described embodiments of the present invention. However, the scope of the present invention should be determined by the following claims.

What is claimed is:

1. A vehicle information display system having display means for reflecting an image on a windshield of a vehicle and displaying the image so that an occupant of the vehicle recognizes the image as a virtual image, the system comprising:
   information collection means for collecting information to be displayed by the display means;
   circumstance detection means for detecting at least one of a circumstance of the vehicle, a circumstance of surrounding of the vehicle, and a circumstance of the occupant;
   information classification means for classifying the collected information collected by the information collection means in accordance with a detection result from the circumstance detection means; and
   display control means for controlling display contents of the display means in accordance with a classification result from the information classification means,
   wherein the information classification means has first classification means for classifying the collected information into first class information to be immediately recognized by the occupant and second class information other than the first class information;
   wherein the display control means defines a display area capable of being displayed by the display means as:
   (i) a center display area enabling the occupant to read information without averting a sight line from a forward driving course while running along a straight course, and
   (ii) a surrounding display area other than the center display area;
   wherein the display control means controls display positions of the first class information and the second class information so that the first class information corresponds to the center display area and the second class information corresponds to the surrounding display area;
   wherein the information classification means has second classification means for classifying the collected information into displayable information to be displayed and undisplayable information to be hidden;
   wherein the display control means displays only the displayable information;
   wherein the circumstance detection means detects at least on of a vehicle's right turn operation and a vehicle's left turn operation;
   wherein, when a right turn is detected by the circumstance detection means, the second classification means classifies, as the undisplayable information, information having a display position specified in a right portion of the surrounding display area adjacent to a right side of the center display area; and
   wherein, when a left turn is detected by the circumstance detection means, the second classification means classifies, as the undisplayable information, information having a display position specified in a left portion of the surrounding display area adjacent to a left side of the center display area.

2. The vehicle information display system according to claim 1,
   wherein the information collection means collects at least guide point information needed for the occupant at a predetermined specific guide point;
   wherein the circumstance detection means detects at least a position of the vehicle as a circumstance of the vehicle; and
   wherein, when the position detected by the circumstance detection means is inside a predetermined area around the specific guide point, the first classification means classifies the guide point information as first class information and, when the position of the vehicle is outside the predetermined area, classifies the point information as second class information.

3. The vehicle information display system according to claim 1,
   wherein the circumstance detection means detects at least the presence or absence of a danger-avoidance operation to avoid danger; and
   wherein, when the circumstance detection means detects a danger-avoidance operation, the second classification means classifies a part of the collected information which is irrelevant to the danger-avoidance operation as the undisplayable information.

4. The vehicle information display system according to claim 1, wherein
   information to be corrected is configured to be layered into at least more than two levels used for indicating and changing positions to be displayed by the display means.

5. The vehicle information display system according to claim 4, wherein
   layering the information to be corrected into at least more than two levels is allowed to be set up by a user of the vehicle.

6. A method used in a vehicle information display system having display means for reflecting an image on a windshield of a vehicle and displaying the image so that an occupant of the vehicle recognizes the image as a virtual image, the method comprising steps of:
   collecting information to be displayed by the display means;
   detecting at least one of a circumstance of the vehicle, a circumstance of surrounding of the vehicle, and a circumstance of the occupant;
   classifying the collected information in accordance with a result from the detecting; and
   controlling display contents of the display means in accordance with a result from the classifying, wherein display areas are defined to be capable of being displayed by the display means as (i) a center display area enabling the occupant to read information without averting a sight line from a forward driving course while running along a straight course and (ii) a surrounding display area other than the center display area,
   wherein, in the step of the classifying, the collected information is classified into first class information to be immediately recognized by the occupant and second class information other than the first class information;
   wherein, in the step of the controlling, display positions of the first class information and the second class information re controlled so that the first class information corresponds to the center display area and the second class, information corresponds to the surrounding display area;
   wherein, in the step of the classifying, the collected information is further classified into displayable information to be displayed and undisplayable information to be hidden, wherein only the displayable information is displayed at the step of the controlling; and
   wherein (i) when a right turn is detected at the step of the detecting, information having a display position specified in a right portion of the surrounding display area adjacent to a right side of the center display area is classified as the undisplayable information at the step of the classifying, and (ii) when a left turn is detected at the step of the detecting, information having a display position specified in a left portion of the surrounding display area adjacent to a left side of the center display area is classified as the undisplayable information.

7. A vehicle information display system having display means for reflecting an image on a windshield of a vehicle and displaying the image so that an occupant of the vehicle recognizes the image as a virtual image, the system comprising:

information collection means for collecting information to be displayed by the display means;

circumstance detection means for detecting at least one of a circumstance of the vehicle, a circumstance of surrounding of the vehicle, and a circumstance of the occupant;

information classification means for classifying the collected information collected by the information collection means in accordance with a detection result from the circumstance detection means; and display control means for controlling display contents of the display means in accordance with a classification result from the information classification means, wherein the information classification means has first classification means for classifying the collected information into first class information to be immediately recognized by the occupant and second class information other than the first class information;

wherein the display control means defines display areas capable of being displayed by the display means as a center display area enabling the occupant to read information without averting a sight line from a forward driving course white running along a straight course and a surrounding display area other than the center display area, and controls display positions of the first class information and the second class information so that the first class information corresponds to the center display area and the second class information corresponds to the surrounding display area; and wherein more of the collected information displayed in the surrounding display area is displayed in the center display area as a degree of an automatic operation of the vehicle increases.

\* \* \* \* \*